US007737246B2

(12) United States Patent
Crawford

(10) Patent No.: US 7,737,246 B2
(45) Date of Patent: *Jun. 15, 2010

(54) POLYESTER COMPOSITIONS WHICH COMPRISE CYCLOBUTANEDIOL, CYCLOHEXANEDIMETHANOL, AND ETHYLENE GLYCOL AND MANUFACTURING PROCESSES THEREFOR

(75) Inventor: Emmett Dudley Crawford, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 434 days.

This patent is subject to a terminal disclaimer.

(21) Appl. No.: 11/635,434

(22) Filed: Dec. 7, 2006

(65) Prior Publication Data
US 2007/0142615 A1 Jun. 21, 2007

Related U.S. Application Data

(63) Continuation-in-part of application No. 11/588,524, filed on Oct. 27, 2006, and a continuation-in-part of application No. 11/588,458, filed on Oct. 27, 2006, and a continuation-in-part of application No. 11/588,907, filed on Oct. 27, 2006, and a continuation-in-part of application No. 11/588,527, filed on Oct. 27, 2006, and a continuation-in-part of application No. 11/588,906, filed on Oct. 27, 2006, and a continuation-in-part of application No. 11/588,554, filed on Oct. 27, 2006, and a continuation-in-part of application No. 11/588,883, filed on Oct. 27, 2006, and a continuation-in-part of application No. PCT/US2006/041917, filed on Oct. 27, 2006, and a continuation-in-part of application No. PCT/US2006/042069, filed on Oct. 27, 2006, and a continuation-in-part of application No. PCT/US2006/042291, filed on Oct. 27, 2006, and a continuation-in-part of application No. PCT/US2006/042292, filed on Oct. 27, 2006, and a continuation-in-part of application No. PCT/US2006/042293, filed on Oct. 27, 2006, and a continuation-in-part of application No. 11/439,062, filed on May 23, 2006, and a continuation-in-part of application No. 11/439,340, filed on May 23, 2006, and a continuation-in-part of application No. 11/390,672, filed on Mar. 28, 2006, and a continuation-in-part of application No. 11/390,752, filed on Mar. 28, 2006, (Continued)

(60) Provisional application No. 60/750,692, filed on Dec. 15, 2005, provisional application No. 60/750,693, filed on Dec. 15, 2005, provisional application No. 60/750,682, filed on Dec. 15, 2005, provisional application No. 60/750,547, filed on Dec. 15, 2005, provisional application No. 60/786,572, filed on Mar. 28, 2006, provisional application No. 60/786,596, filed on Mar. 28, 2006, provisional application No. 60/786,547, filed on Mar. 28, 2006, provisional application No. 60/786,571, filed on Mar. 28, 2006, provisional application No. 60/786,598, filed on Mar. 28, 2006.

(51) Int. Cl.
C08G 63/02 (2006.01)
C08G 63/16 (2006.01)
(52) U.S. Cl. .................. 528/272; 528/302; 528/305; 528/307
(58) Field of Classification Search .............. 528/272, 528/302, 305, 307
See application file for complete search history.

(56) References Cited

U.S. PATENT DOCUMENTS 1,602,699 A 10/1926 Nightingale (Continued)

FOREIGN PATENT DOCUMENTS

BE 615850 4/1962

(Continued)

OTHER PUBLICATIONS

Chang, S. et al., "Effect of Stabilizers on the Preparation of Poly(ethylene Terephthalate)", Journal of Polymer Science, Polymer Chemistry Edition, 1982, vol. 20, pp. 2053-2061, John Wiley & Sons, Inc.
USPTO Office Action dated Mar. 11, 2008 for copending U.S. Appl. No. 11/391,642.

(Continued)

*Primary Examiner*—Milton I Cano
*Assistant Examiner*—Gennadiy Mesh
(74) *Attorney, Agent, or Firm*—Eric D. Middlemas; Bernard J. Graves, Jr.; Betty J. Boshears

(57) ABSTRACT

Described as one aspect of the invention are polyester compositions comprising at least one polyester which comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 40 mole % 2,2,4,4-tetramethyl-1,3-cyclobutanediol residues; and
(ii) about 20 to about 40 mole % cyclohexanedimethanol residues;
(iii) ethylene glycol residues, and
(iv) less than about 2 mole % of a modifying glycol having from 3 to 16 carbon atoms;
wherein the total mole % of the dicarboxylic acid component is 100 mole %, and
wherein the total mole % of the glycol component is 100 mole %; and
wherein the inherent viscosity of the polyester is from 0.50 to 1.2 dL/g as determined in 60/40 (wt/wt) phenol/tetrachloroethane at a concentration of 0.25 g/50 ml at 25° C. The polyesters may be manufactured into articles.

76 Claims, No Drawings

Related U.S. Application Data and a continuation-in-part of application No. 11/390,794, filed on Mar. 28, 2006, and a continuation-in-part of application No. 11/391,565, filed on Mar. 28, 2006, and a continuation-in-part of application No. 11/390,671, filed on Mar. 28, 2006, and a continuation-in-part of application No. 11/390,853, filed on Mar. 28, 2006, and a continuation-in-part of application No. 11/390,631, filed on Mar. 28, 2006, and a continuation-in-part of application No. 11/390,655, filed on Mar. 28, 2006, and a continuation-in-part of application No. 11/391,125, filed on Mar. 28, 2006, and a continuation-in-part of application No. 11/390,751, filed on Mar. 28, 2006, and a continuation-in-part of application No. 11/390,955, filed on Mar. 28, 2006, and a continuation-in-part of application No. 11/390,827, filed on Mar. 28, 2006, and a continuation-in-part of application No. 11/390,883, filed on Mar. 28, 2006, and a continuation-in-part of application No. 11/390,846, filed on Mar. 28, 2006, and a continuation-in-part of application No. 11/390,809, filed on Mar. 28, 2006, and a continuation-in-partof application No. 11/390,812, filed on Mar. 28, 2006, and a continuation-in-part of application No. 11/391,124, filed on Mar. 28, 2006, and a continuation-in-part of application No. 11/390,908, filed on Mar. 28, 2006, and a continuation-in-part of application No. 11/390,793, filed on Mar. 28, 2006, and a continuation-in-part of application No. 11/391,642, filed on Mar. 28, 2006, and a continuation-in-part of application No. 11/390,826, filed on Mar. 28, 2006, and a continuation-in-part of application No. 11/390,563, filed on Mar. 28, 2006, and a continuation-in-part of application No. 11/390,847, filed on Mar. 28, 2006, and a continuation-in-part of application No. 11/391,156, filed on Mar. 28, 2006, and a continuation-in-part of application No. 11/390,630, filed on Mar. 28, 2006, and a continuation-in-part of application No. 11/391,495, filed on Mar. 28, 2006, and a continuation-in-part of application No. 11/391,576, filed on Mar. 28, 2006, and a continuation-in-part of application No. 11/390,858, filed on Mar. 28, 2006, and a continuation-in-part of application No. 11/390,629, filed on Mar. 28, 2006, and a continuation-in-part of application No. 11/391,485, filed on Mar. 28, 2006, and a continuation-in-part of application No. 11/390,811, filed on Mar. 28, 2006, and a continuation-in-part of application No. 11/390,750, filed on Mar. 28, 2006, and a continuation-in-part of application No. 11/390,773, filed on Mar. 28, 2006, and a continuation-in-part of application No. 11/390,865, filed on Mar. 28, 2006, and a continuation-in-part of application No. 11/390,654, filed on Mar. 28, 2006, and a continuation-in-part of application No. 11/390,882, filed on Mar. 28, 2006, and a continuation-in-part of application No. 11/390,836, filed on Mar. 28, 2006, and a continuation-in-part of application No. 11/391,063, filed on Mar. 28, 2006, and a continuation-in-part of application No. 11/390,814, filed on Mar. 28, 2006, and a continuation-in-part of application No. 11/390,722, filed on Mar. 28, 2006, and a continuation-in-part of application No. 11/391,659, filed on Mar. 28, 2006, and a continuation-in-part of application No. 11/391,137, filed on Mar. 28, 2006, and a continuation-in-part of application No. 11/391,505, filed on Mar. 28, 2006, and a continuation-in-part of application No. 11/390,864, filed on Mar. 28, 2006, and a continuation-in-part of application No. 11/391,571, filed on Mar. 28, 2006.

(56) References Cited

U.S. PATENT DOCUMENTS

| | | |
|---|---|---|
| 2,160,841 A | 6/1939 | Dreyfus |
| 2,202,046 A | 5/1940 | Dreyfus et al. |
| 2,278,537 A | 4/1942 | Dreyfus et al. |
| 2,720,507 A | 10/1955 | Caldwell |
| 2,806,064 A | 9/1957 | McKlveen |
| 2,901,466 A | 8/1959 | Kibler |
| 2,936,324 A | 5/1960 | Hasek et al. |
| 3,000,906 A | 9/1961 | Hasek et al. |
| 3,030,335 A | 4/1962 | Goldberg |
| 3,062,852 A | 11/1962 | Martin et al. |
| 3,075,952 A | 1/1963 | Coover et al. |
| 3,091,600 A | 5/1963 | Caldwell et al. |
| 3,169,121 A | 2/1965 | Goldberg et al. |
| 3,190,928 A | 6/1965 | Elam et al. |
| 3,201,474 A | 8/1965 | Hasek et al. |
| 3,207,814 A | 9/1965 | Goldberg et al. |
| 3,218,372 A | 11/1965 | Okmura et al. |
| 3,227,764 A | 1/1966 | Martin et al. |
| 3,236,899 A | 2/1966 | Clark |
| 3,249,652 A | 5/1966 | Quisenberry |
| 3,259,469 A | 7/1966 | Painter et al. |
| 3,287,390 A | 11/1966 | Poos et al. |
| 3,288,854 A | 11/1966 | Martin |
| 3,312,741 A | 4/1967 | Martin |
| 3,313,777 A | 4/1967 | Elam et al. |
| 3,317,466 A | 5/1967 | Caldwell et al. |
| 3,329,722 A | 7/1967 | Rylander |
| 3,360,547 A | 12/1967 | Wilson et al. |
| 3,366,689 A | 1/1968 | Maeda et al. |
| 3,386,935 A | 6/1968 | Jackson et al. |
| 3,403,181 A | 9/1968 | Painter et al. |
| T858,012 I4 | 1/1969 | Caldwell et al. |
| 3,484,339 A | 12/1969 | Caldwell |
| 3,502,620 A | 3/1970 | Caldwell |
| T873,016 I4 | 4/1970 | Gilkey et al. |
| 3,541,059 A | 11/1970 | Schaper |
| 3,546,177 A | 12/1970 | Kibler et al. |
| 3,629,202 A | 12/1971 | Gilkey et al. |
| RE27,682 E | 6/1973 | Hermann et al. |
| 3,772,405 A | 11/1973 | Hamb |
| 3,799,953 A | 3/1974 | Freitag et al. |
| 3,907,754 A | 9/1975 | Tershansy et al. |
| 3,915,913 A | 10/1975 | Jackson, Jr. et al. |
| 3,962,189 A | 6/1976 | Russin et al. |
| 4,001,184 A | 1/1977 | Scott |
| 4,010,145 A | 3/1977 | Russin et al. |
| 4,046,933 A | 9/1977 | Stefanik |
| 4,056,504 A | 11/1977 | Grundmeier et al. |
| 4,084,889 A | 4/1978 | Vischer, Jr. |
| 4,125,572 A | 11/1978 | Scott |
| 4,156,069 A | 5/1979 | Prevorsek et al. |
| 4,160,383 A | 7/1979 | Rauschenberger |
| 4,185,009 A | 1/1980 | Idel et al. |
| 4,188,314 A | 2/1980 | Fox et al. |
| 4,194,038 A | 3/1980 | Baker et al. |
| 4,263,364 A | 4/1981 | Seymour et al. |
| 4,356,299 A | 10/1982 | Cholod et al. |
| 4,367,186 A | 1/1983 | Adelmann et al. |
| 4,379,802 A | 4/1983 | Weaver et al. |
| 4,384,106 A | 5/1983 | Go et al. |
| 4,391,954 A | 7/1983 | Scott |
| 4,424,140 A | 1/1984 | Weinberg et al. |
| 4,426,512 A | 1/1984 | Barbee et al. |
| 4,427,614 A | 1/1984 | Barham et al. |
| 4,430,484 A | 2/1984 | Quinn |
| 4,431,793 A | 2/1984 | Rosenquist |

| | | | | | | |
|---|---|---|---|---|---|---|
| 4,452,933 A | 6/1984 | McCready | | 5,814,679 A | 9/1998 | Eckberg et al. |
| 4,465,820 A | 8/1984 | Miller et al. | | 5,859,116 A | 1/1999 | Shih |
| 4,469,861 A | 9/1984 | Mark et al. | | 5,863,622 A | 1/1999 | Jester |
| 4,480,086 A | 10/1984 | O'Neill | | 5,902,631 A | 5/1999 | Wang et al. |
| 4,525,504 A | 6/1985 | Morris et al. | | 5,907,026 A | 5/1999 | Factor et al. |
| 4,578,295 A | 3/1986 | Jabarin | | 5,942,585 A | 8/1999 | Scott et al. |
| 4,578,437 A | 3/1986 | Light et al. | | 5,955,565 A | 9/1999 | Morris et al. |
| 4,642,959 A | 2/1987 | Swiech, Jr. et al. | | 5,958,539 A | 9/1999 | Eckart et al. |
| 4,738,880 A | 4/1988 | Asada et al. | | 5,958,581 A | 9/1999 | Khanarian et al. |
| 4,749,773 A | 6/1988 | Weaver et al. | | 5,959,066 A | 9/1999 | Charbonneau et al. |
| 4,786,692 A | 11/1988 | Allen et al. | | 5,962,625 A | 10/1999 | Yau |
| 4,816,308 A | 3/1989 | Shimizu et al. | | 5,977,347 A | 11/1999 | Shuto et al. |
| 4,826,903 A | 5/1989 | Weaver et al. | | 5,989,663 A | 11/1999 | Morris et al. |
| 4,845,188 A | 7/1989 | Weaver et al. | | 6,001,910 A | 12/1999 | Blumenthal et al. |
| 4,880,592 A | 11/1989 | Martini et al. | | 6,005,059 A | 12/1999 | Scott et al. |
| 4,882,412 A | 11/1989 | Weaver et al. | | 6,011,124 A | 1/2000 | Scott et al. |
| 4,892,922 A | 1/1990 | Weaver et al. | | 6,012,597 A | 1/2000 | Nishihara et al. |
| 4,892,923 A | 1/1990 | Weaver et al. | | 6,022,603 A | 2/2000 | Umeda et al. |
| 4,939,186 A | 7/1990 | Nelson et al. | | 6,025,061 A | 2/2000 | Khanarian et al. |
| 4,976,057 A | 12/1990 | Bianchi | | 6,030,671 A | 2/2000 | Yang et al. |
| 4,981,898 A | 1/1991 | Bassett | | 6,037,424 A | 3/2000 | Scott et al. |
| 4,985,342 A | 1/1991 | Muramoto et al. | | 6,043,322 A | 3/2000 | Scott et al. |
| 5,017,679 A | 5/1991 | Chang et al. | | 6,044,996 A | 4/2000 | Carew et al. |
| 5,017,680 A | 5/1991 | Sublett | | 6,063,464 A | 5/2000 | Charbonneau et al. |
| 5,034,252 A | 7/1991 | Nilsson et al. | | 6,063,465 A | 5/2000 | Charbonneau et al. |
| 5,104,450 A | 4/1992 | Sand et al. | | 6,063,495 A | 5/2000 | Charbonneau et al. |
| 5,118,760 A | 6/1992 | Blakely et al. | | 6,084,019 A | 7/2000 | Matayabas et al. |
| 5,118,847 A | 6/1992 | Jackson et al. | | 6,096,854 A | 8/2000 | Morris et al. |
| 5,142,088 A | 8/1992 | Phelps et al. | | 6,114,575 A | 9/2000 | McMahon et al. |
| 5,169,994 A | 12/1992 | Sumner, Jr. et al. | | 6,120,477 A | 9/2000 | Campbell et al. |
| 5,183,863 A | 2/1993 | Nakamura et al. | | 6,120,889 A | 9/2000 | Turner et al. |
| 5,191,038 A | 3/1993 | Krabbenhoft et al. | | 6,126,992 A | 10/2000 | Khanarian et al. |
| 5,207,967 A | 5/1993 | Small et al. | | 6,127,492 A | 10/2000 | Nagashima et al. |
| 5,219,510 A | 6/1993 | Machell et al. | | 6,146,228 A | 11/2000 | Mougin et al. |
| 5,224,958 A | 7/1993 | Warunek et al. | | 6,150,494 A | 11/2000 | Wang et al. |
| 5,239,020 A | 8/1993 | Morris | | 6,183,848 B1 | 2/2001 | Turner et al. |
| 5,256,761 A | 10/1993 | Blount, Jr. | | 6,191,209 B1 | 2/2001 | Andrews et al. |
| 5,258,556 A | 11/1993 | Sumner, Jr. et al. | | 6,211,309 B1 | 4/2001 | McIntosh et al. |
| 5,288,715 A | 2/1994 | Machell et al. | | 6,221,556 B1 * | 4/2001 | Gallucci et al. ........ 430/270.11 |
| 5,288,764 A | 2/1994 | Rotter et al. | | 6,225,436 B1 | 5/2001 | Eiffler et al. |
| 5,292,783 A | 3/1994 | Buchanan et al. | | 6,232,504 B1 | 5/2001 | Barteau et al. |
| 5,310,611 A | 5/1994 | Okabe et al. | | 6,255,523 B1 | 7/2001 | Panandiker et al. |
| 5,310,787 A | 5/1994 | Kutsuwa et al. | | 6,287,656 B1 | 9/2001 | Turner et al. |
| 5,326,584 A | 7/1994 | Kamel et al. | | 6,307,006 B1 | 10/2001 | Konig et al. |
| 5,331,034 A | 7/1994 | Pfahler et al. | | 6,309,718 B1 | 10/2001 | Sprayberry |
| 5,333,073 A | 7/1994 | Suzuki | | 6,320,042 B1 | 11/2001 | Michihata et al. |
| 5,354,791 A | 10/1994 | Gallucci | | 6,323,291 B1 | 11/2001 | Mason et al. |
| 5,372,864 A | 12/1994 | Weaver et al. | | 6,323,304 B1 | 11/2001 | Lemmon et al. |
| 5,372,879 A | 12/1994 | Handa et al. | | 6,342,304 B1 | 1/2002 | Buchanan et al. |
| 5,378,796 A | 1/1995 | George et al. | | 6,352,783 B1 | 3/2002 | Fagerburg |
| 5,382,292 A | 1/1995 | Conroy et al. | | 6,354,986 B1 | 3/2002 | Hlavinka et al. |
| 5,384,377 A | 1/1995 | Weaver et al. | | 6,359,070 B1 | 3/2002 | Khanarian et al. |
| 5,475,144 A | 12/1995 | Watson et al. | | 6,406,792 B1 | 6/2002 | Briquet et al. |
| 5,480,926 A | 1/1996 | Fagerburg et al. | | 6,437,083 B1 | 8/2002 | Brack et al. |
| 5,486,562 A | 1/1996 | Borman et al. | | 6,448,334 B1 | 9/2002 | Verhoogt et al. |
| 5,489,665 A | 2/1996 | Yamato et al. | | 6,458,468 B1 | 10/2002 | Moskala et al. |
| 5,494,992 A | 2/1996 | Kanno et al. | | 6,504,002 B1 | 1/2003 | Karlik et al. |
| 5,498,668 A | 3/1996 | Scott | | 6,559,272 B1 | 5/2003 | Jeon et al. |
| 5,498,688 A | 3/1996 | Oshino et al. | | 6,573,328 B2 | 6/2003 | Kropp et al. |
| 5,506,014 A | 4/1996 | Minnick | | 6,599,994 B2 | 7/2003 | Shelby et al. |
| 5,534,609 A | 7/1996 | Lewis et al. | | 6,639,067 B1 | 10/2003 | Brinegar et al. |
| 5,552,512 A | 9/1996 | Sublett | | 6,656,577 B1 | 12/2003 | Adelman et al. |
| 5,591,530 A | 1/1997 | Warner et al. | | 6,669,980 B2 | 12/2003 | Hansen |
| 5,633,340 A | 5/1997 | Hoffman et al. | | 6,723,768 B2 | 4/2004 | Adams et al. |
| 5,650,453 A | 7/1997 | Eckberg et al. | | 6,733,716 B2 | 5/2004 | Belcher |
| 5,654,347 A | 8/1997 | Khemani et al. | | 6,740,377 B2 | 5/2004 | Pecorini et al. |
| 5,656,715 A | 8/1997 | Dickerson et al. | | 6,773,653 B2 | 8/2004 | Miller et al. |
| 5,668,243 A | 9/1997 | Yau et al. | | 6,818,293 B1 | 11/2004 | Keep et al. |
| 5,681,918 A | 10/1997 | Adams et al. | | 6,818,730 B2 | 11/2004 | Brandenburg et al. |
| 5,696,176 A | 12/1997 | Khemani et al. | | 6,846,440 B2 | 1/2005 | Flynn et al. |
| 5,705,575 A | 1/1998 | Kelsey | | 6,846,508 B1 | 1/2005 | Colas et al. |
| 5,783,307 A | 7/1998 | Fagerburg et al. | | 6,896,966 B2 | 5/2005 | Crawford et al. |
| 5,804,617 A | 9/1998 | Hoffman et al. | | 6,908,650 B2 | 6/2005 | Odorisio et al. |

| | | | | | |
|---|---|---|---|---|---|
| 6,914,120 B2 | 7/2005 | Germroth et al. | DE | 29 21 868 A1 | 12/1980 |
| 7,037,576 B2 | 5/2006 | Willham et al. | DE | 197 27 709 A1 | 6/1997 |
| 7,048,978 B2 | 5/2006 | Tanaka et al. | DE | 198 11 773 A1 | 9/1999 |
| 7,122,661 B2 | 10/2006 | Fleche et al. | EP | 0 039 838 A1 | 11/1981 |
| 7,169,880 B2 | 1/2007 | Shelby et al. | EP | 0 273 144 A2 | 5/1987 |
| 7,297,755 B2 | 11/2007 | Shelby et al. | EP | 0 282 277 | 9/1988 |
| 7,354,628 B2 | 4/2008 | Steube | EP | 0 372 846 | 6/1990 |
| 7,375,154 B2 | 5/2008 | Stafford et al. | EP | 0 544 008 A1 | 6/1993 |
| 7,427,430 B2 | 9/2008 | Rhee et al. | EP | 0 595 413 A1 | 5/1994 |
| 7,468,409 B2 | 12/2008 | Pearson et al. | EP | 0 698 631 | 2/1996 |
| 7,482,397 B2 | 1/2009 | Pearson et al. | EP | 0 714 764 A2 | 6/1996 |
| 2001/0029324 A1 | 10/2001 | Walker et al. | EP | 0902052 A1 | 3/1999 |
| 2001/0031805 A1 | 10/2001 | Buhler | EP | 0 930 531 A1 | 7/1999 |
| 2001/0034419 A1 | 10/2001 | Kanayama et al. | EP | 1 066 825 A1 | 1/2001 |
| 2001/0044003 A1 | 11/2001 | Galluci et al. | EP | 1 674 496 A1 | 6/2006 |
| 2002/0055586 A1 | 5/2002 | Dalgewicz, III et al. | FR | 1278284 | 12/1961 |
| 2002/0128357 A1 | 9/2002 | Goossens et al. | FR | 1291273 | 5/1965 |
| 2002/0132963 A1 | 9/2002 | Quillen | FR | 1432471 | 2/1966 |
| 2002/0137856 A1 | 9/2002 | Andrews et al. | FR | 1434658 | 2/1966 |
| 2002/0188092 A1 | 12/2002 | Moskala et al. | FR | 2 112 400 A1 | 6/1972 |
| 2002/0198297 A1 | 12/2002 | Odorisio et al. | GB | 962913 | 7/1964 |
| 2003/0032737 A1 | 2/2003 | Andrews et al. | GB | 1041651 | 9/1966 |
| 2003/0060546 A1 | 3/2003 | Moskala et al. | GB | 1044015 | 9/1966 |
| 2003/0075516 A1 | 4/2003 | Rothman et al. | GB | 1047043 | 11/1966 |
| 2003/0077546 A1 | 4/2003 | Donovan et al. | GB | 1090241 | 11/1967 |
| 2003/0135015 A1 | 7/2003 | Fujimaki et al. | GB | 1130558 | 10/1968 |
| 2003/0139497 A1 | 7/2003 | Odorisio et al. | GB | 1278284 | 6/1972 |
| 2003/0149177 A1 | 8/2003 | Andrews et al. | GB | 1364732 | 8/1974 |
| 2003/0169514 A1 | 9/2003 | Bourdelais et al. | GB | 2216919 A | 10/1989 |
| 2003/0187151 A1 | 10/2003 | Adams et al. | JP | 56-88440 A | 12/1979 |
| 2003/0195295 A1 | 10/2003 | Mahood et al. | JP | 03207743 | 9/1991 |
| 2003/0221716 A1 | 12/2003 | Olson | JP | 65-01040 | 2/1994 |
| 2003/0229181 A1 | 12/2003 | Hariharan et al. | JP | 9-59371 A | 4/1997 |
| 2004/0022526 A1 | 2/2004 | Kuno et al. | JP | 11-222516 | 8/1999 |
| 2004/0063864 A1 | 4/2004 | Adams et al. | JP | 2001-066701 A | 8/1999 |
| 2004/0101687 A1 | 5/2004 | Crawford et al. | JP | 2000-352620 A | 12/2000 |
| 2004/0106707 A1 | 6/2004 | Su et al. | JP | 2001-098086 A | 4/2001 |
| 2004/0106767 A1 | 6/2004 | Simon et al. | JP | 2001214049 | 8/2001 |
| 2004/0108623 A1 | 6/2004 | Deeter et al. | JP | 2004-244497 A | 9/2004 |
| 2004/0138381 A1 | 7/2004 | Blasius et al. | JP | 2004-292558 A | 10/2004 |
| 2004/0145700 A1 | 7/2004 | Miniutti et al. | KR | 2001 0089942 | 10/2001 |
| 2004/0164279 A1 | 8/2004 | Stevenson et al. | KR | 2003/054611 | 7/2003 |
| 2004/0202822 A1 | 10/2004 | Bourdelais et al. | WO | WO 97/01118 | 1/1997 |
| 2004/0214984 A1 | 10/2004 | Keep et al. | WO | WO 01/06981 | 2/2001 |
| 2005/0008885 A1 | 1/2005 | Blakely et al. | WO | 0185824 A2 | 11/2001 |
| 2005/0072060 A1 | 4/2005 | Moncho et al. | WO | WO 02/055570 A1 | 7/2002 |
| 2005/0096453 A1* | 5/2005 | Flynn et al. ............... 528/272 | WO | WO 02/059207 A2 | 8/2002 |
| 2005/0101759 A1 | 5/2005 | Odorisio et al. | WO | WO 2004009146 A1 | 1/2004 |
| 2005/0113556 A1 | 5/2005 | Strand et al. | WO | WO 2004/039860 | 5/2004 |
| 2005/0119359 A1 | 6/2005 | Shelby et al. | WO | WO 2004/104077 A1 | 12/2004 |
| 2005/0124779 A1 | 6/2005 | Shelby et al. | WO | WO 2004/106988 A2 | 12/2004 |
| 2005/0181155 A1 | 8/2005 | Share et al. | WO | 2005007735 A2 | 1/2005 |
| 2006/0004151 A1 | 1/2006 | Shaikh et al. | WO | WO 2005/026241 A1 | 3/2005 |
| 2006/0094858 A1 | 5/2006 | Turner et al. | WO | WO 2006/127755 A2 | 11/2006 |
| 2006/0111481 A1 | 5/2006 | Pearson et al. | WO | WO 2006/127831 A1 | 11/2006 |
| 2006/0111519 A1 | 5/2006 | Strand et al. | WO | 2007/053550 A1 | 5/2007 |
| 2006/0135668 A1 | 6/2006 | Hayes | WO | 2007053549 A1 | 5/2007 |
| 2006/0146228 A1 | 7/2006 | Sogo et al. | WO | WO 2007/053434 A1 | 5/2007 |
| 2006/0180560 A1 | 8/2006 | Robinson | WO | WO 2007/053548 A2 | 5/2007 |
| 2006/0197246 A1 | 9/2006 | Hale et al. | | | |
| 2006/0199904 A1 | 9/2006 | Hale et al. | | | |
| 2006/0199919 A1 | 9/2006 | Hale et al. | | | |
| 2006/0228507 A1 | 10/2006 | Hale et al. | | | |
| 2006/0234073 A1 | 10/2006 | Hale et al. | | | |
| 2006/0235167 A1 | 10/2006 | Hale et al. | | | |
| 2006/0247388 A1 | 11/2006 | Hale et al. | | | |
| 2006/0270773 A1 | 11/2006 | Hale et al. | | | |
| 2006/0270806 A1 | 11/2006 | Hale | | | |
| 2007/0071930 A1 | 3/2007 | Shelby et al. | | | |

FOREIGN PATENT DOCUMENTS

| | | | |
|---|---|---|---|
| CA | 2035149 A1 | 8/1991 | |

OTHER PUBLICATIONS

USPTO Office Action dated Mar. 24, 2008 for copending U.S. Appl. No. 11/390,908.

USPTO Office Action dated Apr. 15, 2008 for copending U.S. Appl. No. 11/390,629.

Brown, R., "Taschenbuch Kunststoff-Additive," 1990, Carl Hanser Verlag Munchen Wiel, XP002455247, pp. 361-363.

Abstract of U.S. Defense Publication T869,015, 869 O.G. 714, Dec. 16, 1969.

Abstract of U.S. Defense Publication T875,010, 875 O.G. 342, Jun. 9, 1970.

Chen et al., "The molecular basis for the relationship between the secondary relaxation and mechanical properties of a series of polyester copolymer glasses," Marcromolecules, 32:5944-5955 (1999).

Coover, H. et al., "Copolyester Molding Compositions," Chemical Abstracts Service, XP002391844, Date: Jun. 9, 1970.

Kelsey, E. et al., "High Impact, Amorphous Terephthalate Copolyesters of Rigid 2,2,4,4-Tetramethyl-1,3-cyclobutanediol with Flexible Diols," Macromolecules, vol. 33, 2000, pp. 5810-5818, American Chemical Society.

English language Abstract of JP 02-305816 from Patent Abstracts of Japan, Dec. 19, 1990.

English language translation of Belgian Patent No. BE 615,850, Apr. 13, 1962.

English language translation of French Patent No. FR 1,432,471, Feb. 7, 1966.

English language translation of French Patent No. FR 1,434,658, Feb. 28, 1966.

U.S. Appl. No. 11/390,555, filed Mar. 28, 2006, Emmett Dudley Crawford, et al.

U.S. Appl. No. 11/390,563, filed Mar. 28, 2006, Emmett Dudley Crawford, et al.

U.S. Appl. No. 11/390,629, filed Mar. 28, 2006, Emmett Dudley Crawford, et al.

U.S. Appl. No. 11/390,630, filed Mar. 28, 2006, Emmett Dudley Crawford, et al.

U.S. Appl. No. 11/390,631, filed Mar. 28, 2006, Emmett Dudley Crawford, et al.

U.S. Appl. No. 11/390,654, filed Mar. 28, 2006, Emmett Dudley Crawford, et al.

U.S. Appl. No. 11/390,655, filed Mar. 28, 2006, Emmett Dudley Crawford, et al.

U.S. Appl. No. 11/390,671, filed Mar. 28, 2006, Emmett Dudley Crawford, et al.

U.S. Appl. No. 11/390,672, filed Mar. 28, 2006, Emmett Dudley Crawford, et al.

U.S. Appl. No. 11/390,722, filed Mar. 28, 2006, Emmett Dudley Crawford, et al.

U.S. Appl. No. 11/390,750, filed Mar. 28, 2006, Emmett Dudley Crawford, et al.

U.S. Appl. No. 11/390,751, filed Mar. 28, 2006, Emmett Dudley Crawford, et al.

U.S. Appl. No. 11/390,752, filed Mar. 28, 2006, Emmett Dudley Crawford, et al.

U.S. Appl. No. 11/390,773, filed Mar. 28, 2006, Emmett Dudley Crawford, et al.

U.S. Appl. No. 11/390,793, filed Mar. 28, 2006, Emmett Dudley Crawford, et al.

U.S. Appl. No. 11/390,794, filed Mar. 28, 2006, Emmett Dudley Crawford, et al.

U.S. Appl. No. 11/390,809, filed Mar. 28, 2006, Wesley Raymond Hale, et al.

U.S. Appl. No. 11/390,811, filed Mar. 28, 2006, Emmett Dudley Crawford, et al.

U.S. Appl. No. 11/390,812, filed Mar. 28, 2006, Wesley Raymond Hale, et al.

U.S. Appl. No. 11/390,814, filed Mar. 28, 2006, Emmett Dudley Crawford, et al.

U.S. Appl. No. 11/390,826, filed Mar. 28, 2006, Emmett Dudley Crawford, et al.

U.S. Appl. No. 11/390,827, filed Mar. 28, 2006, Emmett Dudley Crawford, et al.

U.S. Appl. No. 11/390,836, filed Mar. 28, 2006, Emmett Dudley Crawford, et al.

U.S. Appl. No. 11/390,846, filed Mar. 28, 2006, Wesley Raymond Hale, et al.

U.S. Appl. No. 11/390,847, filed Mar. 28, 2006, Emmett Dudley Crawford, et al.

U.S. Appl. No. 11/390,853, filed Mar. 28, 2006, Emmett Dudley Crawford, et al.

U.S. Appl. No. 11/390,858, filed Mar. 28, 2006, Emmett Dudley Crawford, et al.

U.S. Appl. No. 11/390,864, filed Mar. 28, 2006, Wesley Raymond Hale, et al.

U.S. Appl. No. 11/390,865, filed Mar. 28, 2006, Emmett Dudley Crawford, et al.

U.S. Appl. No. 11/390,882, filed Mar. 28, 2006, Emmett Dudley Crawford, et al.

U.S. Appl. No. 11/390,883, filed Mar. 28, 2006, Thomas Joseph Pecorini, et al.

U.S. Appl. No. 11/390,908, filed Mar. 28, 2006, Wesley Raymond Hale, et al.

U.S. Appl. No. 11/391,063, filed Mar. 28, 2006, Emmett Dudley Crawford, et al.

U.S. Appl. No. 11/391,124, filed Mar. 28, 2006, Wesley Raymond Hale, et al.

U.S. Appl. No. 11/391,125, filed Mar. 28, 2006, Emmett Dudley Crawford, et al.

U.S. Appl. No. 11/391,137, filed Mar. 28, 2006, Emmett Dudley Crawford, et al.

U.S. Appl. No. 11/391,156, filed Mar. 28, 2006, Emmett Dudley Crawford, et al.

U.S. Appl. No. 11/391,485, filed Mar. 28, 2006, Emmett Dudley Crawford, et al.

U.S. Appl. No. 11/391,495, filed Mar. 28, 2006, Emmett Dudley Crawford, et al.

U.S. Appl. No. 11/391,505, filed Mar. 28, 2006, Emmett Dudley Crawford, et al.

U.S. Appl. No. 11/391,565, filed Mar. 28, 2006, Emmett Dudley Crawford, et al.

U.S. Appl. No. 11/391,571, filed Mar. 28, 2006, Emmett Dudley Crawford, et al.

U.S. Appl. No. 11/391,576, filed Mar. 28, 2006, Emmett Dudley Crawford, et al.

U.S. Appl. No. 11/391,642, filed Mar. 28, 2006, Emmett Dudley Crawford, et al.

U.S. Appl. No. 11/391,659, filed Mar. 28, 2006, Emmett Dudley Crawford, et al.

U.S. Appl. No. 11/588,524, filed Oct. 27, 2006, Emmett Dudley Crawford, et al.

U.S. Appl. No. 11/588,458, filed Oct. 27, 2006, Emmett Dudley Crawford, et al.

U.S. Appl. No. 11/588,907, filed Oct. 27, 2006, Emmett Dudley Crawford, et al.

U.S. Appl. No. 11/588,527, filed Oct. 27, 2006, Emmett Dudley Crawford, et al.

U.S. Appl. No. 11/588,906, filed Oct. 27, 2006, Ted Calvin Germroth, et al.

U.S. Appl. No. 11/588,893, filed Oct. 27, 2006, Ted Calvin Germroth, et al.

U.S. Appl. No. 11/588,554, filed Oct. 27, 2006, Emmett Dudley Crawford, et al.

U.S. Appl. No. 11/635,433, filed Dec. 7, 2006, Emmett Dudley Crawford.

Copending U.S. Appl. No. 12/361,779, filed Jan. 29, 2009, Emmett Dudley Crawford, et al.

Copending U.S. Appl. No. 12/365,515, filed Feb. 4, 2009, Emmett Dudley Crawford, et al.

USPTO Office Action dated Jan. 29, 2009 for copending U.S. Appl. No. 11/588,524.

USPTO Office Action dated Jan. 30, 2009 for copending U.S. Appl. No. 11/588,458.

USPTO Office Action dated Feb. 2, 2009 for copending U.S. Appl. No. 11/390,853.

Scheirs, John, et al., "Modern Polyesters: Chemistry and Technology of Polyesters and Copolyesters," Technology & Engineering, 2003, p. 287.

USPTO Office Action dated Jan. 21, 2009 for copending U.S. Appl. No. 11/390,847.

USPTO Office Action dated Jan. 12, 2009 for copending U.S. Appl. No. 11/390,858.

USPTO Office Action dated Jan. 26, 2009 for copending U.S. Appl. No. 11/391,659.

USPTO Office Action dated Jan. 26, 2009 for copending U.S. Appl. No. 11/588,554.

USPTO Office Action dated Feb. 3, 2009 for copending U.S. Appl. No. 11/391,505.

USPTO Office Action dated Feb. 10, 2009 for copending U.S. Appl. No. 11/390,865.
USPTO Office Action dated Feb. 12, 2009 for copending U.S. Appl. No. 11/439,062.
USPTO Office Action dated Feb. 13, 2009 for copending U.S. Appl. No. 11/439,340.
Copending U.S. Appl. No. 12/254,894, filed Oct. 21, 2008, Gary Michael Stack, et al.
USPTO Office Action dated Oct. 22, 2008 for copending U.S. Appl. No. 11/391,125.
USPTO Office Action dated Oct. 20, 2008 for copending U.S. Appl. No. 11/390,672.
USPTO Office Action dated Oct. 8, 2008 for copending U.S. Appl. No. 11/390,853.
USPTO Office Action dated Oct. 9, 2008 for copending U.S. Appl. No. 11/391,505.
USPTO Notice of Allowance dated Oct. 7, 2008 for copending U.S. Appl. No. 11/390,908.
USPTO Office Action dated Oct. 14, 2008 for copending U.S. Appl. No. 11/390,811.
USPTO Office Action dated Oct. 22, 2008 for copending U.S. Appl. No. 11/390,750.
USPTO Office Action dated Oct. 22, 2008 for copending U.S. Appl. No. 11/390,865.
USPTO Office Action dated Oct. 14, 2008 for copending U.S. Appl. No. 11/390,654.
USPTO Office Action dated Oct. 20, 2008 for copending U.S. Appl. No. 11/390,836.
Copending U.S. Appl. No. 12/294,690, filed Sep. 26, 2008, Ted Calvin Germroth et al.
Copending U.S. Appl. No. 12/294,686, filed Sep. 26, 2008, Ted Calvin Germroth et al.
USPTO Office Action dated Sep. 10, 2008 for copending U.S. Appl. No. 11/390,752.
USPTO Office Action dated Sep. 10, 2008 for copending U.S. Appl. No. 11/390,794.
USPTO Office Action dated Sep. 19, 2008 for copending U.S. Appl. No. 11/391,565.
USPTO Office Action dated Oct. 2, 2008 for copending U.S. Appl. No. 11/390,671.
USPTO Office Action dated Sep. 24, 2008 for copending U.S. Appl. No. 11/390,631.
USPTO Office Action dated Oct. 1, 2008 for copending U.S. Appl. No. 11/390,655.
USPTO Office Action dated Sep. 29, 2008 for copending U.S. Appl. No. 11/391,137.
USPTO Office Action dated Sep. 9, 2008 for copending U.S. Appl. No. 11/391,571.
USPTO Office Action dated Jun. 3, 2008 for copending U.S. Appl. No. 11/391,063.
USPTO Office Action dated Apr. 16, 2008 for copending U.S. Appl. No. 11/390,751.
U.S. Appl. No. 12/091,572, filed Apr. 25, 2008, Ted Calvin Germroth, et al.
U.S. Appl. No. 11/827,696, filed Jul. 13, 2007, Ryan Thomas Neill, et al.
U.S. Appl. No. 12/091,568, filed Apr. 25, 2008, Emmett Dudley Crawford, et al.
U.S. Appl. No. 12/091,566, filed Apr. 25, 2008, Emmett Dudley Crawford, et al.
U.S. Appl. No. 12/091,570, filed Apr. 25, 2008, Ted Calvin Germroth, et al.
USPTO Office Action dated Apr. 17, 2008 for copending U.S. Appl. No. 11/390,814.
"Plastic Additives Handbook," 5th Edition, 2001, pp. 98-108 and pp. 109-112 (Hanser Gardner Publications, Inc., Cincinnati, OH.
Bergen, R. L., Jr., "Stress Cracking of Rigid Thermoplastics," SPE Journal, Jun. 1962.
U.S. Appl. No. 11/439,062, filed May 23, 2006, Wesley Raymond Hale, et al.
U.S. Appl. No. 11/439,340, filed May 23, 2006, Wesley Raymond Hale.

U.S. Appl. No. 11/706,476, filed Feb. 14, 2007, Leslie Shane Moody, et al.
U.S. Appl. No. 11/706,791, filed Feb. 14, 2007, Leslie Shane Moody, et al.
Chapter 4—*Processing of Plastics in "Plastics Engineering, 3rd ed"*, R.J. Crawford, Butterworth-Heinemann Publisher, 1998, Oxford, England, pp. 245-342.
Fox equation (T.G. Fox, Session J, Bull. Am. Phys. Soc., 1, 123 (1956)).
*The Technology of Plasticizers*, by J. Kern Sears and Joseph R Darby, published by Society of Plastic Engineers/Wiley and Sons, New York, 1982; pp. 136-139.
Coleman et al., "Polymer Reviews—A Practical Guide to Polymer Miscibility," *Polymer 31*, pp. 1187-1203 (1990).
"*Hansen Solubility Parameters, a Users Handbook*", by Charles M. Hansen, Chapter 1, CRC Press, 2000, pp. 1-24.
Martinez et al., "*Phase Behavior and Mechanical Properties of Injection Molded Poly (Ethylene Terephthalate ) / Polyarylate Blends*"; Journal of Applied Polymer Science, John Wiley and Sons Inc. New York, US, vol. 45, No. 7, Jul. 5, 1992, p. 1135-1143.
Won Ho Jo et al. : :*Miscibility of poly(ether imide)/poly(ethylene terephthalate) blends*; Polymer Bulletin, Springer, Heidelberg, DE, vol. 33, No. 1, Jun. 1, 1994, p. 113-118 (1994).
Anonymous: "*Poly (ethylene naphthalenedicarboxylate)/ polyetherimide blends*" Research Disclosure, Mason Publications, Hampshire, GB, vol. 283, No. 38, Nov. 1987.
ASTM D1525-06, *Standard Test Method for Vicat Softening Temperature of Plastics*, Mar. 15, 2006.
ASTM D648-06, *Standard Test Method for Deflection Temperature of Plastics Under Flexural Load in the Edgewise Position*, Mar. 15, 2006.
ASTM D256-06, *Standard Test Methods for Determining the Izod Pendulum Impact Resistance of Plastics*, Mar. 15, 2006.
ASTM D790-03, *Standard Test Methods for Flexural Properties of Unreinforced and Reinforced Plastics and Electrical Insulating Materials*, Mar. 10, 2003.
ASTM D638-03, *Standard Test Method for Tensile Properties of Plastics*, Dec. 1, 2003.
ASTM D3418-03, *Transition Temperatures and Enthalpies of Fusion and Crystallization of Polymers by Differential Scanning Calorimetry*, Dec. 1, 2003.
Shearer, N.H., "T18-Type 1 Polyesters," Mar. 1996, SPE Annual Technical Conference and Exhibition, XP009080224.
Database WPI, Section Ch, Week 200536, Derwent Publications Ltd., London, GB; AN 2005-355258, XP002396922 & WO 2005-030833 A1 (Kanebo Ltd) Apr. 7, 2005 abstract.
Gachter, Muller, "Taschenbuch der Kunststoff-Additive," 1990, Carl Hanser Verlag Munchen Wien, XP002450422, pp. 96-97.
Gachter, Muller, "Kunststoff-Additive," 1990, Carl Hanser Verlag Munchen Wien, XP002449987, pp. 96-99.
USPTO Office Action dated Oct. 29, 2008 for copending U.S. Appl. No. 11/390,955.
USPTO Office Action dated Nov. 3, 2008 for copending U.S. Appl. No. 11/390,883.
USPTO Office Action dated Oct. 29, 2008 for copending U.S. Appl. No. 11/390,864.
USPTO Notice of Allowance dated Nov. 3, 2008 for copending U.S. Appl. No. 11/391,642.
USPTO Office Action dated Oct. 31, 2008 for copending U.S. Appl. No. 11/391,156.
USPTO Office Action dated Oct. 30, 2008 for copending U.S. Appl. No. 11/391,495.
USPTO Office Action dated Nov. 3, 2008 for copending U.S. Appl. No. 11/391,485.
Copending U.S. Appl. No. 12/338,453, filed Dec. 18, 2008, Emmett Dudley Crawford, et al.
Copending U.S. Appl. No. 12/274,692, filed Nov. 11, 2008, Thomas Joseph Pecorini, et al.
USPTO Office Action dated Dec. 19, 2008 for copending U.S. Appl. No. 11/390,751.
USPTO Office Action dated Dec. 31, 2008 for copending U.S. Appl. No. 11/390,827.

USPTO Office Action dated Dec. 31, 2008 for copending U.S. Appl. No. 11/390,826.
USPTO Office Action dated Nov. 14, 2008 for copending U.S. Appl. No. 11/390,630.
USPTO Office Action dated Dec. 19, 2008 for copending U.S. Appl. No. 11/391,576.
USPTO Office Action dated Dec. 19, 2008 for copending U.S. Appl. No. 11/390,629.
USPTO Office Action dated Dec. 31, 2008 for copending U.S. Appl. No. 11/390,773.
USPTO Office Action dated Nov. 14, 2008 for copending U.S. Appl. No. 11/390,882.
USPTO Office Action dated Dec. 12, 2008 for copending U.S. Appl. No. 11/391,063.
USPTO Office Action dated Dec. 19, 2008 for copending U.S. Appl. No. 11/390,814.
USPTO Office Action dated Dec. 31, 2008 for copending U.S. Appl. No. 11/390,722.
USPTO Office Action dated Sep. 29, 2009 for copending U.S. Appl. No. 11/390,814.
USPTO Office Action dated Oct. 21, 2009 for copending U.S. Appl. No. 11/391,156.
USPTO Office Action dated Oct. 22, 2009 for copending U.S. Appl. No. 11/588,906.
USPTO Office Action dated Nov. 17, 2009 for copending U.S. Appl. No. 12/254,894.
USPTO Office Action dated Nov. 18, 2009 for copending U.S. Appl. No. 11/390,630.
USPTO Office Action dated Nov. 30, 2009 for copending U.S. Appl. No. 11/391,495.
USPTO Office Action dated Nov. 18, 2009 for copending U.S. Appl. No. 11/390,794.
USPTO Office Action dated Nov. 20, 2009 for copending U.S. Appl. No. 11/391,485.
USPTO Office Action dated Nov. 20, 2009 for copending U.S. Appl. No. 11/390,882.
USPTO Office Action dated Dec. 1, 2009 for copending U.S. Appl. No. 12/091,570.
USPTO Office Action dated Dec. 3, 2009 for copending U.S. Appl. No. 11/395,505.
USPTO Office Action dated Dec. 4, 2009 for copending U.S. Appl. No. 12/091,566.
USPTO Office Action dated Dec. 18, 2009 for copending U.S. Appl. No. 11/390,846.
Gupta, V.B. et al., "PET Fibers, Films, and Bottles: Section 5-7", Handbook of Thermoplastic Polyesters: Homopolymers, Copolymers, Blends, and Composites, 2005, pp. 362-388, Wiley InterScience.
Turner, S.R., et al., "Amorphous and Crystalline Polyesters based on 1,4-Cyclohexanedimethanol", Chapter 7, Modern Polyesters: Chemistry and Technology of Polyesters and Copolyesters, Edited by J. Sheirs and T.E. Long, 2003 John Wiley & Sons, Ltd., pp. 267-292.
Zipper, Marcus D. et al., "A Free Volume Study of Miscible Polyester Blends," 1995, pp. 127-136, Polymer International, vol. 36.
APEC High-Heat Polycarbonate Resin, 2004, Bayer Material Science Product Information.
Lobo, Hubert et al, "Handbook of Plastics Analysis," 2003, pp. 20 and 21, Marcel Dekker, Inc.
USPTO Office Action dated Feb. 25, 2009 for copending U.S. Appl. No. 11/588,907.
USPTO Office Action dated Feb. 25, 2009 for copending U.S. Appl. No. 11/588,527.
USPTO Office Action dated Feb. 27, 2009 for copending U.S. Appl. No. 11/390,955.
USPTO Office Action dated Feb. 25, 2009 for copending U.S. Appl. No. 11/588,906.
USPTO Office Action dated Feb. 25, 2009 for copending U.S. Appl. No. 11/588,883.
USPTO Office Action dated Mar. 5, 2009 for copending U.S. Appl. No. 11/390,864.
USPTO Office Action dated Mar. 6, 2009 for copending U.S. Appl. No. 11/391,156.
USPTO Office Action dated Feb. 25, 2009 for copending U.S. Appl. No. 11/390,811.
USPTO Office Action dated Feb. 27, 2009 for copending U.S. Appl. No. 11/390,654.
USPTO Office Action dated Feb. 27, 2009 for copending U.S. Appl. No. 11/390,836.
USPTO Office Action dated Mar. 13, 2009 for copending U.S. Appl. No. 11/390,883.
USPTO Office Action dated Mar. 11, 2009 for copending U.S. Appl. No. 11/390,630.
USPTO Office Action dated Mar. 9, 2009 for copending U.S. Appl. No. 11/391,495.
USPTO Office Action dated Mar. 9, 2009 for copending U.S. Appl. No. 11/390,750.
Copending U.S. Appl. No. 12/390,694, filed Feb. 23, 2009, Gary Michael Stack.
USPTO Office Action dated Apr. 17, 2009 for copending U.S. Appl. No. 11/391,565.
USPTO Office Action dated Apr. 15, 2009 for copending U.S. Appl. No. 12/091,566.
USPTO Office Action dated Apr. 17, 2009 for copending U.S. Appl. No. 11/390,671.
USPTO Office Action dated Apr. 20, 2009 for copending U.S. Appl. No. 11/390,631.
USPTO Office Action dated Apr. 27, 2009 for copending U.S. Appl. No. 11/390,655.
USPTO Office Action dated Apr. 27, 2009 for copending U.S. Appl. No. 11/391,137.
USPTO Office Action dated Apr. 16, 2009 for copending U.S. Appl. No. 12/091,570.
USPTO Office Action dated Apr. 2, 2009 for copending U.S. Appl. No. 11/390,793.
USPTO Office Action dated Mar. 31, 2009 for copending U.S. Appl. No. 11/390,563.
USPTO Notice of Allowance dated Apr. 13, 2009 for copending U.S. Appl. No. 11/391,063.
USPTO Office Action dated Mar. 16, 2009 for copending U.S. Appl. No. 11/391,485.
USPTO Office Action dated Mar. 16, 2009 for copending U.S. Appl. No. 11/390,882.
USPTO Office Action dated Mar. 23, 2009 for copending U.S. Appl. No. 11/390,752.
USPTO Office Action dated Mar. 23, 2009 for copending U.S. Appl. No. 11/390,794.
USPTO Office Action dated May 13, 2009 for copending U.S. Appl. No. 12/361,779.
USPTO Office Action dated May 13, 2009 for copending U.S. Appl. No. 12/365,515.
USPTO Office Action dated May 21, 2009 for copending U.S. Appl. No. 11/706,476.
USPTO Office Action dated May 22, 2009 for copending U.S. Appl. No. 11/706,791.
USPTO Office Action dated May 18, 2009 for copending U.S. Appl. No. 11/391,505.
USPTO Office Action dated Apr. 14, 2009 for copending U.S. Appl. No. 11/635,433.
USPTO Office Action dated May 18, 2009 for copending U.S. Appl. No. 11/390,846.
New Copending U.S. Appl. No. 12/479,893, filed Jun. 8, 2009, Emmett Dudley Crawford, et al.
USPTO Office Action dated Jun. 11, 2009 for copending U.S. Appl. No. 11/390,809.
USPTO Office Action dated Jul. 2, 2009 for copending U.S. Appl. No. 11/390,827.
USPTO Office Action dated Aug. 7, 2009 for copending U.S. Appl. No. 11/390,773.
USPTO Office Action dated Aug. 10, 2009 for copending U.S. Appl. No. 11/390,722.
USPTO Office Action dated Aug. 27, 2009 for copending U.S. Appl. No. 11/390,826.
USPTO Office Action dated Sep. 2, 2009 for copending U.S. Appl. No. 11/391,124.

USPTO Office Action dated Sep. 10, 2009 for copending U.S. Appl. No. 11/390,812.
USPTO Office Action dated Sep. 14, 2009 for copending U.S. Appl. No. 11/391,576.
USPTO Office Action dated Sep. 24, 2009 for copending U.S. Appl. No. 11/588,883.
USPTO Office Action dated Sep. 24, 2009 for copending U.S. Appl. No. 11/390,858.
USPTO Office Action dated Sep. 28, 2009 for copending U.S. Appl. No. 11/390,847.
USPTO Office Action dated Sep. 29, 2009 for copending U.S. Appl. No. 11/390,629.
USPTO Office Action dated Sep. 29, 2009 for copending U.S. Appl. No. 11/390,751.
USPTO Office Action dated Sep. 29, 2009 for copending U.S. Appl. No. 11/390,814.
USPTO Office Action dated Oct. 2, 2009 for copending U.S. Appl. No. 11/588,524.
USPTO Office Action dated Oct. 7, 2009 for copending U.S. Appl. No. 11/588,458.
Ellis, Thomas S., "Miscibility of Polyamide Blends: Effects of Configuration," Polymer, vol. 36, Issue 20, 1995, pp. 3919-3926.
Dixon, E.R. et al., "The Inter-Relation of Some Mechanical Properties with Molecular Weight and Crystallinity in Poly(ethylene terephthalate)," 1968, pp. 464-470, Journal of Materials Science, vol. 3.
Shearer, N.H., "T18-Type 1 Polyesters," Mar. 1966, SPE Annual Technical Conference and Exhibition, XP009080224 (correcting date of reference; previously cited in IDS submitted on Jun. 1, 2007).
Buschow, K.H.J. et al., "Packaging: Polymers for Containers," Encyclopedia of Materials: Science and Technology, 2001, vol. 8, pp. 6646-6652, El Sevier.
Coles, Richard, et al., Food Packaging Technology, 2003, pp. 194-195 and 224-229, Blackwell Publishing.
Sajiki and Yonekubo, "Leaching of Bisphenol A (BPA) to Seawater from Polycarbonate Plastic and its Degradation by Reactive Oxygen Species," 2003, Chemosphere, 51, pp. 55-62.
USPTO Office Action dated Oct. 19, 2009 for copending U.S. Appl. No. 11/390,563.
USPTO Office Action dated Oct. 19, 2009 for copending U.S. Appl. No. 11/390,563.
USPTO Office Action dated Oct. 20, 2009 for copending U.S. Appl. No. 11/588,907.
USPTO Office Action dated Oct. 21, 2009 for copending U.S. Appl. No. 11/391,156.
USPTO Office Action dated Oct. 22, 2009 for copending U.S. Appl. No. 11/588,906.
Gupta, V.B. et al.,"PET Fibers, Films, and Bottles: Section 5-7," Handbook of Thermoplastic Polyesters: Homopolymers, Copolymers, Blends, and Composites, 2005, pp. 362-388, Wiley InterScience.
USPTO Office Action dated Nov. 3, 2009, for copending U.S. Appl. No. 11/390,883.
USPTO Office Action dated Nov. 4, 2009, for copending U.S. Appl. No. 11/390,750.
USPTO Office Action dated Nov. 4, 2009, for copending U.S. Appl. No. 11/390,864.
USPTO Office Action dated Jan. 13, 2010 for copending U.S. Appl. No. 11/635,433.
USPTO Office Action dated Jan. 14, 2010 for copending U.S. Appl. No. 11/390,809 .
USPTO Notice of Allowance dated Feb. 16, 2010 for copending U.S. Appl. No. 12/365,515.
USPTO Copending U.S. Appl. No. 12/724,492 filed Mar. 16, 2010.
USPTO Copending U.S. Appl. No. 12/724,480 filed Mar. 16, 2010.
USPTO Copending U.S. Appl. No. 12/724,468 filed Mar. 16, 2010.
USPTO Office Action dated Mar. 11, 2010 for copending U.S. Appl. No. 11/391,124.
USPTO Office Action dated Mar. 19, 2010 for copending U.S. Appl. No. 11/588,527.
USPTO Office Action dated Mar. 25, 2010 for copending U.S. Appl. No. 11/391,565.
USPTO Office Action dated Mar. 29, 2010 for copending U.S. Appl. No. 11/390,812.
USPTO Notice of Allowance dated Mar. 31, 2010 for copending U.S. Appl. No. 12/361,779.
USPTO Office Action dated Apr. 5, 2010 for copending U.S. Appl. No. 11/773,275.
USPTO Office Action dated Apr. 19, 2010 for copending U.S. Appl. No. 12/724,480.
USPTO Office Action dated Apr. 21, 2010 for copending U.S. Appl. No. 12/724,468.
USPTO Office Action dated Apr. 21, 2010 for copending U.S. Appl. No. 12/724,492.

* cited by examiner

POLYESTER COMPOSITIONS WHICH COMPRISE CYCLOBUTANEDIOL, CYCLOHEXANEDIMETHANOL, AND ETHYLENE GLYCOL AND MANUFACTURING PROCESSES THEREFOR

CROSS-REFERENCES TO RELATED APPLICATIONS

This application claims the benefit of: U.S. Provisional Application Ser. No. 60/750,692 filed on Dec. 15, 2005, U.S. Provisional Application Ser. No. 60/750,693, filed on Dec. 15, 2005, U.S. Provisional Application Ser. No. 60/750,682, filed on Dec. 15, 2005, and U.S. Provisional Application Ser. No. 60/750,547, filed on Dec. 15, 2005, U.S. application Ser. No. 60/786,572 filed Mar. 28, 2006; U.S. application Ser. No. 60/786,596 filed Mar. 28, 2006; U.S. application Ser. No. 60/786,547 filed Mar. 28, 2006; U.S. application Ser. No. 60/786,571 filed Mar. 28, 2006; U.S. application Ser. No. 60/786,598 filed Mar. 28, 2006; this application is a continuation in part application of and claims the benefit of: U.S. application Ser. No. 11/390,672 filed on Mar. 28, 2006; U.S. application Ser. No. 11/390,752 filed on Mar. 28, 2006; U.S. application Ser. No. 11/390,794 filed on Mar. 28, 2006; U.S. application Ser. No. 11/391,565 filed on Mar. 28, 2006; U.S. application Ser. No. 11/390,671 filed on Mar. 28, 2006; U.S. application Ser. No. 11/390,853 filed on Mar. 28, 2006; U.S. application Ser. No. 11/390,631 filed on Mar. 28, 2006; and U.S. application Ser. No. 11/390,655 filed on Mar. 28, 2006; U.S. application Ser. No. 11/391,125 filed on Mar. 28, 2006; U.S. application Ser. No. 11/390,751 filed Mar. 28, 2006; U.S. application Ser. No. 11/390,955 filed Mar. 28, 2006; U.S. application Ser. No. 11/390,827 filed Mar. 28, 2006; U.S. application Ser. No. 11/390,883 filed Mar. 28, 2006; U.S. application Ser. No. 11/390,846 filed Mar. 28, 2006; U.S. application Ser. No. 11/390,809 filed Mar. 28, 2006; U.S. application Ser. No. 11/390,812 filed Mar. 28, 2006; U.S. application Ser. No. 11/391,124 filed Mar. 28, 2006; U.S. application Ser. No. 11/390,908 filed Mar. 28, 2006; U.S. application Ser. No. 11/390,793 filed Mar. 28, 2006; U.S. application Ser. No. 11/391,642 filed Mar. 28, 2006; U.S. application Ser. No. 11/390,826 filed Mar. 28, 2006; U.S. application Ser. No. 11/390,563 filed Mar. 28, 2006; U.S. application Ser. No. 11/390,847 filed Mar. 28, 2006; U.S. application Ser. No. 11/391,156 filed Mar. 28, 2006; U.S. application Ser. No. 11/390,630 filed Mar. 28, 2006; U.S. application Ser. No. 11/391,495 filed Mar. 28, 2006; U.S. application Ser. No. 11/391,576 filed Mar. 28, 2006; U.S. application Ser. No. 11/390,858 filed Mar. 28, 2006; U.S. application Ser. No. 11/390,629 filed Mar. 28, 2006; U.S. application Ser. No. 11/391,485 filed Mar. 28, 2006; U.S. application Ser. No. 11/390,811 filed Mar. 28, 2006; U.S. application Ser. No. 11/390,750 filed Mar. 28, 2006; U.S. application Ser. No. 11/390,773 filed Mar. 28, 2006; U.S. application Ser. No. 11/390,865 filed Mar. 28, 2006; U.S. application Ser. No. 11/390,654 filed Mar. 28, 2006; U.S. application Ser. No. 11/390,882 filed Mar. 28, 2006; U.S. application Ser. No. 11/390,836 filed Mar. 28, 2006; U.S. application Ser. No. 11/391,063 filed Mar. 28, 2006; U.S. application Ser. No. 11/390,814 filed Mar. 28, 2006; U.S. application Ser. No. 11/390,722 filed Mar. 28, 2006; U.S. application Ser. No. 11/391,659 filed Mar. 28, 2006; U.S. application Ser. No. 11/391,137 filed Mar. 28, 2006; U.S. application Ser. No. 11/391,505 filed Mar. 28, 2006; U.S. application Ser. No. 11/390,864 filed Mar. 28, 2006; U.S. application Ser. No. 11/391,571 filed Mar. 28, 2006, U.S. application Ser. No. 11/588,524 filed Oct. 27, 2006, U.S. application Ser. No. 11/588,458 filed Oct. 27, 2006, U.S. application Ser. No. 11/588,907 filed Oct. 27, 2006, U.S. application Ser. No. 11/588,527 filed Oct. 27, 2006, U.S. application Ser. No. 11/588,906 filed Oct. 27, 2006, U.S. application Ser. No. 11/588,554 filed Oct. 27, 2006; and this application is a continuation in part application of and claims the benefit of U.S. application Ser. No. 11/588,883 filed Oct. 27, 2006; U.S. application Ser. No. 11/439,062 filed May 23, 2006, U.S. application Ser. No. 11/439,340 filed May 23, 2006; PCT/US06/41917 filed on Oct. 27, 2006; PCT/US06/42069 filed on Oct. 27, 2006; PCT/US06/42291 filed on Oct. 27, 2006; PCT/US06/42292 filed on Oct. 27, 2006; and PCT/US06/42293 filed on Oct. 27, 2006.

FIELD OF THE INVENTION

The present invention generally relates to polyester compositions made from terephthalic acid, or an ester thereof, and mixtures thereof, 2,2,4,4-tetramethyl-1,3-cyclobutanediol, cyclohexanedimethanol, and ethylene glycol, or chemical equivalents that have certain combinations of two or more of high notched Izod impact strength, certain glass transition temperature ($T_g$), certain flexural modulus, good clarity, and good color, which allow them to be easily formed into articles, for example, thermoformed sheet and film applications.

BACKGROUND OF THE INVENTION

Certain commercial polymers, such as bisphenol A polycarbonates, are believed to have glass transition temperatures and notched Izod impact strength desirable for thermoformed film and sheet but are believed to require drying prior to thermoforming. Other commercial polymers, such as acrylics and certain impact modified acrylics, are believed to have the glass transition temperatures desired for thermoformed film and sheet and are not believed to require drying prior to thermoforming; however, they are believed to have room temperature notched Izod impact strengths of typically less than 2 ft-lb/in which is often not desirable for certain end use applications. Thus, there is a commercial need for a polymeric material with a combination of properties making it ideal for thermoformed film and sheet applications including a combination of two or more of high notched Izod impact strength, certain inherent viscosities, certain glass transition temperature ($T_g$), certain flexural modulus, good clarity, and good color.

In addition, there is a commercial need for a polymeric material with a combination of properties making it desirable for thermoformed film and sheet applications including a combination of three or more of high notched Izod impact strength, certain glass transition temperature ($T_g$), certain flexural modulus, good clarity, and good color.

Further, there is a commercial need for a polymeric material with a combination of properties making it desirable for thermoformed film and sheet applications including a combination of all of the following properties: high notched Izod impact strength, certain glass transition temperature ($T_g$), certain flexural modulus, good clarity, and good color.

In addition, in one embodiment, there is a need in the art for polyesters comprising 2,2,4,4-tetramethyl-1,3-cyclobutanediol, ethylene glycol, and, cyclohexanedimethanol, which have good color and/or good clarity and for process(es) to prepare these polyesters.

Further, in one embodiment, there is a need in the art for a process which makes it easier to produce the polyesters of the inventions without at least one of the following occurring:

bubbling, splay formation, color formation, foaming, off-gassing, and erratic melt levels, i.e., pulsating of the polyester or the polyester's production and processing systems. There is also a need in the art for a process which makes it easier to produce the polyesters of the invention in large quantities (for example, pilot run scale and/or commercial production) without at least one of the aforesaid difficulties occurring.

SUMMARY OF THE INVENTION

It is believed that certain polyester compositions formed from terephthalic acid, an ester thereof, and/or mixtures thereof, ethylene glycol, 2,2,4,4-tetramethyl-1,3-cyclobutanediol, and cyclohexanedimethanol, comprising certain thermal stabilizers, reaction products thereof, and mixtures thereof, are superior to certain commercial polymers with respect to one or more of high Notched Izod impact strength, certain inherent viscosities, certain glass transition temperature ($T_g$), certain flexural modulus, good clarity, and good color.

In other embodiments of the invention, there is a commercial need for a polymeric material with a combination of properties making it desirable for certain applications, for example, thermoformed film and sheet applications, including a combination of two or more of the following properties: high notched Izod impact strength, certain inherent viscosities, certain glass transition temperature ($T_g$), certain flexural modulus, good clarity, and good color.

In other embodiments of the invention, there is a commercial need for a polymeric material with a combination of properties making it desirable for certain applications, for example, thermoformed film and sheet applications, including a combination of three or more of the following properties: high notched Izod impact strength, certain inherent viscosities, certain glass transition temperature ($T_g$), certain flexural modulus, good clarity, and good color.

In other embodiments of the invention, there is a commercial need for a polymeric material with a combination of properties making it desirable for certain applications, for example, thermoformed film and sheet applications, including a combination of two or more of the following properties: high notched Izod impact strength, certain glass transition temperature ($T_g$), and certain flexural modulus.

In one embodiment, it is believed that when at least one phosphorus compound described herein is used during the processes of making the polyesters according to the present invention, the polyesters can be more easily produced without at least one of the following occurring: bubbling, splay formation, color formation, foaming, off-gassing, and erratic melt levels, i.e., pulsating of the polyester or the polyester's production and processing systems. In another embodiment, it is believed that at least one process of the invention provides a means to more easily produce the polyesters useful in the invention in large quantities (for example, pilot run scale and/or commercial production) without at least one of the aforesaid difficulties occurring.

The term "large quantities" as used herein includes quantities of polyester(s) useful in the invention which are produced in quantities larger than 100 pounds. In one embodiment, the term "large quantities", as used herein, includes quantities of polyester(s) useful in the invention which are produced in quantities larger than 1000 pounds.

In one aspect, the processes of making the polyesters useful in the invention can comprise a batch or continuous process.

In one aspect, the processes of making the polyesters useful in the invention comprise a continuous process.

In one aspect, the invention relates to a polyester composition comprising at least one polyester which comprises:
(a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
(b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
wherein the total mole % of the dicarboxylic acid component is 100 mole %, and
wherein the total mole % of the glycol component is 100 mole %;
wherein the sum of the mole percentages of 2,2,4,4-tetramethyl-1,3-cyclobutanediol and cyclohexanedimethanol is from 40 to less than 70 mole % of the total mole % of the glycol component, and
wherein the inherent viscosity of the polyester is from 0.50 to 1.2 dL/g as determined in 60/40 (wt/wt) phenol/tetrachloroethane at a concentration of 0.25 g/50 ml at 25° C.

In one aspect, this invention relates to a polyester composition comprising at least one polyester which comprises:
(a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
(b) a glycol component comprising:
    (i) about 20 to about 40 mole % 2,2,4,4-tetramethyl-1, 3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
wherein the total mole % of the dicarboxylic acid component is 100 mole %; and
wherein the total mole % of the glycol component is 100 mole %;
wherein the sum of the mole percentages of 2,2,4,4-tetramethyl-1,3-cyclobutanediol and cyclohexanedimethanol is from 40 to less than 70 mole % of the total mole % of the glycol component;
wherein the inherent viscosity of the polyester is from 0.50 to 1.2 dL/g as determined in 60/40 (wt/wt) phenol/tetrachloroethane at a concentration of 0.25 g/50 ml at 25° C.; and
optionally, wherein at least one branching agent is added before and/or during polymerization of the polyester.

In one aspect, the invention relates to a polyester composition comprising at least one polyester which comprises:
(a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
(b) a glycol component comprising:
    (i) about 20 to about 40 mole % 2,2,4,4-tetramethyl-1, 3-cyclobutanediol residues; and (ii) about 20 to about 40 mole % cyclohexanedimethanol residues;
(iii) ethylene glycol residues, and
(iv) less than about 2 mole % of a modifying glycol having from 3 to 16 carbon atoms;

wherein the total mole % of the dicarboxylic acid component is 100 mole %, and wherein the total mole % of the glycol component is 100 mole %;

wherein the sum of the mole percentages of 2,2,4,4-tetramethyl-1,3-cyclobutanediol and cyclohexanedimethanol is from 40 to less than 70 mole % of the total mole % of the glycol component, wherein the inherent viscosity of the polyester is from 0.50 to 1.2 dL/g as determined in 60/40 (wt/wt) phenol/tetrachloroethane at a concentration of 0.25 g/50 ml at 25° C.; and wherein the polyester has at least one of the following properties chosen from: a $T_g$ of from about 100 to about 110° C. as measured by a TA 2100 Thermal Analyst instrument at a scan rate of 20° C./min, a flexural modulus at 23° C. of greater than 290,000 psi as defined by ASTM D790, and a notched Izod impact strength greater than 10 ft-lb/in according to ASTM D256 with a 10-mil notch using a ⅛-inch thick bar at 23° C.

In one aspect, this invention relates to a polyester composition comprising:
(I) at least one polyester which comprises which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms; and
(II) at least one phosphorus compound chosen from at least one of alkyl phosphate esters, aryl phosphate esters, mixed alkyl aryl phosphate esters, reaction products thereof, and mixtures thereof;

wherein the total mole % of the dicarboxylic acid component is 100 mole %, and wherein the total mole % of the glycol component is 100 mole %;

wherein the sum of the mole percentages of 2,2,4,4-tetramethyl-1,3-cyclobutanediol and cyclohexanedimethanol is from 40 to less than 70 mole % of the total mole % of the glycol component, and wherein the inherent viscosity of the polyester is from 0.50 to 1.2 dL/g as determined in 60/40 (wt/wt) phenol/tetrachloroethane at a concentration of 0.25 g/50 ml at 25° C.;

wherein the polyester has at least one of the following properties chosen from: a $T_g$ of from about 100 to about 110° C. as measured by a TA 2100 Thermal Analyst instrument at a scan rate of 20° C./min, a flexural modulus at 23° C. of greater than 290,000 psi as defined by ASTM D790, and a notched Izod impact strength greater than 10 ft-lb/in according to ASTM D256 with a 10-mil notch using a ⅛-inch thick bar at 23° C.

In one aspect, this invention relates to a polyester composition comprising:
(I) at least one polyester which comprises which comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
  (c) optionally, at least one branching agent; and
(II) at least one phosphorus compound chosen from at least one of alkyl phosphate esters, aryl phosphate esters, mixed alkyl aryl phosphate esters;

wherein the total mole % of the dicarboxylic acid component is 100 mole %, and wherein the total mole % of the glycol component is 100 mole %;

wherein the sum of the mole percentages of 2,2,4,4-tetramethyl-1,3-cyclobutanediol and cyclohexanedimethanol is from 40 to less than 70 mole % of the total mole % of the glycol component, and wherein the inherent viscosity of the polyester is from 0.50 to 1.2 dL/g as determined in 60/40 (wt/wt) phenol/tetrachloroethane at a concentration of 0.25 g/50 ml at 25° C.

In one aspect, the invention relates to a process for making a polyester comprising the following steps:
(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
  wherein the molar ratio of glycol component/dicarboxylic acid component added in Step (I) is 1.01-3.0/1.0;
  wherein the mixture in Step (I) is heated in the presence of:
  (i) at least one catalyst comprising at least one tin compound, and, optionally, at least one catalyst chosen from titanium, gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;

wherein the total mole % of the dicarboxylic acid component of the final polyester is 100 mole %; and wherein the total mole % of the glycol component of the final polyester is 100 mole %;

wherein the sum of the mole percentages of 2,2,4,4-tetramethyl-1,3-cyclobutanediol and cyclohexanedimethanol of the final polyester is from 40 to less than 70 mole % of the total mole % of the glycol component, and wherein the inherent viscosity of the polyester is from 0.50 to 1.0 dL/g as determined in 60/40 (wt/wt) phenol/tetrachloroethane at a concentration of 0.25 g/50 ml at 25° C.

In one aspect, the invention relates to a process for making a polyester comprising the following steps:

(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
  wherein the molar ratio of glycol component/idicarboxylic acid component added in Step (I) is 1.01-3.0/1.0;
  wherein the mixture in Step (I) is heated in the presence of:
    (i) at least one catalyst comprising at least one titanium compound, and, optionally, at least one catalyst chosen from tin, gallium, zinc, antimony, cobalt, manganese, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;

wherein the total mole % of the dicarboxylic acid component of the final polyester is 100 mole %; and wherein the total mole % of the glycol component of the final polyester is 100 mole %;

wherein the sum of the mole percentages of 2,2,4,4-tetramethyl-1,3-cyclobutanediol and cyclohexanedimethanol of the final polyester is from 40 to less than 70 mole % of the total mole % of the glycol component, and wherein the inherent viscosity of the polyester is from 0.50 to 1.2 dL/g as determined in 60/40 (wt/wt) phenol/tetrachloroethane at a concentration of 0.25 g/50 ml at 25° C.

In one aspect, the invention relates to a process for making a polyester comprising the following steps:

(I) heating a mixture at at least one temperature chosen from 150° C. to 250° C., under at least one pressure chosen from the range of 0 psig to 75 psig wherein said mixture comprises:
  (a) a dicarboxylic acid component comprising:
    (i) about 90 to about 100 mole % of terephthalic acid residues;
    (ii) about 0 to about 10 mole % of aromatic and/or aliphatic dicarboxylic acid residues having up to 20 carbon atoms; and
  (b) a glycol component comprising:
    (i) about 20 to about 40 mole % 2,2,4,4-tetramethyl-1,3-cyclobutanediol residues; and
    (ii) about 20 to about 40 mole % cyclohexanedimethanol residues;
    (iii) ethylene glycol residues, and
    (iv) less than about 2 mole % of a modifying glycol having from 3 to 16 carbon atoms;
  wherein the molar ratio of glycol component/dicarboxylic acid component added in Step (I) is 1.01-3.0/1.0;
  wherein the mixture in Step (I) is heated in the presence of:
    (i) at least one catalyst comprising at least one titanium compound, at least one tin compound, and optionally, at least one catalyst chosen from gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;

wherein the total mole % of the dicarboxylic acid component of the final polyester is 100 mole %; and wherein the total mole % of the glycol component of the final polyester is 100 mole %;

wherein the sum of the mole percentages of 2,2,4,4-tetramethyl-1,3-cyclobutanediol and cyclohexanedimethanol of the final polyester is from 40 to less than 70 mole % of the total mole % of the glycol component, and wherein the inherent viscosity of the polyester is from 0.50 to 1.2 dL/g as determined in 60/40 (wt/wt) phenol/tetrachloroethane at a concentration of 0.25 g/50 ml at 25° C.

In one aspect, for the polyester(s) useful in the invention and for the processes useful in the invention, the b* values for the polyesters useful in the invention [in one embodiment, in the presence of and/or in the absence of toner(s)] can be from −12 to less than 12 as determined by the L*a*b* color system of the CIE (International Commission on Illumination) (translated), wherein L* represents the lightness coordinate, a* represents the red/green coordinate, and b* represents the yellow/blue coordinate. In one embodiment, the b* values for the polyesters useful in the invention [in one embodiment, in the presence of and/or in the absence of toner(s)] can be from 0 to 10. In one embodiment, the b* values for the polyesters useful in the invention [in one embodiment, in the presence of and/or in the absence of toner(s)] can be from 0 to 5.

In one aspect, the invention includes thermoformed sheet(s) which can comprise any of the polyester compositions of the invention.

In one aspect, the polyesters useful in the invention can comprise at least one phosphate ester whether or not present as a thermal stabilizer.

In one aspect, the polyesters useful in the invention can comprise at least one phosphate ester described herein which is present as a thermal stabilizer.

In one aspect, the polyesters useful in the invention contain no branching agent, or alternatively, at least one branching agent is added either prior to or during polymerization of the polyester.

In one aspect, the polyesters useful in the invention contain at least one branching agent without regard to the method or sequence in which it is added.

In one aspect, certain polyesters useful in the invention may be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

In one aspect, the polyesters, polyester compositions and/or processes of the invention can comprise at least one phosphorus compound.

In one aspect, the polyesters, polyester compositions and/or processes of the invention can comprise phosphorus atoms.

In one aspect, the polyesters and/or polyester compositions useful in the invention can comprise tin atoms.

In one aspect, the polyesters and/or polyester compositions useful in the invention can comprise titanium atoms.

In one aspect, the polyesters and/or polyester compositions useful in the invention can comprise titanium atoms and tin atoms.

In one aspect, the polyesters, polyester compositions and/or processes of the invention can comprise phosphorus atoms and tin atoms.

In one aspect, the polyesters, polyester compositions and/or processes of the invention can comprise phosphorus atoms and titanium atoms.

In one aspect, the polyesters, polyester compositions and/or processes of the invention can comprise phosphorus atoms, tin atoms, and titanium atoms.

In one aspect, any of the polyester(s), polyester compositions and/or processes of the invention may comprise at least one phosphorus compound.

In one aspect, any of the polyester(s), polyester compositions and/or processes of the invention may comprise at least one tin compound.

In one aspect, any of the polyester(s), polyester compositions and/or processes of the invention may comprise at least one tin compound and at least one phosphorus compound.

In one aspect, any of the polyester(s), polyester compositions and/or processes of the invention may comprise at least one titanium compound.

In one aspect, any of the polyester(s), polyester compositions and/or processes of the invention may comprise at least one titanium compound and at least one phosphorus compound.

In one aspect, any of the polyester(s), polyester compositions and/or processes of the invention may comprise at least one tin compound and, optionally, at least one catalyst chosen from titanium, gallium, zinc, antimony, cobalt, manganese, magnesium, germanium, lithium, aluminium compounds and an aluminum compound with lithium hydroxide or sodium hydroxide.

In one aspect, any of the polyester(s), polyester compositions and/or processes of making the polyesters useful in the invention may comprise at least one tin compound and at least one titanium compound.

In one aspect, any of the polyester(s), polyester compositions and/or processes of making the polyesters useful in the invention may comprise at least one tin compound, at least one titanium compound, and at least one phosphorus compound.

In one aspect, at least one phosphorus compound useful in the invention comprise phosphoric acid, phosphorous acid, phosphonic acid, phosphinic acid, phosphonous acid, and various esters and salts thereof. The esters can be alkyl, branched alkyl, substituted alkyl, difunctional alkyl, alkyl ethers, aryl, and substituted aryl.

In one aspect, at least one phosphorus compound useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed alkyl aryl phosphites, reaction products thereof, and mixtures thereof. The phosphate esters include esters in which the phosphoric acid is fully esterified or only partially esterified.

In one aspect, at least one phosphorus compound useful in the invention comprise at least one phoshorus compound chosen from at least one of substituted or unsubstituted alkyl phosphate esters, substituted or unsubstituted aryl phosphate esters, mixed substituted or unsubstituted alkyl aryl phosphate esters, reaction products thereof, and mixtures thereof. The phosphate esters include esters in which the phosphoric acid is fully esterified or only partially esterified.

In one aspect, at least one phosphorus compound useful in the invention are chosen from at least one of alkyl phosphate esters, aryl phosphate esters, mixed alkyl aryl phosphate esters, reaction products, thereof, and mixtures thereof.

In one aspect, at least one phosphorus compound useful in the invention may comprise at least one aryl phosphate ester.

In one aspect, at least one phosphorus compound useful in the invention may comprise at least one unsubstituted aryl phosphate ester.

In one aspect, at least one phosphorus compound useful in the invention may comprise at least one aryl phosphate ester which is not substituted with benzyl groups.

In one aspect, at least one phosphorus compound useful in the invention may comprise at least one triaryl phosphate ester.

In one aspect, at least one phosphorus compound useful in the invention may comprise at least one triaryl phosphate ester which is not substituted with benzyl groups.

In one aspect, at least one phosphorus compound useful in the invention may comprise at least one alkyl phosphate ester.

In one aspect, at least one phosphorus compound useful in the invention may comprise triphenyl phosphate and/or Merpol A. In one embodiment, any of the polyester compositions of the invention may comprise triphenyl phosphate.

In one aspect, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS# 154862-43-8).

In one aspect, any of the processes described herein for making any of the polyester compositions and/or polyesters can comprise at least one one phosphine oxide.

In one aspect, any of the processes described herein for making any of the polyester compositions and/or polyesters can comprise at least one salt of phosphoric acid such as, for example, $KH_2PO_4$ and $Zn_3(PO_4)_2$.

It is believed that any of the processes of making the polyesters useful in the invention may be used to make any of the polyesters useful in the invention.

In one aspect, the pressure used in Step (I) of any of the processes of the invention consists of at least one pressure chosen from 0 psig to 75 psig. In one embodiment, the pressure used in Step (I) of any of the processes of the invention consists of at least one pressure chosen from 0 psig to 50 psig.

In one aspect, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one aspect, the molar ratio of glycol component/dicarboxylic acid component added in Step (I) of any of the processes of the invention is 1.0-3.0/1.0; one aspect, the molar ratio of glycol component/dicarboxylic acid component added in Step (I) of any of the processes of the invention is 1.0-2.3/1.0; one aspect, the molar ratio of glycol component/idicarboxylic acid component added in Step (I) of any of the processes of the invention is 1.0-2.0/1.0; one aspect, the molar ratio of glycol component/dicarboxylic acid component added in Step (I) of any of the processes of the invention is 1.0-1.75/1.0; in one aspect, the molar ratio of glycol component/dicarboxylic acid component added in Step (I) of any of the processes of the invention is 1.0-1.5/1.0.

In one aspect, the molar ratio of glycol component/dicarboxylic acid component added in Step (I) of any of the processes of the invention is 1.01-3.0/1.0; one aspect, the molar ratio of glycol component/dicarboxylic acid component added in Step (I) of any of the processes of the invention is 1.01-2.5/1.0; one aspect, the molar ratio of glycol component/dicarboxylic acid component added in Step (I) of any of the processes of the invention is 1.01-2.0/1.0; one aspect, the molar ratio of glycol component/dicarboxylic acid component added in Step (I) of any of the processes of the invention is 1.01-1.75/1.0; in one aspect, the molar ratio of glycol component/dicarboxylic acid component added in Step (I) of any of the processes of the invention is 1.01-1.5/1.0.

In any of the process embodiments for making the polyesters useful in the invention, the heating time of Step (II) may be from 1 to 5 hours. In any of the process embodiments for making the polyesters useful in the invention, the heating time of Step (II) may be from 1 to 4 hours. In any of the process embodiments for making the polyesters useful in the invention, the heating time of Step (II) may be from 1 to 3 hours. In any of the process embodiments for making the polyesters useful in the invention, the heating time of Step (II) may be from 1.5 to 3 hours. In any of the process embodiments for making the polyesters useful in the invention, the heating time of Step (II) may be from 1 to 2 hours.

In one aspect, the addition of the phosphorus compound(s) in the process(es) of the invention can result in a weight ratio of total phosphorus atoms to total tin atoms in the final polyester of 0-20:1. In one embodiment, the addition of the phosphorus compound(s) in the process(es) of the invention can result in a weight ratio of total phosphorus atoms to total tin atoms in the final polyester of 1-20:1.

In one aspect, the addition of the phosphorus compound(s) in the process(es) of the invention can result in a weight ratio of total phosphorus atoms to total tin atoms in the final polyester of 0-15:1. In one embodiment, the addition of the phosphorus compound(s) in the process(es) of the invention can result in a weight ratio of total phosphorus atoms to total tin atoms in the final polyester of 1-15:1.

In one aspect, the addition of the phosphorus compound(s) in the process(es) can result in a weight ratio of total phosphorus atoms to total tin atoms in the final polyester of 0-10:1. In one embodiment, the addition of the phosphorus compound(s) in the process(es) of the invention can result in a weight ratio of total phosphorus atoms to total tin atoms in the final polyester of 1-10:1.

In one aspect, the addition of the phosphorus compound(s) in the process(es) can result in a weight ratio of total phosphorus atoms to total tin atoms in the final polyester of 0-5:1. In one embodiment, the addition of the phosphorus compound(s) in the process(es) of the invention can result in a weight ratio of total phosphorus atoms to total tin atoms in the final polyester of 1-5:1.

In one aspect, the addition of the phosphorus compound(s) in the process(es) can result in a weight ratio of total phosphorus atoms to total tin atoms in the final polyester of 0-3:1. In one embodiment, the addition of the phosphorus compound(s) in the process(es) can result in a weight ratio of total phosphorus atoms to total tin atoms in the final polyester of 1-3:1.

For example, the weight of tin atoms and phosphorus atoms present in the final polyester can be measured in ppm and can result in a weight ratio of total phosphorus atoms to total tin atoms in the final polyester of any of the aforesaid weight ratios.

In one aspect, the addition of the phosphorus compound(s) in the process(es) of the invention can result in a weight ratio of total phosphorus atoms to total titanium atoms in the final polyester of 0-20:1. In one embodiment, the addition of the phosphorus compound(s) in the process(es) of the invention can result in a weight ratio of total phosphorus atoms to total titanium atoms in the final polyester of 1-20:1.

In one aspect, the addition of the phosphorus compound(s) in the process(es) of the invention can result in a weight ratio of total phosphorus atoms to total titanium atoms in the final polyester of 0-15:1. In one embodiment, the addition of the phosphorus compound(s) in the process(es) of the invention can result in a weight ratio of total phosphorus atoms to total titanium atoms in the final polyester of 1-15:1.

In one aspect, the addition of the phosphorus compound(s) in the process(es) can result in a weight ratio of total phosphorus atoms to total titanium atoms in the final polyester of 0-10:1. In one embodiment, the addition of the phosphorus compound(s) in the process(es) of the invention can result in a weight ratio of total phosphorus atoms to total titanium atoms in the final polyester of 1-10:1.

In one aspect, the addition of the phosphorus compound(s) in the process(es) can result in a weight ratio of total phosphorus atoms to total titanium atoms in the final polyester of 0-5:1. In one embodiment, the addition of the phosphorus compound(s) in the process(es) of the invention can result in a weight ratio of total phosphorus atoms to total titanium atoms in the final polyester of 1-5:1.

In one aspect, the addition of the phosphorus compound(s) in the process(es) can result in a weight ratio of total phosphorus atoms to total titanium atoms in the final polyester of 0-3:1. In one embodiment, the addition of the phosphorus compound(s) in the process(es) can result in a weight ratio of total phosphorus atoms to total titanium atoms in the final polyester of 1-3:1.

For example, the weight of titanium atoms and phosphorus atoms present in the final polyester can be measured in ppm and can result in a weight ratio of total phosphorus atoms to total titanium atoms in the final polyester of any of the aforesaid weight ratios.

In one aspect, the amount of tin atoms in the polyesters useful in the invention can be from 0 to 400 ppm tin atoms based on the weight of the final polyester.

In one aspect, the amount of tin atoms in the polyesters useful in the invention can be from 15 to 400 ppm tin atoms based on the weight of the final polyester.

In one aspect, the amount of titanium atoms in the polyesters useful in the invention can be from 0 to 400 ppm titanium atoms based on the weight of the final polyester.

In one aspect, the amount of titanium atoms in the polyesters useful in the invention can be from 15 to 400 ppm titanium atoms based on the weight of the final polyester.

In one aspect, the amount of phosphorus atoms in the polyesters useful in the invention can be from 1 to 500 ppm phosphorus atoms based on the weight of the final polyester.

In one aspect, the amount of phosphorus atoms in the polyesters useful in the invention can be from 1 to 500 ppm phosphorus atoms based on the weight of the final polyester and the amount of titanium atoms in the polyester can be from 1 to 100 ppm titanium atoms based on the weight of the final polyester.

In one aspect, the amount of phosphorus atoms in the polyesters useful in the invention can be from 1 to 500 ppm phosphorus atoms based on the weight of the final polyester and the amount of titanium atoms in the polyester can be from 1 to 400 ppm titanium atoms based on the weight of the final polyester.

In one aspect, the amount of phosphorus atoms in the polyesters useful in the invention can be from 1 to 500 ppm phosphorus atoms based on the weight of the final polyester and the amount of titanium atoms in the polyester can be from 1 to 100 ppm titanium atoms based on the weight of the final polyester.

In one aspect, the amount of phosphorus atoms in the polyester(s) useful in the invention can be from 1 to 500 ppm phosphorus atoms based on the weight of the final polyester, the amount of tin atoms in the polyester(s) useful in the invention can be from 1 to 400 ppm tin atoms based on the weight of the final polyester, and the amount of titanium atoms in the polyester can be from 1 to 100 ppm titanium atoms based on the weight of the final polyester.

In one aspect, the polyester compositions are useful in articles of manufacture including, but not limited to, extruded, calendered, and/or molded articles including, but not limited to, injection molded articles, extruded articles, cast extrusion articles, profile extrusion articles, melt spun articles, thermoformed articles, extrusion molded articles, injection blow molded articles, injection stretch blow molded articles, extrusion blow molded articles and extrusion stretch blow molded articles. These articles can include, but are not limited to, films, bottles, containers, sheet and/or fibers.

In one aspect, the polyester compositions useful in the invention may be used in various types of film and/or sheet, including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

In one aspect, the invention is related to thermoformed film(s) and/or sheet(s) comprising the polyester(s) and/or polyester compositions of the invention.

In one aspect, the invention is related to articles of manufacture which incorporate the thermoformed film and/or sheet of the invention.

Also, in one aspect, a process of making thermoformed film and/or sheet is provided wherein the step of drying the films and/or sheets prior to thermoforming is eliminated.

In one aspect, the invention provides a process for preparing polyesters containing ethylene glycol, 2,2,4,4-tetramethyl-1,3-cyclobutanediol, and cyclohexanedimethanol with improved color and/or clarity.

In one aspect, the polyesters useful in the invention can be amorphous or semicrystalline. In one aspect, certain polyesters useful in the invention can have a relatively low crystallinity. Certain polyesters useful in the invention can thus have a substantially amorphous morphology, meaning that the polyesters comprise substantially unordered regions of polymer.

DETAILED DESCRIPTION OF THE INVENTION

The present invention may be understood more readily by reference to the following detailed description of certain embodiments of the invention and the working examples. In accordance with the purpose(s) of this invention, certain embodiments of the invention are described in the Summary of the Invention and are further described herein below. Also, other embodiments of the invention are described herein.

It is believed that certain polyesters and/or polyester composition(s) of the invention formed from terephthalic acid, an ester thereof, and/or mixtures thereof, ethylene glycol, 2,2,4,4-tetramethyl-1,3-cyclobutanediol, cyclohexanedimethanol, and, optionally, comprising certain thermal stabilizers, reaction products thereof, and mixtures thereof, can have a unique combination of two or more of the following properties: high notched Izod impact strengths, certain inherent viscosities, certain glass transition temperature ($T_g$); certain flexural modulus, good clarity, and good color. In certain embodiments of the invention, certain polyesters and/or polyester compositions of the invention can have a unique combination of three or more of high notched Izod impact strength, certain inherent viscosities, certain glass transition temperature ($T_g$), certain flexural modulus, good clarity, and good color.

In certain embodiments of the invention, certain polyesters and/or polyester compositions of the invention can have a unique combination of four or more of high notched Izod impact strength, certain inherent viscosities, certain glass transition temperature ($T_g$), certain flexural modulus, good clarity, and good color.

In other embodiments of the invention, certain polyesters and/or polyester compositions of the invention can have a unique combination of all of the following properties: high notched Izod impact strength, certain inherent viscosities, certain glass transition temperature ($T_g$), certain flexural modulus, good clarity, and good color.

While polyesters and/or polyester compositions containing some or all of the aforementioned properties are useful in many applications, these properties are particularly useful for thermoformed sheet applications.

In one embodiment, copolyesters containing 2,2,4,4-tetramethyl-1,3-cyclobutanediol and ethylene glycol can be prepared with titanium based catalysts. In another embodiment, it is believed that the incorporation of 2,2,4,4-tetramethyl-1,3-cyclobutanediol and/or color can be further improved by use of tin based catalysts in addition to the titanium based catalysts. It is believed that the color of these copolyesters can be improved with the addition during polymerization of certain levels of phosphorus containing compounds.

In one embodiment, it is believed that when at least phosphorus compound described herein are used during the processes of making the polyesters according to the present invention, the polyesters can be more easily produced without at least one of the following occurring: bubbling, splay formation, color formation, foaming, off-gassing, and erratic melt levels, i.e., pulsating of the polyester or the polyester's production and processing systems. In another embodiment, it is believed that at least one process of the invention provides a means to more easily produce the polyesters useful in the invention in large quantities (for example, pilot run scale and/or commercial production) without at least one of the aforesaid difficulties occurring. The term "large quantities" as used herein includes quantities of polyester(s) useful in the invention which are produced in quantities larger than 100 pounds. In one embodiment, the term "large quantities", as used herein, includes quantities of polyester(s) useful in the invention which are produced in quantities larger than 1000 pounds.

In one embodiment, the processes of making the polyesters useful in the invention can comprise a batch or continuous process.

In one embodiment, the processes of making the polyesters useful in the invention comprise a continuous process.

When tin is added to to the polyesters and/or polyester compositions and/or process of making the polyesters of the invention, it is added to the process of making the polyester in the form of a tin compound. The amount of the tin compound added to the polyesters of the invention and/or polyester compositions of the invention and/or processes of the invention can be measured in the form of tin atoms present in the final polyester, for example, by weight measured in ppm.

When titanium is added to to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

When phosphorus is added to to the polyesters and/or polyester compositions and/or process of making the polyesters of the invention, it is added to the process of making the polyester in the form of a phosphorus compound. In one embodiment, this phosphorus compound can comprise at least one phosphate ester(s). The amount of phosphorus compound, [for example, phosphate ester(s)] added to the polyesters of the invention and/or polyester compositions of the invention and/or processes of the invention can be measured in the form of phosphorus atoms present in the final polyester, for example, by weight measured in ppm.

The term "polyester", as used herein, is intended to include "copolyesters" and is understood to mean a synthetic polymer prepared by the reaction of one or more difunctional carboxylic acids and/or multifunctional carboxylic acids with one or more difunctional hydroxyl compounds and/or multifunctional hydroxyl compounds, for example, branching agents. Typically the difunctional carboxylic acid can be a dicarboxylic acid and the difunctional hydroxyl compound can be a dihydric alcohol such as, for example, glycols and diols. The term "glycol" as used herein includes, but is not limited to, diols, glycols, and/or multifunctional hydroxyl compounds, for example, branching agents. Alternatively, the difunctional carboxylic acid may be a hydroxy carboxylic acid such as, for example, p-hydroxybenzoic acid, and the difunctional hydroxyl compound may be an aromatic nucleus bearing 2 hydroxyl substituents such as, for example, hydroquinone. The term "residue", as used herein, means any organic structure incorporated into a polymer through a polycondensation and/or an esterification reaction from the corresponding monomer. The term "repeating unit", as used herein, means an organic structure having a dicarboxylic acid residue and a diol residue bonded through a carbonyloxy group. Thus, for example, the dicarboxylic acid residues may be derived from a dicarboxylic acid monomer or its associated acid halides, esters, salts, anhydrides, and/or mixtures thereof. Furthermore, as used herein, the term "diacid" includes multifunctional acids, for example, branching agents. As used herein, therefore, the term "dicarboxylic acid" is intended to include dicarboxylic acids and any derivative of a dicarboxylic acid, including its associated acid halides, esters, half-esters, salts, half-salts, anhydrides, mixed anhydrides, and/or mixtures thereof, useful in a reaction process with a diol to make polyester. As used herein, the term "erephthalic acid" is intended to include terephthalic acid itself and residues thereof as well as any derivative of terephthalic acid, including its associated acid halides, esters, half-esters, salts, half-salts, anhydrides, mixed anhydrides, and/or mixtures thereof or residues thereof useful in a reaction process with a diol to make polyester.

The polyesters used in the present invention typically can be prepared from dicarboxylic acids and diols which react in substantially equal proportions and are incorporated into the polyester polymer as their corresponding residues. The polyesters of the present invention, therefore, can contain substantially equal molar proportions of acid residues (100 mole %) and diol (and/or multifunctional hydroxyl compound) residues (100 mole %) such that the total moles of repeating units is equal to 100 mole %. The mole percentages provided in the present disclosure, therefore, may be based on the total moles of acid residues, the total moles of diol residues, or the total moles of repeating units. For example, a polyester containing 10 mole % isophthalic acid, based on the total acid residues, means the polyester contains 10 mole % isophthalic acid residues out of a total of 100 mole % acid residues. Thus, there are 10 moles of isophthalic acid residues among every 100 moles of acid residues. In another example, a polyester containing 30 mole % 2,2,4,4-tetramethyl-1,3-cyclobutanediol, based on the total diol residues, means the polyester contains 30 mole % 2,2,4,4-tetramethyl-1,3-cyclobutanediol residues out of a total of 100 mole % diol residues. Thus, there are 30 moles of 2,2,4,4-tetramethyl-1,3-cyclobutanediol residues among every 100 moles of diol residues.

In other aspects of the invention, the $T_g$ of the polyesters useful in the polyester compositions of the invention can be at least one of the following ranges: 90 to 120° C.; 95 to 120° C.; 100 to 120° C.; 105 to 120° C.; 110 to 120° C.; 90 to 115° C.; 95 to 115° C.; 100-115° C.; 105 to 115° C.; 90 to 110° C.; 95 to 110° C.; 100 to 110° C.; 90 to 100° C.; 90 to 105° C.; 95 to 105° C.; and 90 to 100° C.

In other aspects of the invention, the glycol component for the polyesters useful in the invention include but are not limited to at least one of the following combinations of ranges: 20 to 40 mole % 2,2,4,4-tetramethyl-1,3-cyclobutanediol, 20 to 40 mole % cyclohexanedimethanol and 30 to 60 mole % ethylene glycol; 20 to 35 mole % 2,2,4,4-tetramethyl-1,3-cyclobutanediol, 20 to 40 mole % cyclohexanedimethanol and 30 to 60 mole % ethylene glycol; 20 to 30 mole % 2,2,4,4-tetramethyl-1,3-cyclobutanediol, 20 to 40 mole % cyclohexanedimethanol and 30 to 60 mole % ethylene glycol; and 20 to 25 mole % 2,2,4,4-tetramethyl-1,3-cyclobutanediol, 20 to 40 mole % cyclohexanedimethanol and 30 to 60 mole % ethylene glycol.

In other aspects of the invention, the glycol component for the polyesters useful in the invention include but are not limited to at least one of the following combinations of ranges: 25 to 40 mole % 2,2,4,4-tetramethyl-1,3-cyclobutanediol, 20 to 40 mole % cyclohexanedimethanol and 30 to 55 mole % ethylene glycol; 25 to 35 mole % 2,2,4,4-tetramethyl-1,3-cyclobutanediol, 120 to 40 mole % cyclohexanedimethanol and 30 to 55 mole % ethylene glycol; and 25 to 30 mole % 2,2,4,4-tetramethyl-1,3-cyclobutanediol, 20 to 40 mole % cyclohexanedimethanol and 30 to 55 mole % ethylene glycol.

In other aspects of the invention, the glycol component for the polyesters useful in the invention include but are not limited to at least one of the following combinations of ranges: 30 to 40 mole % 2,2,4,4-tetramethyl-1,3-cyclobutanediol, 20 to 40 mole % cyclohexanedimethanol and 30 to 50 mole % ethylene glycol; 30 to 35 mole % 2,2,4,4-tetramethyl-1,3-cyclobutanediol, 20 to 40 mole % cyclohexanedimethanol and 30 to 50 mole % ethylene glycol.

In other aspects of the invention, the glycol component for the polyesters useful in the invention include but are not limited to at least one of the following combinations of ranges: 20 to 40 mole % 2,2,4,4-tetramethyl-1,3-cyclobutanediol, 20 to 35 mole % cyclohexanedimethanol and 30 to 60 mole % ethylene glycol; 20 to 40 mole % 2,2,4,4-tetramethyl-1,3-cyclobutanediol, 20 to 30 mole % cyclohexanedimethanol and 30 to 60 mole % ethylene glycol; and 20 to 40 mole % 2,2,4,4-tetramethyl-1,3-cyclobutanediol, 20 to 25 mole % cyclohexanedimethanol and 30 to 60 mole % ethylene glycol.

In other aspects of the invention, the glycol component for the polyesters useful in the invention include but are not limited to at least one of the following combinations of ranges: 20 to 40 mole % 2,2,4,4-tetramethyl-1,3-cyclobutanediol, 25 to 40 mole % cyclohexanedimethanol and 30 to 55 mole % ethylene glycol; 20 to 40 mole % 2,2,4,4-tetramethyl-1,3-cyclobutanediol, 25 to 35 mole % cyclohexanedimethanol and 30 to 55 mole % ethylene glycol; and 20 to 40 mole % 2,2,4,4-tetramethyl-1,3-cyclobutanediol, 25 to 30 mole % cyclohexanedimethanol and 30 to 55 mole % ethylene glycol.

In other aspects of the invention, the glycol component for the polyesters useful in the invention include but are not limited to at least one of the following combinations of ranges: 20 to 40 mole % 2,2,4,4-tetramethyl-1,3-cyclobutanediol, 30 to 40 mole % cyclohexanedimethanol and 30 to 50 mole % ethylene glycol; 20 to 40 mole % 2,2,4,4-tetramethyl-1,3-cyclobutanediol, 30 to 35 mole % cyclohexanedimethanol and 30 to 50 mole % ethylene glycol.

In one embodiment, the glycol component of the polyester(s) useful in the invention comprises 2,2,4,4-tetramethyl-1,3-cyclobutanediol and cyclohexanedimethanol wherein the sum of the mole percentages of 2,2,4,4-tetramethyl-1,3-cyclobutanediol and cyclohexanedimethanol is from 40 to less than 70 mole % of the total mole % of the total glycol component.

For embodiments of the invention, the polyesters useful in the invention may exhibit at least one of the following inherent viscosities as determined in 60/40 (wt/wt) phenol/tetrachloroethane at a concentration of 0.25 g/50 ml at 25° C.: 0.50 to 1.2 dL/g; 0.50 to 1.1 dL/g; 0.50 to 1 dL/g; 0.50 to less than 1 dL/g; 0.50 to 0.98 dL/g; 0.50 to 0.95 dL/g; 0.50 to 0.90 dL/g; 0.50 to 0.85 dL/g; 0.50 to 0.80 dL/g; 0.50 to 0.75 dL/g; 0.50 to less than 0.75 dL/g; 0.50 to 0.72 dL/g; 0.50 to 0.70 dL/g; 0.50 to less than 0.70 dL/g; 0.50 to 0.68 dL/g; 0.50 to less than 0.68 dL/g; 0.50 to 0.65 dL/g; 0.55 to 1.2 dL/g; 0.55 to 1.1 dL/g; 0.55 to 1 dL/g; 0.55 to less than 1 dL/g; 0.55 to 0.98 dL/g; 0.55 to 0.95 dL/g; 0.55 to 0.90 dL/g; 0.55 to 0.85 dL/g; 0.55 to 0.80 dL/g; 0.55 to 0.75 dL/g; 0.55 to less than 0.75 dL/g; 0.55 to 0.72 dL/g; 0.55 to 0.70 dL/g; 0.55 to less than 0.70 dL/g; 0.55 to 0.68 dL/g; 0.55 to less than 0.68 dL/g; 0.55 to 0.65 dL/g; 0.58 to 1.2 dL/g; 0.58 to 1.1 dL/g; 0.58 to 1 dL/g; 0.58 to less than 1 dL/g; 0.58 to 0.98 dL/g; 0.58 to 0.95 dL/g; 0.58 to 0.90 dL/g; 0.58 to 0.85 dL/g; 0.58 to 0.80 dL/g; 0.58 to 0.75 dL/g; 0.58 to less than 0.75 dL/g; 0.58 to 0.72 dL/g; 0.58 to 0.70 dL/g; 0.58 to less than 0.70 dL/g; 0.58 to 0.68 dL/g; 0.58 to less than 0.68 dL/g; 0.58 to 0.65 dL/g; 0.60 to 1.2 dL/g; 0.60 to 1.1 dL/g; 0.60 to 1 dL/g; 0.60 to less than 1 dL/g; 0.60 to 0.98 dL/g; 0.60 to 0.95 dL/g; 0.60 to 0.90 dL/g; 0.60 to 0.85 dL/g; 0.60 to 0.80 dL/g; 0.60 to 0.75 dL/g; 0.60 to less than 0.75 dL/g; 0.60 to 0.72 dL/g; 0.60 to 0.70 dL/g; 0.60 to less than 0.70 dL/g; 0.60 to 0.68 dL/g; 0.60 to less than 0.68 dL/g; 0.60 to 0.65 dL/g; 0.65 to 1.2 dL/g; 0.65 to 1.1 dL/g; 0.65 to 1 dL/g; 0.65 to less than 1 dL/g; 0.65 to 0.98 dL/g; 0.65 to 0.95 dL/g; 0.65 to 0.90 dL/g; 0.65 to 0.85 dL/g; 0.65 to 0.80 dL/g; 0.65 to 0.75 dL/g; 0.65 to less than 0.75 dL/g; 0.65 to 0.72 dL/g; 0.65 to 0.70 dL/g; 0.65 to less than 0.70 dL/g; 0.68 to 1.2 dL/g; 0.68 to 1.1 dL/g; 0.68 to 1 dL/g; 0.68 to less than 1 dL/g; 0.68 to 0.98 dL/g; 0.68 to 0.95 dL/g; 0.68 to 0.90 dL/g; 0.68 to 0.85 dL/g; 0.68 to 0.80 dL/g; 0.68 to 0.75 dL/g; 0.68 to less than 0.75 dL/g; 0.68 to 0.72 dL/g.

It is contemplated that compositions useful in the invention can possess at least one of the inherent viscosity ranges described herein and at least one of the monomer ranges for the compositions described herein unless otherwise stated. It is also contemplated that compositions useful in the invention can possess at least one of the $T_g$ ranges described herein and at least one of the monomer ranges for the compositions described herein unless otherwise stated. It is also contemplated that compositions useful in the invention can possess at least one of the inherent viscosity ranges described herein, at least one of the $T_g$ ranges described herein, and at least one of the monomer ranges for the compositions described herein unless otherwise stated.

In one embodiment, terephthalic acid may be used as the starting material. In another embodiment, dimethyl terephthalate may be used as the starting material. In yet another embodiment, mixtures of terephthalic acid and dimethyl terephthalate may be used as the starting material and/or as an intermediate material.

In certain embodiments, terephthalic acid or an ester thereof, such as, for example, dimethyl terephthalate or a mixture of terephthalic acid residues and an ester thereof can make up a portion or all of the dicarboxylic acid component used to form the polyesters useful in the invention. In certain embodiments, terephthalic acid residues can make up a portion or all of the dicarboxylic acid component used to form the polyesters useful in the invention. In certain embodiments, higher amounts of terephthalic acid can be used in order to produce a higher impact strength polyester. For purposes of this disclosure, the terms "terephthalic acid" and "dimethyl terephthalate" are used interchangeably herein. In one embodiment, dimethyl terephthalate is part or all of the dicarboxylic acid component used to make the polyesters useful in the present invention. In all embodiments, ranges of from 70 to 100 mole %; or 80 to 100 mole %; or 90 to 100 mole %; or 99 to 100 mole %; or 100 mole % terephthalic acid and/or dimethyl terephthalate and/or mixtures thereof may be used.

In addition to terephthalic acid, the dicarboxylic acid component of the polyesters useful in the invention can comprise up to 10 mole %, up to 5 mole %, or up to 1 mole % of one or more modifying aromatic dicarboxylic acids. Yet another embodiment contains 0 mole % modifying aromatic dicarboxylic acids. Thus, if present, it is contemplated that the amount of one or more modifying aromatic dicarboxylic acids can range from any of these preceding endpoint values including, for example, 0.01 to 10 mole %, from 0.01 to 5 mole % and from 0.01 to 1 mole %. In one embodiment, modifying aromatic dicarboxylic acids that may be used in the present invention include but are not limited to those having up to 20 carbon atoms, and which can be linear, para-oriented, or symmetrical. Examples of modifying aromatic dicarboxylic acids which may be used in this invention include, but are not limited to, isophthalic acid, 4,4'-biphenyldicarboxylic acid, 1,4-, 1,5-, 2,6-, 2,7-naphthalenedicarboxylic acid, and trans-4,4'-stilbenedicarboxylic acid, and esters thereof. In one embodiment, the modifying aromatic dicarboxylic acid is isophthalic acid.

The carboxylic acid component of the polyesters useful in the invention can be further modified with up to 10 mole %, such as up to 5 mole % or up to 1 mole % of one or more aliphatic dicarboxylic acids containing 2-16 carbon atoms, such as, for example, cyclohexanedicarboxylic, malonic, succinic, glutaric, adipic, pimelic, suberic, azelaic and dodecanedioic dicarboxylic acids. Certain embodiments can also comprise 0.01 to 10 mole %, such as 0.1 to 10 mole %, 1 or 10 mole %, 5 to 10 mole % of one or more modifying aliphatic dicarboxylic acids. Yet another embodiment contains 0 mole % modifying aliphatic dicarboxylic acids. The total mole % of the dicarboxylic acid component is 100 mole %. In one embodiment, adipic acid and/or glutaric acid are provided in the modifying aliphatic dicarboxylic acid component of the invention.

The modifying dicarboxylic acids of the invention can include indan dicarboxylic acids, for example, indan-1,3-dicarboxylic acids and/or phenylindan dicarboxylic acids. In one embodiment, the dicarboxylic acid may be chosen from at least one of 1,2,3-trimethyl-3-phenylindan-4',5-dicarboxylic acid and 1,1,3-trimethyl-5-carboxy-3-(4-carboxyphenyl) indan dicarboxylic acid. For the purposes of this invention, any of the indan dicarboxylic acids described in United States Patent Application Publication No. 2006/0004151A1 entitled "Copolymers Containing Indan Moieties and Blends Thereof" by Shaikh et al., assigned to General Electric Company may be used as at least one modifying dicarboxylic acid within the scope of this invention; United States Patent Application Publication No. 2006/0004151A1 is incorporated herein by reference with respect to any of the indan dicarboxylic acids described therein.

Esters of terephthalic acid and the other modifying dicarboxylic acids or their corresponding esters and/or salts may be used instead of the dicarboxylic acids. Suitable examples of dicarboxylic acid esters include, but are not limited to, the dimethyl, diethyl, dipropyl, diisopropyl, dibutyl, and diphenyl esters. In one embodiment, the esters are chosen from at least one of the following: methyl, ethyl, propyl, isopropyl, and phenyl esters.

For the desired polyester, the molar ratio of cis/trans 2,2,4,4-tetramethyl-1,3-cyclobutanediol can vary from the pure form of each and mixtures thereof. In certain embodiments, the molar percentages for cis and/or trans 2,2,4,4,-tetramethyl-1,3-cyclobutanediol are greater than 50 mole % cis and less than 50 mole % trans; or greater than 55 mole % cis and less than 45 mole % trans; or 30 to 70 mole % cis and 70 to 30 mole % trans; or 40 to 60 mole % cis and 60 to 40 mole % trans; or 50 to 70 mole % trans and 50 to 30 mole % cis; or 50 to 70 mole % cis and 50 to 30 mole % trans; or 60 to 70 mole % cis and 30 to 40 mole % trans; or greater than 70 mole % cis and less than 30 mole % trans; wherein the total mole percentages for cis- and trans-2,2,4,4-tetramethyl-1,3-cyclobutanediol is equal to 100 mole %. In an additional embodiment, the molar ratio of cis/trans 2,2,4,4-tetramethyl-1,3-cyclobutanediol can vary within the range of 50/50 to 0/100, for example, between 40/60 to 20/80.

The cyclohexanedimethanol may be cis, trans, or a mixture thereof, for example, a cis/trans ratio of 60:40 to 40:60 or a cis/trans ratio of 70:30 to 30:70. In another embodiment, the trans-cyclohexanedimethanol can be present in an amount of 60 to 80 mole % and the cis-cyclohexanedimethanol can be present in an amount of 20 to 40 mole % wherein the total percentages of cis-cyclohexanedimethanol and trans-cyclohexanedimethanol is equal to 100 mole %. In particular embodiments, the trans-cyclohexanedimethanol can be present in an amount of 60 mole % and the cis-cyclohexanedimethanol can be present in an amount of 40 mole %. In particular embodiments, the trans-cyclohexanedimethanol can be present in an amount of 70 mole % and the cis-cyclohexanedimethanol can be present in an amount of 30 mole %. Any of 1,1-, 1,2-, 1,3-, 1,4- isomers of cyclohexanedimethanol or mixtures thereof may be present in the glycol component of this invention. Cis and trans isomers do not exist for 1,1-cyclohexanedimethanol In one embodiment, the polyesters useful in the invention comprise 1,4-cyclohexanedimethanol. In another embodiment, the polyesters useful in the invention comprise 1,4-cyclohexanedimethanol and 1,3-cyclohexanedimethanol. The molar ratio of cis/trans 1,4-cyclohexandimethanol can vary within the range of 50/50 to 0/100, for example, between 40/60 to 20/80.

In one embodiment, the glycol component of the polyester portion of the polyester compositions useful in the invention can contain 30 mole % or less of one or more modifying glycols which are not 2,2,4,4-tetramethyl-1,3-cyclobutanediol or cyclohexanedimethanol or ethylene glycol; in one embodiment, the glycol component of the polyester portion of the polyester compositions useful in the invention can contain 25 mole % or less of one or more modifying glycols which are not 2,2,4,4-tetramethyl-1,3-cyclobutanediol or cyclohexanedimethanol or ethylene glycol; in one embodiment, the glycol component of the polyester portion of the polyester compositions useful in the invention can contain 20 mole % or less of one or more modifying glycols which are not 2,2,4,4-tetramethyl-1,3-cyclobutanediol or cyclohexanedimethanol or ethylene glycol; in one embodiment, the polyesters useful in the invention may contain less than 15 mole % of of one or more modifying glycols. In another embodiment, the polyesters useful in the invention can contain 10 mole % or less of one or more modifying glycols. In another embodiment, the polyesters useful in the invention can contain 5 mole % or less of one or more modifying glycols. In another embodiment, the polyesters useful in the invention can contain 3 mole % or less of one or more modifying glycols. In another embodiment, the polyesters useful in the invention can contain 2 mole % or less of one or more modifying glycols. In another embodiment, the polyesters useful in the invention can contain 0 mole % modifying glycols.

Modifying glycols useful in the polyesters useful in the invention refer to diols other than 2,2,4,4-tetramethyl-1,3-cyclobutanediol, cyclohexanedimethanol and ethylene glycol and can contain 2 to 16 carbon atoms. Examples of suitable modifying glycols include, but are not limited to, diethylene glycol, 1,2-propanediol, 1,3-propanediol, neopentyl glycol, 1,4-butanediol, 1,5-pentanediol, 1,6-hexanediol, p-xylene glycol, polytetramethylene glycol, and mixtures thereof. In another embodiment, the modifying glycols include, but are not limited to, at least one of 1,3-propanediol and 1,4-butanediol. In one embodiment, at least one modifying glycol is diethylene glycol. In one embodiment, the diethylene glycol is not added as a separate monomer but is formed during polymerization.

The polyesters useful in the invention can comprise from 0 to 10 mole percent, for example, from 0.01 to 5 mole percent, from 0.01 to 1 mole percent, from 0.05 to 5 mole percent, from 0.05 to 1 mole percent, or from 0.1 to 0.7 mole percent, based the total mole percentages of either the diol or diacid residues; respectively, of one or more residues of a branching monomer, also referred to herein as a branching agent, having 3 or more carboxyl substituents, hydroxyl substituents, or a combination thereof. In certain embodiments, the branching monomer or agent may be added prior to and/or during and/or after the polymerization of the polyester. The polyester(s) useful in the invention can thus be linear or branched.

Examples of branching monomers include, but are not limited to, multifunctional acids or multifunctional alcohols such as trimellitic acid, trimellitic anhydride, pyromellitic dianhydride, trimethylolpropane, glycerol, pentaerythritol, citric acid, tartaric acid, 3-hydroxyglutaric acid and the like. In one embodiment, the branching monomer residues can comprise 0.1 to 0.7 mole percent of one or more residues chosen from at least one of the following: trimellitic anhydride, pyromellitic dianhydride, glycerol, sorbitol, 1,2,6-hexanetriol, pentaerythritol, trimethylolethane, and/or trimesic acid. The branching monomer may be added to the polyester reaction mixture or blended with the polyester in the form of a concentrate as described, for example, in U.S. Pat. Nos. 5,654,347 and 5,696,176, whose disclosure regarding branching monomers is incorporated herein by reference.

The polyesters of the invention can comprise at least one chain extender. Suitable chain extenders include, but are not limited to, multifunctional (including, but not limited to, bifunctional) isocyanates, multifunctional epoxides, including for example, epoxylated novolacs, and phenoxy resins. In certain embodiments, chain extenders may be added at the end of the polymerization process or after the polymerization process. If added after the polymerization process, chain extenders can be incorporated by compounding or by addition during conversion processes such as injection molding or extrusion. The amount of chain extender used can vary depending on the specific monomer composition used and the physical properties desired but is generally about 0.1 percent by weight to about 10 percent by weight, such as about 0.1 to about 5 percent by weight, based on the total weight of the polyester.

The glass transition temperature ($T_g$) of the polyesters useful in the invention was determined using a TA DSC 2920 from Thermal Analyst Instrument at a scan rate of 20° C./min.

Because of the long crystallization half-times (e.g., greater than 5 minutes) at 170° C. exhibited by certain polyesters useful in the present invention, it can be possible to produce articles, including but not limited to, injection molded parts, injection blow molded articles, injection stretch blow molded articles, extruded film, extruded sheet, extrusion blow molded articles, extrusion stretch blow molded articles, and fibers. A thermoformable sheet is an example of an article of manufacture provided by this invention. The polyesters of the invention can be amorphous or semicrystalline. In one aspect, certain polyesters useful in the invention can have relatively low crystallinity. Certain polyesters useful in the invention can thus have a substantially amorphous morphology, meaning that the polyesters comprise substantially unordered regions of polymer.

In one embodiment, an "amorphous" polyester can have a crystallization half-time of greater than 5 minutes at 170° C. or greater than 10 minutes at 170° C. or greater than 50 minutes at 170° C. or greater than 100 minutes at 170° C. In one embodiment, of the invention, the crystallization half-times can be greater than 1,000 minutes at 170° C. In another embodiment of the invention, the crystallization half-times of the polyesters useful in the invention can be greater than 10,000 minutes at 170° C. The crystallization half time of the polyester, as used herein, may be measured using methods well-known to persons of skill in the art. For example, the crystallization half time of the polyester, $t_{1/2}$, can be determined by measuring the light transmission of a sample via a laser and photo detector as a function of time on a temperature controlled hot stage. This measurement can be done by exposing the polymers to a temperature, $T_{max}$, and then cooling it to the desired temperature. The sample can then be held at the desired temperature by a hot stage while transmission measurements are made as a function of time. Initially, the sample can be visually clear with high light transmission and becomes opaque as the sample crystallizes. The crystallization half-time is the time at which the light transmission is halfway between the initial transmission and the final transmission. $T_{max}$ is defined as the temperature required to melt the crystalline domains of the sample (if crystalline domains are present). The sample can be heated to $T_{max}$ to condition the sample prior to crystallization half time measurement. The absolute $T_{max}$ temperature is different for each composition. For example PCT can be heated to some temperature greater than 290° C. to melt the crystalline domains.

In one embodiment, certain polyesters useful in this invention can be visually clear. The term "visually clear" is defined herein as an appreciable absence of cloudiness, haziness, and/or muddiness, when inspected visually. In another embodiment, when the polyesters are blended with polycarbonate, including but not limited to, bisphenol A polycarbonates, the blends can be visually clear.

In one embodiment, the polyesters useful in the invention and/or the polyester compositions of the invention, in the presence of and/or in the absence of toner(s), can have color values L*, a* and b* as described herein which can be determined using a Hunter Lab Ultrascan Spectra Colorimeter manufactured by Hunter Associates Lab Inc., Reston, Va. The color determinations are averages of values measured on either pellets of the polyesters or plaques or other items injection molded or extruded from them. They are determined by the L*a*b* color system of the CIE (International Commission on Illumination translated), wherein L* represents the lightness coordinate, a* represents the red/green coordinate, and b* represents the yellow/blue coordinate. In certain embodiments, the b* values for the polyesters useful in the invention can be from −12 to less than 12 and the L* values can be from 50 to 90. In other embodiments, the b* values for the polyesters useful in the invention can be present in one of the following ranges: from −10 to 10; −10 to less than 10; −10 to 9; −10 to 8; −10 to 7; −10 to 6; −10 to 5; −10 to 4; −10 to 3; −10 to 2; from −5 to 9; −5 to 8; −5 to 7; −5 to 6; −5 to 5; −5 to 4; −5 to 3; −5 to 2; 0 to 9; 0 to 8; 0 to 7; 0 to 6; 0 to 5; 0 to 4; 0 to 3; 0 to 2; 1 to 10; 1 to 9; 1 to 8; 1 to 7; 1 to 6; 1 to 5; 1 to 4; 1 to 3; and 1 to 2. In other embodiments, the L* value for the polyesters useful in the invention can be present in one of the following ranges: 50 to 60; 50 to 70; 50 to 80; 50 to 90; 60 to 70; 60 to 80; 60 to 90; 70 to 80; 79 to 90.

Deleterious color interactions are believed to occur with tin catalysts or with titanium catalysts used to prepare polyesters containing ethylene glycol. In one embodiment of this invention, the b* color values for the polyesters useful in the invention made using at least one titanium compound and at least one tin compound in combination with at least one phosphorus compound as described herein are believed to be a significant improvement over using tin catalysts alone in the production of these polyesters. In another embodiment, the use of at least one titanium catalyst in combination with at least one phosphorus compound to make the polyesters useful in the invention is also believed to be a significant improvement over the use of titanium catalysts alone in the production of these polyesters.

Notched Izod impact strength, as described in ASTM D256, is a common method of measuring toughness. Notched Izod impact strength is measured herein at 23° C. with a 10-mil notch in a 3.2 mm (⅛-inch) thick bar determined according to ASTM D256. In one embodiment, certain polyesters useful in the invention can exhibit a notched Izod impact strength of at least 500 J/m (10 ft-lb/in) at 23° C. with a 10-mil notch in a 3.2 mm (⅛-inch) thick bar determined according to ASTM D256. In one embodiment, certain polyesters useful in the invention can exhibit a notched Izod impact strength of from about 10 ft-lb/in to about 35 ft-lb/in at 23° C. with a 10-mil notch in a 3.2 mm (⅛-inch) thick bar determined according to ASTM D256. In another embodiment, certain polyesters useful in the invention can exhibit a notched Izod impact strength of from about 10 ft-lb/in to no break at 23° C. with a 10-mil notch in a 3.2 mm (⅛-inch) thick bar determined according to ASTM D256.

In one embodiment, certain polyesters useful in the invention can exhibit at least one of the following densities: a density of greater than 1.2 g/ml at 23° C.

In one embodiment, certain polyesters useful in the invention can exhibit a flexural modulus at 23° C. equal to or greater than 290,000 psi as defined by ASTM D790. In another embodiment, certain polyesters useful in the invention can exhibit a flexural modulus at 23° C. from about 290,000 psi to about 370,000 psi as defined by ASTM D790. In another embodiment, certain polyesters useful in the invention can exhibit a flexural modulus at 23° C. from about 290,000 psi to about 350,000 psi as defined by ASTM D790.

Certain polyesters useful in the invention can possess at least one of the following properties: a $T_g$ of from about 100 to about 110° C. as measured by a TA 2100 Thermal Analyst Instrument at a scan rate of 20° C./min; a flexural modulus at 23° C. equal to or greater than 290,000 psi as defined by ASTM D790; and a notched Izod impact strength equal to or greater than 10 ft-lb/in according to ASTM D256 with a 10-mil notch using a ⅛-inch thick bar at 23° C.

Other polyesters useful in the invention can possess at least one of the following properties: a $T_g$ of from about 100 to about 110° C. as measured by a TA 2100 Thermal Analyst Instrument at a scan rate of 20° C./min; a flexural modulus at 23° C. from about 290,000 psi to about 370,000 psi as defined by ASTM D790; and a notched Izod impact strength of greater than 10 ft-lb/in to no break according to ASTM D256 with a 10-mil notch using a ⅛-inch thick bar at 23° C.

Other polyesters useful in the invention can possess at least one of the following properties: a $T_g$ of from about 100 to about 110° C. as measured by a TA 2100 Thermal Analyst Instrument at a scan rate of 20° C./min; a flexural modulus at 23° C. from about 290,000 psi to about 370,000 psi as defined by ASTM D790; and a notched Izod impact strength of greater than 10 ft-lb/in to 35 ft-lb/in according to ASTM D256 with a 10-mil notch using a ⅛-inch thick bar at 23° C.

In some embodiments, use of the polyester compositions useful in the invention minimizes and/or eliminates the drying step prior to melt processing and/or thermoforming.

The term "phosphorus compound" as used herein is intended to include reaction products thereof.

In one embodiment, the phosphorus compound(s) useful in the invention can be an organic compound such as, for example, a phosphorus acid ester containing halogenated or non-halogenated organic substituents. The thermal stabilizer can comprise a wide range of phosphorus compounds well-known in the art such as, for example, phosphines, phosphites, phosphinites, phosphonites, phosphinates, phosphonates, phosphine oxides, and phosphates.

Examples of phosphorus compounds useful in the invention can include tributyl phosphate, triethyl phosphate, tributoxyethyl phosphate, t-butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine. In one embodiment, triphenyl phosphine oxide is excluded as a thermal stabilizer in the process(es) of making the polyesters useful in the invention and/or in the polyester composition(s) of the invention.

In one embodiment, phosphorus compounds useful in the invention can be any of the previously described phosphorus-based acids wherein one or more of the hydrogen atoms of the acid compound (bonded to either oxygen or phosphorus atoms) are replaced with alkyl, branched alkyl, substituted alkyl, alkyl ethers, substituted alkyl ethers, alkyl-aryl, alkyl-substituted aryl, aryl, substituted aryl, and mixtures thereof. In another embodiment, phosphorus compounds useful in the invention, include but are not limited to, the above described compounds wherein at least one of the hydrogen atoms bonded to an oxygen atom of the compound is replaced with a metallic ion or an ammonium ion.

The esters can contain alkyl, branched alkyl, substituted alkyl, alkyl ethers, aryl, and/or substituted aryl groups. The esters can also have at least one alkyl group and at least one aryl group. The number of ester groups present in the particular phosphorus compound can vary from zero up to the maximum allowable based on the number of hydroxyl groups present on the phosphorus compound used. For example, an alkyl phosphate ester can include one or more of the mono-, di-, and tri alkyl phosphate esters; an aryl phosphate ester includes one or more of the mono-, di-, and tri aryl phosphate esters; and an alkyl phosphate ester and/or an aryl phosphate ester also include, but are not limited to, mixed alkyl aryl phosphate esters having at least one alkyl and one aryl group.

In one embodiment, the phosphorus compounds useful in the invention include but are not limited to alkyl, aryl or mixed alkyl aryl esters or partial esters of phosphoric acid, phosphorus acid, phosphinic acid, phosphonic acid, or phosphonous acid. The alkyl or aryl groups can contain one or more substituents.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, diphosphites, salts of phosphoric acid, phosphine oxides, and mixed aryl alkyl phosphites, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In one aspect, the phosphorus compounds useful in the invention comprise at least one phosphorus compound chosen from at least one of substituted or unsubstituted alkyl phosphate esters, substituted or unsubstituted aryl phosphate esters, substituted or unsubstituted mixed alkyl aryl phosphate esters, reaction products thereof, and mixtures thereof. The phosphate esters include esters in which the phosphoric acid is fully esterified or only partially esterified.

In one embodiment, for example, the phosphorus compounds useful in the invention can include at least one phosphate ester.

In another embodiment, the phosphate esters useful in the invention can include but are not limited to alkyl phosphate esters, aryl phosphate esters, mixed alkyl aryl phosphate esters, and/or mixtures thereof.

In certain embodiments, the phosphate esters useful in the invention are those where the groups on the phosphate ester include are alkyl, alkoxy-alkyl, phenyl, or substituted phenyl groups. These phosphate esters are generally referred to herein as alkyl and/or aryl phosphate esters. Certain preferred embodiments include trialkyl phosphates, triaryl phosphates, alkyl diaryl phosphates, dialkyl aryl phosphates, and mixtures of such phosphates, wherein the alkyl groups are preferably those containing from 2 to 12 carbon atoms, and the aryl groups are preferably phenyl.

Representative alkyl and branched alkyl groups are preferably those containing from 1-12 carbon atoms, including, but not limited to, ethyl, propyl, isopropyl, butyl, hexyl, cyclohexyl, 2-ethylhexyl, octyl, decyl and dodecyl. Substituted alkyl groups include, but are not limited to, those containing at least one of carboxylic acid groups and esters thereof, hydroxyl groups, amino groups, keto groups, and the like.

Representative of alkyl-aryl and substituted alkyl-aryl groups are those wherein the alkyl portion contains from 1-12 carbon atoms, and the aryl group is phenyl or substituted phenyl wherein groups such as alkyl, branched alkyl, aryl, hydroxyl, and the like are substituted for hydrogen at any carbon position on the phenyl ring. Preferred aryl groups include phenyl or substituted phenyl wherein groups such as alkyl, branched alkyl, aryl, hydroxyl and the like are substituted for hydrogen at any position on the phenyl ring.

In one embodiment, the phosphate esters useful in the invention include but are not limited to dibutylphenyl phosphate, triphenyl phosphate, tricresyl phosphate, tributyl phosphate, tri-2-ethylhexyl phosphate, trioctyl phosphate, and/or mixtures thereof, including particularly mixtures of tributyl phosphate and tricresyl phosphate, and mixtures of isocetyl diphenyl phosphate and 2-ethylhexyl diphenyl phosphate.

In one embodiment, at least one phosphorus compound useful in the invention comprises at least one aryl phosphate ester.

In one embodiment, at least one phosphorus compound useful in the invention comprises at least one unsubstituted aryl phosphate ester.

In one aspect, at least one phosphorus compound useful in the invention comprises at least one aryl phosphate ester which is not substituted with benzyl groups.

In one aspect, any of the phosphorus compounds useful in the invention may comprise at least one alkyl phosphate ester.

In one embodiment, the phosphate esters useful in the invention include but are not limited to, at least one of the following: trialkyl phosphates, triaryl phosphates, alkyl diaryl phosphates, and mixed alkyl aryl phosphates.

In one embodiment, the phosphate esters useful in the invention include but are not limited to, at least one of the following: triaryl phosphates, alkyl diaryl phosphates, and mixed alkyl aryl phosphates.

In one embodiment, the phosphate esters useful in the invention include but are not limited to, at least one of the following: triaryl phosphates and mixed alkyl aryl phosphates.

In one embodiment, at least one phosphorus compound useful in the invention comprises, but is not limited to, triaryl phosphates, such as, for example, triphenyl phosphate. In one embodiment, at least one phosphorus compound comprises, but is not limited to Merpol A. In one embodiment, at least one phosphorus compound useful in the invention comprises, but is not limited to, at least one of triphenyl phosphate and Merpol A. Merpol A is a phosphate ester commercially available from Stepan Chemical Co and/or E.I. duPont de Nemours & Co. The CAS Registry number for Merpol A is believed to be CAS Registry # 37208-27-8.

In one aspect, any of the phosphorus compounds useful in the invention may comprise at least one triaryl phosphate ester which is not substituted with benzyl groups.

In one embodiment, the polyester compositions and/or processes of the invention may comprise 2-ethylhexyl diphenyl phosphate.

In one embodiment, any of the processes described herein for making any of the polyester compositions and/or polyesters can comprise at least one mixed alkyl aryl phosphite, such as, for example, bis(2,4-dicumylphenyl)pentaerythritol diphosphite also known as Doverphos S-9228 (Dover Chemicals, CAS# 15486243-8).

In one embodiment, any of the processes described herein for making any of the polyester compositions and/or polyesters can comprise at least one one phosphine oxide.

In one embodiment, any of the processes described herein for making any of the polyester compositions and/or polyesters can comprise at least one salt of phosphoric acid such as, for example, $KH_2PO_4$ and $Zn_3(PO_4)_2$.

The term "thermal stabilizer" is intended to include the reaction product(s) thereof. The term "reaction product" as used in connection with the thermal stabilizers of the invention refers to any product of a polycondensation or esterification reaction between the thermal stabilizer and any of the monomers used in making the polyester as well as the product of a polycondensation or esterification reaction between the catalyst and any other type of additive.

In one embodiment of the invention, the phosphorus compounds useful in the invention may act as thermal stabilizers. In one embodiment of the invention, the phosphorus compounds useful in the invention may not act as a thermal stabilizer but may act as a color stabilizer. In one embodiment of the invention, the phosphorus compounds useful in the invention may act as both a thermal stabilizer and a color stabilizer.

When phosphorus is added to the polyesters and/or polyester compositions and/or process of making the polyesters of the invention, it is added in the form of a phosphorus compound, for example, at least one phosphate ester(s). The amount of phosphorus compound(s), (for example, at least one phosphate ester), added to the polyesters of the invention and/or polyester compositions of the invention and/or processes of the invention can be measured in the form of phosphorus atoms present in the final polyester, for example, by weight measured in ppm.

Amounts of phosphorus compound(s) added during polymerization and/or post manufacturing can include but are not limited to: 1 to 5000 ppm; 1 to 1000 ppm, 1 to 900 ppm, 1 to 800 ppm, 1 to 700 ppm, 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 10 to 5000 ppm; 10 to 1000 ppm, 10 to 900 ppm, 10 to 800 ppm, 10 to 700 ppm, 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm; based on the total weight of the polyester composition.

In one embodiment, amounts of the phosphate ester of the invention added during polymerization are chosen from the following: 1 to 5000 ppm; 1 to 1000 ppm, 1 to 900 ppm, 1 to 800 ppm, 1 to 700 ppm, 1 to 600 ppm, 1 to 500 ppm, 1 to 400 ppm, 1 to 350 ppm, 1 to 300 ppm, 1 to 250 ppm, 1 to 200 ppm, 1 to 150 ppm, 1 to 100 ppm; 1 to 60 ppm; 2 to 5000 ppm; 2 to 1000 ppm, 2 to 900 ppm, 2 to 800 ppm, 2 to 700 ppm, 2 to 600 ppm, 2 to 500 ppm, 2 to 400 ppm, 2 to 350 ppm, 2 to 300 ppm, 2 to 250 ppm, 2 to 200 ppm, 2 to 150 ppm, 2 to 100 ppm; 2 to 60 ppm; 2 to 20 ppm, 3 to 5000 ppm; 3 to 1000 ppm, 3 to 900 ppm, 3 to 800 ppm, 3 to 700 ppm, 3 to 600 ppm, 3 to 500 ppm, 3 to 400 ppm, 3 to 350 ppm, 3 to 300 ppm, 3 to 250 ppm, 3 to 200 ppm, 3 to 150 ppm, 3 to 100 ppm; 3 to 60 ppm; 3 to 20 ppm, 4 to 5000 ppm; 4 to 1000 ppm, 4 to 900 ppm, 4 to 800 ppm, 4 to 700 ppm, 4 to 600 ppm, 4 to 500 ppm, 4 to 400 ppm, 4 to 350 ppm, 4 to 300 ppm, 4 to 250 ppm, 4 to 200 ppm, 4 to 150 ppm, 4 to 100 ppm; 4 to 60 ppm; 4 to 20 ppm, 5 to 5000 ppm; 5 to 1000 ppm, 5 to 900 ppm, 5 to 800 ppm, 5 to 700 ppm, 5 to 600 ppm, 5 to 500 ppm, 5 to 400 ppm, 5 to 350 ppm, 5 to 300 ppm, 5 to 250 ppm, 5 to 200 ppm, 5 to 150 ppm, 5 to 100 ppm; 5 to 60 ppm; 5 to 20 ppm, 6 to 5000 ppm; 6 to 1000 ppm, 6 to 900 ppm, 6 to 800 ppm, 6 to 700 ppm, 6 to 600 ppm, 6 to 500 ppm, 6 to 400 ppm, 6 to 350 ppm, 6 to 300 ppm, 6 to 250 ppm, 6 to 200 ppm, 6 to 150 ppm, 6 to 100 ppm; 6 to 60 ppm; 6 to 20 ppm, 7 to 5000 ppm; 7 to 1000 ppm, 7 to 900 ppm, 7 to 800 ppm, 7 to 700 ppm, 7 to 600 ppm, 7 to 500 ppm, 7 to 400 ppm, 7 to 350 ppm, 7 to 300 ppm, 7 to 250 ppm, 7 to 200 ppm, 7 to 150 ppm, 7 to 100 ppm; 7 to 60 ppm; 7 to 20 ppm, 8 to 5000 ppm; 8 to 1000 ppm, 8 to 900 ppm, 8 to 800 ppm, 8 to 700 ppm, 8 to 600 ppm, 8 to 500 ppm, 8 to 400 ppm, 8 to 350 ppm, 8 to 300 ppm, 8 to 250 ppm, 8 to 200 ppm, 8 to 150 ppm, 8 to 100 ppm; 8 to 60 ppm; 8 to 20 ppm, 9 to 5000 ppm; 9 to 1000 ppm, 9 to 900 ppm, 9 to 800 ppm, 9 to 700 ppm, 9 to 600 ppm, 9 to 500 ppm, 9 to 400 ppm, 9 to 350 ppm, 9 to 300 ppm, 9 to 250 ppm, 9 to 200 ppm, 9 to 150 ppm, 9 to 100 ppm; 9 to 60 ppm; 9 to 20 ppm, 10 to 5000 ppm; 10 to 1000 ppm, 10 to 900 ppm, 10 to 800 ppm, 10 to 700 ppm, 10 to 600 ppm, 10 to 500 ppm, 10 to 400 ppm, 10 to 350 ppm, 10 to 300 ppm, 10 to 250 ppm, 10 to 200 ppm, 10 to 150 ppm, 10 to 100 ppm, 10 to 60 ppm, 10 to 20 ppm, 50 to 5000 ppm; 50 to 1000 ppm, 50 to 900 ppm, 50 to 800 ppm, 50 to 700 ppm, 50 to 600 ppm, 50 to 500 ppm, 50 to 400 ppm, 50 to 350 ppm, 50 to 300 ppm, 50 to 250 ppm, 50 to 200 ppm, 50 to 150 ppm, 50 to 100 ppm; 50 to 80 ppm, 100 to 5000 ppm, 100 to 1000 ppm, 100 to 900 ppm, 100 to 800 ppm, 100 to 700 ppm, 100 to 600 ppm, 100 to 500 ppm, 100 to 400 ppm, 100 to 350 ppm, 100 to 300 ppm, 100 to 250 ppm, 100 to 200 ppm, 100 to 150 ppm; 150 to 5000 ppm, 150 to 1000 ppm, 150 to 900 ppm, 150 to 800 ppm, 150 to 700 ppm, 150 to 600 ppm, 150 to 500 ppm, 150 to 400 ppm, 150 to 350 ppm, 150 to 300 ppm, 150 to 250 ppm, 150 to 200 ppm, 200 to 5000 ppm, 200 to 1000 ppm, 200 to 900 ppm, 200 to 800 ppm, 200 to 700 ppm, 200 to 600 ppm, 200 to 500 ppm, 200 to 400 ppm, 200 to 350 ppm, 200 to 300 ppm, 200 to 250 ppm, 250 to 5000 ppm, 250 to 1000 ppm, 250 to 900 ppm, 250 to 800 ppm, 250 to 700 ppm, 250 to 600 ppm, 250 to 500 ppm, 250 to 400 ppm, 250 to 350 ppm, 250 to 300 ppm, 500 to 5000 ppm, 300 to 1000 ppm, 300 to 900 ppm, 300 to 800 ppm, 300 to 700 ppm, 300 to 600 ppm, 300 to 500 ppm, 300 to 400 ppm, 300 to 350 ppm, 350 to 5000 ppm, 350 to 1000 ppm, 350 to 900 ppm, 350 to 800 ppm, 350 to 700 ppm, 350 to 600 ppm, 350 to 500 ppm, 350 to 400 ppm; based on the total weight of the polyester composition and as measured in the form of phosphorus atoms in the final polyester.

Catalyst amounts, unless otherwise described herein, can range from 10 ppm to 20,000 ppm or 10 to 10,000 ppm, or 10 to 5000 ppm or 10 to 1000 ppm or 10 to 500 ppm, or 10 to 300 ppm or 10 to 250 ppm based on the catalyst metal and based on the weight of the final polymer. The process can be carried out in either a batch or continuous process. In one embodiment, the process is carried out in a continuous process.

In one embodiment, suitable catalysts for use in the processes of the invention to make the polyesters useful in the invention can comprise at least one titanium compound. The polyester compositions of the invention may also comprise at least one of the tin compounds useful in the processes of the invention. In one embodiment, the catalyst can comprise a combination of at least one tin compound and at least one titanium compound. Other catalysts could possibly be used in the invention in combination with at least one titanium compound and/or at least one tin compound. Other catalysts may include, but are not limited to, those based on gallium, zinc, antimony, cobalt, manganese, magnesium, germanium, lithium, aluminum compounds, and an aluminum compound with lithium hydroxide or sodium hydroxide.

The process can be carried out in either a batch or continuous process. In one embodiment, the catalyst consists essentially of at least one tin compound. In one embodiment, the catalyst consists essentially of at least one titanium compound. In one embodiment, the catalyst consists essentially of at least one titanium compound and at least one tin compound. In one embodiment, the tin compound and/or titanium compound can be used in either the esterification reaction or the polycondensation reaction or both reactions. In one embodiment, the catalyst comprises a titanium compound used in the esterification reaction. Generally, in one embodiment, the titanium compound catalyst is used in amounts of from about 0.005% to about 0.2% by weight based on the weight of the dicarboxylic acid or dicarboxylic acid ester. Generally, in one embodiment, less than about 700 ppm elemental titanium can be present as residue in the polyester based on the total weight of the final polyester.

When tin is added to to the polyesters and/or polyester compositions and/or process of making the polyesters of the invention, it is added to the process of making the polyester in the form of a tin compound. The amount of the tin compound added to the polyesters of the invention and/or polyester compositions of the invention and/or processes of the invention can be measured in the form of tin atoms present in the final polyester, for example, by weight measured in ppm.

When titanium is added to to the polyesters and/or polyester compositions and/or process of making the polyesters of the invention, it is added to the process of making the polyester in the form of a titanium compound. The amount of the titanium compound added to the polyesters of the invention and/or polyester compositions of the invention and/or processes of the invention can be measured in the form of titanium atoms present in the final polyester, for example, by weight measured in ppm.

In another embodiment, the catalyst comprises at least one titanium compound used in the esterification reaction in the amount of 10 ppm to 20,000 ppm or 10 to 10,000 ppm, or 10 to 5000 ppm or 10 to 4500 ppm or 10 to 4000 ppm or 10 to 3500 ppm or 10 to 3000 ppm or 10 to 2500 ppm or 10 to 2000 ppm or or 10 to 1500 ppm or 10 to 1000 ppm or 10 to 500 ppm, or 10 to 300 ppm or 10 to 250 ppm or 15 ppm to 20,000 ppm or 15 to 10,000 ppm, or 15 to 5000 ppm or or 15 to 4500 ppm or 15 to 4000 ppm or 15 to 3500 ppm or 15 to 3000 ppm or 15 to 2500 ppm or 15 to 2000 ppm or or 15 to 1500 ppm or 15 to 1000 ppm or 15 to 500 ppm, or 15 to 400 ppm or 15 to 300 ppm or 15 to 250 ppm or 20 ppm to 20,000 ppm or 20 to 10,000 ppm, or 20 to 5000 ppm or or 20 to 4500 ppm or 20 to 4000 ppm or 20 to 3500 ppm or 20 to 3000 ppm or 20 to 2500 ppm or 20 to 2000 ppm or or 20 to 1500 ppm or 20 to 1000 ppm or 20 to 500 ppm, or 20 to 300 ppm or 20 to 250 ppm 25 ppm to 20,000 ppm or 25 to 10,000 ppm, or 25 to 5000 ppm or or 25 to 4500 ppm or 25 to 4000 ppm or 25 to 3500 ppm or 25 to 3000 ppm or 25 to 2500 ppm or 25 to 2000 ppm or or 25 to 1500 ppm or 25 to 1000 ppm or 25 to 500 ppm, or 25 to 400 ppm, or 25 to 300 ppm or 25 to 250 ppm or 30 ppm to 20,000 ppm or 30 to 10,000 ppm, or 30 to 5000 ppm or 30 to 4500 ppm or 30 to 4000 ppm or 30 to 3500 ppm or 30 to 3000 ppm or 30 to 2500 ppm or 30 to 2000 ppm or or 30 to 1500 ppm pr 30 to 1000 ppm or 30 to 500 ppm, or 30 to 300 ppm or 30 to 250 ppm or 35 ppm to 20,000 ppm or 35 to 10,000 ppm, or 35 to 5000 ppm or 35 to 4500 ppm or 35 to 4000 ppm or 35 to 3500 ppm or 35 to 3000 ppm or 35 to 2500 ppm or 35 to 2000 ppm or or 35 to 1500 ppm or 35 to 1000 ppm or 35 to 500 ppm, or 35 to 300 ppm or 35 to 250 ppm or 40 ppm to 20,000 ppm or 40 to 10,000 ppm, or 40 to 5000 ppm or or 40 to 4500 ppm or 40 to 4000 ppm or 40 to 3500 ppm or 40 to 3000 ppm or 40 to 2500 ppm or 40 to 2000 ppm or or 40 to 1500 ppm or 40 to 1000 ppm or 40 to 500 ppm, or 40 to 300 ppm or 40 to 250 ppm or 40 to 200 ppm or 45 ppm to 20,000 ppm or 45 to 10,000 ppm, or 45 to 5000 ppm or 45 to 4500 ppm or 45 to 4000 ppm or 45 to 3500 ppm or 45 to 3000 ppm or 45 to 2500 ppm or 45 to 2000 ppm or 45 to 1500 ppm or 45 to 1000 ppm or 45 to 500 ppm, or 45 to 300 ppm or 45 to 250 ppm or 50 ppm to 20,000 ppm or 50 to 10,000 ppm, or 50 to 5000 ppm or 50 to 4500 ppm or 50 to 4000 ppm or 50 to 3500 ppm or 50 to 3000 ppm or 50 to 2500 ppm or 50 to 2000 ppm or or 50 to 1500 ppm or 50 to 1000 ppm or 50 to 500 ppm, or 50 to 300 ppm or 50 to 250 ppm or 50 to 200 ppm or 50 to 150 ppm 50 to 125 ppm, based on the weight of the final polyester, as measured in the form of titanium atoms in the final polyester.

In another embodiment, the polyesters of the invention can be prepared using at least one tin compound as catalyst(s). For example, see U.S. Pat. No. 2,720,507, where the portion concerning tin catalysts is incorporated herein by reference. These catalysts are tin compounds containing at least one organic radical. These catalysts include compounds of both divalent or tetravalent tin which have the general formulas set forth below:

A. $M_2(Sn(OR)_4)$
B. $MH(Sn(OR)_4)$
C. $M'(Sn(OR)_4)$
D. $M'(Hsn(OR)_4)_2$
E. $M_2(Sn(OR)_6)$
F. $MH(Sn(OR)_6)$
G. $M'(Sn(OR)_6)$
H. $M'(Hsn(OR)_6)_2$
I. $Sn(OR)_2$
J. $Sn(OR)_4$
K. $SnR'_2$
L. $SnR'_4$
M. $R'_2SnO$

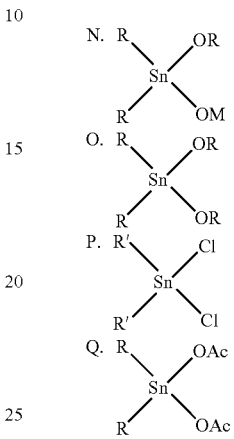

wherein M is an alkali metal, e.g. lithium, sodium, or potassium, M' is an alkaline earth metal such as Mg, Ca or Sr, each R represents an alkyl radical containing from 1 to 8 carbon atoms, each R' radical represents a substituent selected from those consisting of alkyl radicals containing from 1 to 8 carbon atoms (i. e. R radicals) and aryl radicals of the benzene series containing from 6 to 9 carbon atoms (e.g. phenyl, tolyl, benzyl, phenylethyl, etc., radicals), and Ac represents an acyl radical derived from an organic acid containing from 2 to 18 carbon atoms (e.g. acetyl, butyryl, lauroyl, benzoyl, stearoyl, etc.).

The novel bimetallic alkoxide catalysts can be made as described by Meerwein, Ann. 476, 113 (1929). As shown by Meerwein, these catalysts are not merely mixtures of the two metallic alkoxides. They are definite compounds having a salt-like structure. These are the compounds depicted above by the Formulas A through H. Those not specifically described by Meerwein can be prepared by procedures analogous to the working examples and methods set forth by Meerwein.

The other tin compounds can also be made by various methods such as those described in the following literature: For the preparation of diaryl tin dihalides (Formula P) see Ber. 62, 996 (1929); J. Am. Chem. Soc. 49, 1369 (1927). For the preparation of dialkyl tin dihalides (Formula P) see J. Am. Chem. Soc. 47, 2568 (1925); C.A. 41, 90 (1947). For the preparation of diaryl tin oxides (Formula M) see J. Am. Chem. Soc. 48, 1054 (1926). For the preparation of tetraaryl tin compounds (Formula K) see C.A. 32, 5387 (1938). For the preparation of tin alkoxides (Formula J) see C.A. 24, 586 (1930). For the preparation of alkyl tin salts (Formula Q) see C.A. 31, 4290. For the preparation of alkyl tin compounds (Formula K and L) see C.A. 35, 2470 (1941): C.A. 33, 5357 (1939). For the preparation of mixed alkyl aryl tin (Formulas K and L) see C.A. 31, 4290 (1937): C.A. 38, 331 (1944). For the preparation of other tin compounds not covered by these citations see "Die Chemie der Metal-Organischen Verbindungen." by Krause and V. Grosse, published in Berlin, 1937, by Gebroder-Borntrager.

The tin alkoxides (Formulas I and J) and the bimetallic alkoxides (Formulas A through H) contain R substituents which can represent both straight chain and branched chain alkyl radicals, e.g. diethoxide, tetramethoxide, tetrabutoxide, tetra-tert-butoxide, tetrahexoxide, etc.

The alkyl derivatives (Formulas K and L) contain one or more alkyl radicals attached to a tin atom through a direct C—Sn linkage, e.g. dibutyl tin, dihexyl tin, tetra-butyl tin, tetraethyl tin, tetramethyl tin, dioctyl tin, etc. Two of the tetraalkyl radicals can be replaced with an oxygen atom to form compounds having Formula M, e.g. dimethyl tin oxide, diethyl tin oxide, dibutyl tin oxide, diheptyl tin oxide, etc. In one embodiment, the tin catalyst comprises dimethyl tin oxide.

Complexes can be formed by reacting dialkyl tin oxides with alkali metal alkoxides in an alcohol solution to form compounds having Formula N, which compounds are especially useful catalysts, e.g. react dibutyl tin oxide with sodium ethoxide, etc. This formula is intended to represent the reaction products described. Tin compounds containing alkyl and alkoxy radicals are also useful catalysts (see Formula O), e.g. diethyl tin diethoxide, dibutyl tin dibutoxide, dihexyl tin dimethoxide, etc.

Salts derived from dialkyl tin oxides reacted with carboxylic acids or hydrochloric acid are also of particular value as catalysts; see Formulas P and Q. Examples of these catalytic condensing agents include dibutyl tin diacetate, diethyl tin dibutyrate, dibutyl tin dilauroate, dimethyl tin dibenzoate, dibutyl tin dichloride, diethyl tin dichloride, dioctyl tin dichloride, dihexyl tin distearate, etc.

The tin compounds having Formulas K, L and M can be prepared wherein one or more of the R' radicals represents an aryl radical of the benzene series, e.g. phenyl, tolyl, benzyl, etc. Examples include diphenyl tin, tetraphenyl tin, diphenyl dibutyl tin, ditolyl diethyl tin, diphenyl tin oxide, dibenzyl tin, tetrabenzyl tin, di([B-phenylethyl) tin oxide, dibenzyl tin oxide, etc.

Examples of catalysts useful in the present invention include, but are not limited to, one of more of the following: butyltin tris-2-ethylhexanoate, dibutyltin diacetate, dibutyltin oxide, and dimethyl tin oxide.

In one embodiment, catalysts useful in the present invention include, but are not limited to, one or more of the following: butyltin tris-2-ethylhexanoate, dibutyltin diacetate, dibutyltin oxide, and dimethyl tin oxide.

Processes for preparing polyesters using tin-based catalysts are well known and described in the aforementioned U.S. Pat. No. 2,720,507.

The titanium-containing compounds useful in this invention include any compound containing titanium including but not limited to: tetraethyl titanate, acetyltripropyl titanate, tetrapropyl titanate, tetrabutyl titanate, polybutyl titanate, 2-ethylhexyltitanate, octyleneglycol titanate, lactate titanate, triethanolamine titanate, acetylacetonate titanate, ethylacetoacetic ester titanate, isostearyl titanate, acetyl triisopropyl titanate, titanium tetraisopropoxide titanium glycolates, titanium butoxide, hexylene glycol titanate, and tetraisooctyl titanate, titanium dioxide, titanium dioxide/silicon dioxide coprecipitates, and titanium dioxide/zirconium dioxide coprecipitates. This invention includes but is not limited to the titanium dioxide/silicon dioxide coprecipitate catalyst described in U.S. Pat. No. 6,559,272.

The polyester portion of the polyester compositions useful in the invention can be made by processes known from the literature such as, for example, by processes in homogenous solution, by transesterification processes in the melt, and by two phase interfacial processes. Suitable methods include, but are not limited to, the steps of reacting one or more dicarboxylic acids with one or more glycols at a temperature of 100° C. to 315° C. at a pressure of 0.1 to 760 mm Hg for a time sufficient to form a polyester. See U.S. Pat. No. 3,772,405 for methods of producing polyesters, the disclosure regarding such methods is hereby incorporated herein by reference.

The polyester in general may be prepared by condensing the dicarboxylic acid or dicarboxylic acid ester with the glycol in the presence of the titanium catalyst and/or titanium and tin catalysts described herein at elevated temperatures increased gradually during the course of the condensation up to a temperature of about 225°-310° C., in an inert atmosphere, and conducting the condensation at low pressure during the latter part of the condensation, as described in further detail in U.S. Pat. No. 2,720,507 incorporated herein by reference.

In another aspect, this invention relates to a process for preparing copolyesters of the invention. In one embodiment, the process relates to preparing copolyesters comprising terephthalic acid, 2,2,4,4-tetramethyl-1,3-cyclobutanediol, and 1,4-cyclohexanedimethanol. This process comprises the steps of:

(A) heating a mixture comprising the monomers useful in the polyesters of the invention in the presence of at least one tin catalyst and at least one phosphate ester at a temperature of 150 to 250° C. for a time sufficient to produce an initial polyester;

(B) polycondensing the product of Step (A) by heating it at a temperature of 230 to 320° C. for 1 to 6 hours; and (C) removing any unreacted glycols.

Reaction times for the esterification Step (A) are dependent upon the selected temperatures, pressures, and feed mole ratios of glycol to dicarboxylic acid.

In one embodiment, step (A) can be carried out until 50% by weight or more of the 2,2,4,4-tetramethyl-1,3-cyclobutanediol has been reacted. Step (A) may be carried out under pressure, ranging from 0 psig to 100 psig. The term "reaction product" as used in connection with any of the catalysts useful in the invention refers to any product of a polycondensation or esterification reaction with the catalyst and any of the monomers used in making the polyester as well as the product of a polycondensation or esterification reaction between the catalyst and any other type of additive.

Typically, Step (B) and Step (C) can be conducted at the same time. These steps can be carried out by methods known in the art such as by placing the reaction mixture under a pressure ranging, from 0.002 psig to below atmospheric pressure, or by blowing hot nitrogen gas over the mixture.

In one embodiment, the invention relates to a process hereinafter referred to as "PROCESS COMPRISING TITANIUM", for making a polyester comprising the following steps:

(I) heating a mixture at at least one temperature chosen from 150° C. to 250° C., under at least one pressure chosen from the range of 0 psig to 75 psig wherein said mixture comprises:

(a) a dicarboxylic acid component comprising:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 40 mole % 2,2,4,4-tetramethyl-1,3-cyclobutanediol residues; and (ii) about 20 to about 40 mole % cyclohexanedimethanol residues;
(v) ethylene glycol residues, and
(vi) less than about 2 mole % of a modifying glycol having from 3 to 16 carbon atoms;
wherein the molar ratio of glycol component/dicarboxylic acid component added in Step (I) is 1.01-3.0/1.0;
wherein the mixture in Step (I) is heated in the presence of:
(i) at least one catalyst comprising at least one titanium compound, and, optionally, at least one catalyst chosen from tin, gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and wherein the total mole % of the glycol component of the final polyester is 100 mole %;
wherein the sum of the mole percentages of 2,2,4,4-tetramethyl-1,3-cyclobutanediol and cyclohexanedimethanol of the final polyester is from 40 to less than 70 mole % of the total mole % of the glycol component, and
wherein the inherent viscosity of the polyester is from 0.50 to 1.2 dL/g as determined in 60/40 (wt/wt) phenol/tetrachloroethane at a concentration of 0.25 g/50 ml at 25° C.

In one embodiment, the invention relates to a process, hereinafter referred to as "PROCESS COMPRISING TIN AND TITANIUM", for making a polyester comprising the following steps:
(I) heating a mixture at at least one temperature chosen from 150° C. to 250° C., under at least one pressure chosen from the range of 0 psig to 75 psig wherein said mixture comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 20 to about 40 mole % 2,2,4,4-tetramethyl-1,3-cyclobutanediol residues; and
(ii) about 20 to about 40 mole % cyclohexanedimethanol residues;
(v) ethylene glycol residues, and
(vi) less than about 2 mole % of a modifying glycol having from 3 to 16 carbon atoms;
wherein the molar ratio of glycol component/dicarboxylic acid component added in Step (I) is 1.01-3.0/1.0;
wherein the mixture in Step (I) is heated in the presence of: (i) at least one catalyst comprising at least one titanium compound, at least one tin compound, and optionally, at least one catalyst chosen from gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and wherein the total mole % of the glycol component of the final polyester is 100 mole %;
wherein the sum of the mole percentages of 2,2,4,4-tetramethyl-1,3-cyclobutanediol and cyclohexanedimethanol of the final polyester is from 40 to less than 70 mole % of the total mole % of the glycol component, and
wherein the inherent viscosity of the polyester is from 0.50 to 1.2 dL/g as determined in 60/40 (wt/wt) phenol/tetrachloroethane at a concentration of 0.25 g/50 ml at 25° C.

In the processes of the invention referred to as "PROCESS COMPRISING TITANIUM" and "PROCESS COMPRISING TITANIUM AND TIN", at least one phosphorus compound, for example, at least one phosphate ester, can be added to Step (I), Step (II) and/or Steps (I) and (II) and/or after Steps (I) and (II).

In any of the processes of the invention useful in making the polyesters useful in the invention, at least one phosphorus compound and/or reaction products thereof, and mixtures thereof can be added either during esterification, polycondensation, or both and/or it can be added post-polymerization. In one embodiment, the phosphorus compounds useful in any of the processes of the invention can be added during esterificaton. In one embodiment, if the phosphorus compound(s) useful in the invention is added after both esterification and polycondensation, it is added in the amount of 0.01 to 2 weight % based on the total weight of the final polyester. In one embodiment, the phosphorus compound can comprise at least one phosphate ester. In one embodiment, the phosphorus compound can comprise at least one phosphorus compound which is added during the esterificaton step. In one embodiment, the phosphorus compound can comprise at least one phosphate ester, for example, which is added during the esterificaton step.

It is believed that any of the processes of making the polyesters useful in the invention may be used to make any of the polyesters useful in the invention.

Reaction times for the esterification Step (I) of any of the processes of the invention are dependent upon the selected temperatures, pressures, and feed mole ratios of glycol to dicarboxylic acid.

In one embodiment, the pressure used in Step (II) of any of the processes of the invention consists of at least one pressure chosen from 20 torr absolute to 0.02 torr absolute; in one embodiment, the pressure used in Step (II) of any of the processes of the invention consists of at least one pressure chosen from 10 torr absolute to 0.02 torr absolute; in one embodiment, the pressure used in Step (II) of any of the processes of the invention consists of at least one pressure chosen from 5 torr absolute to 0.02 torr absolute; in one embodiment, the pressure used in Step (II) of any of the processes of the invention consists of at least one pressure chosen from 3 torr absolute to 0.02 torr absolute; in one embodiment, the pressure used in Step (II) of any of the processes of the invention consists of at least one pressure chosen from 20 torr absolute to 0.1 torr absolute; in one embodiment, the pressure used in Step (II) of any of the processes of the invention consists of at least one pressure chosen from 10 torr absolute to 0.1 torr absolute; in one embodiment, the pressure used in Step (II) of any of the processes of the invention consists of at least one pressure chosen from 5 torr absolute to 0.1 torr absolute; in one embodiment, the pressure used in Step (II) of any of the processes of the invention consists of at least one pressure chosen from 3 torr absolute to 0.1 torr absolute.

In one aspect, the molar ratio of glycol component/dicarboxylic acid component added in Step (I) of any of the processes of the invention is 1.0-3.0/1.0 one aspect, the molar ratio of glycol component/dicarboxylic acid component added in Step (I) of any of the processes of the invention is 1.0-2.5/1.0 one aspect, the molar ratio of glycol component/dicarboxylic acid component added in Step (I) of any of the processes of the invention is 1.0-2.0/1.0 one aspect, the molar ratio of glycol component/dicarboxylic acid component added in Step (I) of any of the processes of the invention is 1.0-1.75/1.0; in one aspect, the molar ratio of glycol component/dicarboxylic acid component added in Step (I) of any of the processes of the invention is 1.0-1.5/1.0.

In one aspect, the molar ratio of glycol component/dicarboxylic acid component added in Step (I) of any of the processes of the invention is 1.01-3.0/1.0; one aspect, the molar ratio of glycol component/dicarboxylic acid component added in Step (I) of any of the processes of the invention is 1.01-2.5/1.0; one aspect, the molar ratio of glycol component/dicarboxylic acid component added in Step (I) of any of the processes of the invention is 1.01-2.0/1.0; one aspect, the molar ratio of glycol component/dicarboxylic acid component added in Step (I) of any of the processes of the invention is 1.01-1.75/1.0; in one aspect, the molar ratio of glycol component/dicarboxylic acid component added in Step (I) of any of the processes of the invention is 1.01-1.5/1.0.

In any of the process embodiments for making the polyester(s) useful in the invention, the heating time of Step (II) may be from 1 to 5 hours or 1 to 4 hours or 1 to 3 hours or 1.5 to 3 hours or 1 to 2 hours. In one embodiment, the heating time of Step (II) can be from 1.5 to 3 hours.

In one embodiment, the polyester(s), polyester compositions and/or processes of the invention can comprise phosphorus atoms.

In one embodiment, the polyester(s), polyester compositions and/or processes of the invention can comprise tin atoms.

In one embodiment, the polyester(s), polyester compositions and/or processes of the invention can comprise titanium and tin atoms.

In one embodiment, the polyester(s), polyester compositions and/or processes of the invention useful in the invention can comprise phosphorus atoms and titanium atoms.

In one embodiment, the polyester(s), polyester compositions and/or processes of the invention useful in the invention can comprise phosphorus atoms and tin atoms.

In one embodiment, the polyester(s), polyester compositions and/or processes of the invention useful in the invention can comprise phosphorus atoms, tin atoms, and titanium atoms.

In one embodiment, any of the polyester(s), polyester compositions and/or processes of the invention may comprise at least one phosphorus compound.

In one embodiment, any of the polyester(s), polyester compositions and/or processes of the invention may comprise at least one titanium compound.

In one embodiment, any of the polyester(s), polyester compositions and/or processes of the invention may comprise at least one tin compound.

In one embodiment, any of the polyester(s), polyester compositions and/or processes of the invention may comprise at least one titanium compound and at least one phosphorus compound.

In one embodiment, any of the polyester(s), polyester compositions and/or processes of making the polyesters useful in the invention may comprise at least one tin compound and at least one titanium compound.

In one embodiment, any of the polyester(s), polyester compositions and/or processes of making the polyesters useful in the invention may comprise at least one tin compound, at least one titanium compound, and at least one phosphorus compound.

In one embodiment, the addition of the phosphorus compound(s) in the process(es) of the invention can result in a weight ratio of total phosphorus atoms to total tin atoms in the final polyester of 0-20:1. In one embodiment, the addition of the phosphorus compound(s) in the process(es) of the invention can result in a weight ratio of total phosphorus atoms to total tin atoms in the final polyester of 1-20:1. In one embodiment, the addition of the phosphorus compound(s) in the process(es) of the invention can result in a weight ratio of total phosphorus atoms to total tin atoms in the final polyester of 0-15:1. In one embodiment, the addition of the phosphorus compound(s) in the process(es) of the invention can result in a weight ratio of total phosphorus atoms to total tin atoms in the final polyester of 1-15:1. In one embodiment, the addition of the phosphorus compound(s) in the process(es) can result in a weight ratio of total phosphorus atoms to total tin atoms in the final polyester of 0-10:1. In one embodiment, the addition of the phosphorus compound(s) in the process(es) of the invention can result in a weight ratio of total phosphorus atoms to total tin atoms in the final polyester of 1-10:1. In one embodiment, the addition of the phosphorus compound(s) in the process(es) can result in a weight ratio of total phosphorus atoms to total tin atoms in the final polyester of 0-5:1. In one embodiment, the addition of the phosphorus compound(s) in the process(es) of the invention can result in a weight ratio of total phosphorus atoms to total tin atoms in the final polyester of 1-5:1. In one embodiment, the addition of the phosphorus compound(s) in the process(es) can result in a weight ratio of total phosphorus atoms to total tin atoms in the final polyester of 0-3:1. In one embodiment, the addition of the phosphorus compound(s) in the process(es) can result in a weight ratio of total phosphorus atoms to total tin atoms in the final polyester of 1-3:1. For example, the weight of tin atoms and phosphorus atoms present in the final polyester can be measured in ppm and can result in a weight ratio of total phosphorus atoms to total tin atoms in the final polyester of any of the aforesaid weight ratios.

In one embodiment, the amount of tin atoms in the polyesters useful in the invention can be from 0 to 400 ppm tin atoms based on the weight of the final polyester.

In one embodiment, the amount of tin atoms in the polyesters useful in the invention can be from 15 to 400 ppm tin atoms based on the weight of the final polyester.

In one embodiment, the amount of titanium atoms in the polyesters useful in the invention can be from 0 to 400 ppm titanium atoms based on the weight of the final polyester.

In one embodiment, the amount of titanium atoms in the polyesters useful in the invention can be from 15 to 400 ppm titanium atoms based on the weight of the final polyester.

In one embodiment, the amount of phosphorus atoms in the polyesters useful in the invention can be from 1 to 500 ppm phosphorus atoms based on the weight of the final polyester.

In one embodiment, the amount of tin atoms in the polyesters useful in the invention can be from 1 to 400 ppm tin atoms based on the weight of the final polyester and the amount of phosphorus atoms in the final polyesters useful in the invention can be from 1 to 500 ppm phosphorus atoms based on the weight of the final polyester.

In one embodiment, the amount of phosphorus atoms in the polyesters useful in the invention can be from 1 to 500 ppm phosphorus atoms based on the weight of the final polyester and the amount of titanium atoms in the polyester can be from 1 to 400 ppm titanium atoms based on the weight of the final polyester.

In one embodiment, the amount of phosphorus atoms in the polyesters useful in the invention can be from 1 to 500 ppm phosphorus atoms based on the weight of the final polyester and the amount of titanium atoms in the polyester can be from 1 to 100 ppm titanium atoms based on the weight of the final polyester.

In one embodiment, the amount of phosphorus atoms in the polyester(s) useful in the invention can be from 1 to 500 ppm phosphorus atoms based on the weight of the final polyester, the amount of tin atoms in the polyester(s) useful in the invention can be from 1 to 400 ppm tin atoms based on the weight of the final polyester, and the amount of titanium atoms in the polyester can be from 1 to 100 ppm titanium atoms based on the weight of the final polyester.

The invention further relates to the polyester compositions made by the process(es) described above.

The invention further relates to a polymer blend. The blend comprises:

(a) from 5 to 95 weight % of at least one of the polyesters described above; and (b) from 5 to 95 weight % of at least one of the polymeric components.

Suitable examples of the polymeric components include, but are not limited to, nylon; polyesters different than those described herein; polyamides such as ZYTEL® from DuPont; polystyrene; polystyrene copolymers; styrene acrylonitrile copolymers; acrylonitrile butadiene styrene copolymers; poly(methylmethacrylate); acrylic copolymers; poly (ether-imides) such as ULTEM® (a poly(ether-imide) from General Electric); polyphenylene oxides such as poly(2,6-dimethylphenylene oxide) or poly(phenylene oxide)/polystyrene blends such as NORYL 1000® (a blend of poly(2,6-dimethylphenylene oxide) and polystyrene resins from General Electric); polyphenylene sulfides; polyphenylene sulfide/sulfones; poly(ester-carbonates); polycarbonates such as LEXAN® (a polycarbonate from General Electric); polysulfones; polysulfone ethers; and poly(ether-ketones) of aromatic dihydroxy compounds; or mixtures of any of the foregoing polymers. The blends can be prepared by conventional processing techniques known in the art, such as melt blending or solution blending. In one embodiment, polycarbonate is not present in the polyester composition. If polycarbonate is used in a blend in the polyester compositions of the invention, the blends can be visually clear. However, polyester compositions useful in the invention also contemplate the exclusion of polycarbonate as well as the inclusion of polycarbonate.

Polycarbonates useful in the invention may be prepared according to known procedures, for example, by reacting the dihydroxyaromatic compound with a carbonate precursor such as phosgene, a haloformate or a carbonate ester, a molecular weight regulator, an acid acceptor and a catalyst. Methods for preparing polycarbonates are known in the art and are described, for example, in U.S. Pat. No. 4,452,933, where the disclosure regarding the preparation of polycarbonates is hereby incorporated by reference herein.

Examples of suitable carbonate precursors include, but are not limited to, carbonyl bromide, carbonyl chloride, and mixtures thereof; diphenyl carbonate; a di(halophenyl)carbonate, e.g., di(trichlorophenyl) carbonate, di(tribromophenyl) carbonate, and the like; di(alkylphenyl)carbonate, e.g., di(tolyl) carbonate; di(naphthyl)carbonate; di(chloronaphthyl)carbonate, and mixtures thereof; and bis-haloformates of dihydric phenols.

Examples of suitable molecular weight regulators include, but are not limited to, phenol, cyclohexanol, methanol, alkylated phenols, such as octylphenol, para-tertiary-butyl-phenol, and the like. In one embodiment, the molecular weight regulator is phenol or an alkylated phenol.

The acid acceptor may be either an organic or an inorganic acid acceptor. A suitable organic acid acceptor can be a tertiary amine and includes, but is not limited to, such materials as pyridine, triethylamine, dimethylaniline, tributylamine, and the like. The inorganic acid acceptor can be either a hydroxide, a carbonate, a bicarbonate, or a phosphate of an alkali or alkaline earth metal.

The catalysts used in making the polycarbonates useful in the invention that can be used include, but are not limited to, those that typically aid the polymerization of the monomer with phosgene. Suitable catalysts include, but are not limited to, tertiary amines such as triethylamine, tripropylamine, N,N-dimethylaniline, quaternary ammonium compounds such as, for example, tetraethylammonium bromide, cetyl triethyl ammonium bromide, tetra-n-heptylammonium iodide, tetra-n-propyl ammonium bromide, tetramethyl ammonium chloride, tetra-methyl ammonium hydroxide, tetra-n-butyl ammonium iodide, benzyltrimethyl ammonium chloride and quaternary phosphonium compounds such as, for example, n-butyltriphenyl phosphonium bromide and methyltriphenyl phosphonium bromide.

The polycarbonates useful in the polymer blends of the invention also may be copolyestercarbonates such as those described in U.S. Pat. Nos. 3,169,121; 3,207,814; 4,194,038; 4,156,069; 4,430,484, 4,465,820, and 4,981,898, where the disclosure regarding copolyestercarbonates from each of the U.S. patents is incorporated by reference herein.

Copolyestercarbonates useful in this invention can be available commercially and/or may be prepared by known methods in the art. For example, they can be typically obtained by the reaction of at least one dihydroxyaromatic compound with a mixture of phosgene and at least one dicarboxylic acid chloride, especially isophthaloyl chloride, terephthaloyl chloride, or both.

In addition, the polyester compositions and the polymer blend compositions useful in the invention may also contain from 0.01 to 25% by weight of the overall composition common additives such as colorants, toner(s), dyes, mold release agents, flame retardants, plasticizers, nucleating agents, stabilizers, including but not limited to, UV stabilizers, thermal stabilizers and/or reaction products thereof, fillers, and impact modifiers. Examples of typical commercially available impact modifiers well known in the art and useful in this invention include, but are not limited to, ethylene/propylene terpolymers, functionalized polyolefins such as those containing methyl acrylate and/or glycidyl methacrylate, styrene-based block copolymeric impact modifiers, and various acrylic core/shell type impact modifiers. Residues of such additives are also contemplated as part of the polyester composition.

In addition, certain agents which colorize the polymer can be added to the melt. In one embodiment, a bluing toner is added to the melt in order to reduce the b* of the resulting polyester polymer melt phase product. Such bluing agents include blue inorganic and organic toner(s). In addition, red toner(s) can also be used to adjust the a* color. Organic toner(s), e.g., blue and red organic toner(s), such as those toner(s) described in U.S. Pat. Nos. 5,372,864 and 5,384,377, which are incorporated by reference in their entirety, can be used. The organic toner(s) can be fed as a premix composition. The premix composition may be a neat blend of the red and blue compounds or the composition may be pre-dissolved or slurried in one of the polyester's raw materials, e.g., ethylene glycol.

The total amount of toner components added depends, of course, on the amount of inherent yellow color in the base polyester and the efficacy of the toner. Generally, a concentration of up to about 15 ppm of combined organic toner components and a minimum concentration of about 0.5 ppm are used. The total amount of bluing additive typically ranges from 0.5 to 10 ppm.

The toner(s) can be added to the esterification zone or to the polycondensation zone. Preferably, the toner(s) are added to the esterification zone or to the early stages of the polycondensation zone, such as to a prepolymerization reactor.

Reinforcing materials may be useful in the compositions of this invention. The reinforcing materials may include, but are not limited to, carbon filaments, silicates, mica, clay, talc, titanium dioxide, Wollastonite, glass flakes, glass beads and fibers, and polymeric fibers and combinations thereof. In one embodiment, the reinforcing materials include glass, such as, fibrous glass filaments, mixtures of glass and talc, glass and mica, and glass and polymeric fibers.

The invention further relates to the film(s) and/or sheet(s) comprising the polyester compositions and/or polymer blends of the invention. The methods of forming the polyesters and/or blends into film(s) and/or sheet(s) are well known in the art. Examples of film(s) and/or sheet(s) of the invention including but not limited to extruded film(s) and/or sheet(s), calendered film(s) and/or sheet(s), compression molded film(s) and/or sheet(s), solution casted film(s) and/or sheet(s). Methods of making film and/or sheet include but are not limited to extrusion, calendering, compression molding, and solution casting.

Examples of potential articles made from film and/or sheet useful in the invention include, but are not limited to, uniaxially stretched film, biaxially stretched film, shrink film (whether or not uniaxially or biaxially stretched), liquid crystal display film (including, but not limited to, diffuser sheets, compensation films and protective films), thermoformed sheet, graphic arts film, outdoor signs, skylights, coating(s), coated articles, painted articles, laminates, laminated articles, and/or multiwall films or sheets.

"Graphic art film," as used herein, is a film having a thermally-curable ink (e.g., heat-curable ink or air-curable ink) or radiation-curable ink (e.g., ultra-violet-curable ink) printed thereon or therein. "Curable" refers to capable of undergoing polymerization and/or crosslinking. In addition to the ink, the graphic art film may optionally also include varnishes, coatings, laminates, and adhesives.

Exemplary thermally or air-cured inks involve pigment(s) dispersed in one or more standard carrier resins. The pigment can be 4B Toner (PR57), 2B Toner (PR48), Lake Red C (PR53), lithol red (PR49), iron oxide (PR101), Permanent Red R (PR4), Permanent Red 2G (PO5), pyrazolone orange (PO13), diaryl yellows (PY12, 13, 14), monoazo yellows (PY3,5,98), phthalocyanine green (PG7), phthalocyanine Blue, β form (PB15), ultramarine (PB62), permanent violet (PV23), titanium dioxide (PW6), carbon black (furnace/channel PB7), PMTA pink, green, blue, violet (PR81, PG1, PB1, PV3,), copper ferrocyanide dye complexes (PR169, PG45, PB62, PV27), or the like. (Parenthetical identifications in the foregoing refer to the generic color index prepared by the Society of Dyers and Colourists.) Such pigments and combinations thereof can be used to obtain various colors including, but not limited to, white, black, blue, violet, red, green, yellow, cyan, magenta, or orange.

Other exemplary inks, including radiation-cured inks are disclosed in U.S. Pat. No. 5,382,292, where the disclosure of such inks are incorporated herein by reference.

Examples of typical carrier resins used in standard inks include those which have nitrocellulose, amide, urethane, epoxide, acrylate, and/or ester functionalities. Standard carrier resins include one or more of nitrocellulose, polyamide, polyurethane, ethyl cellulose, cellulose acetate propionate, (meth)acrylates, poly(vinyl butyral), poly(vinyl acetate), poly(vinyl chloride), and the like. Such resins can be blended, with widely used blends including nitrocellulose/polyamide and nitrocellulose/polyurethane.

Ink resin(s) normally can be solvated or dispersed in one or more solvents. Typical solvents employed include, but are not limited to, water, alcohols (e.g., ethanol, 1-propanol, isopropanol, etc.), acetates (e.g., n-propyl acetate), aliphatic hydrocarbons, aromatic hydrocarbons (e.g., toluene), and ketones. Such solvents typically can be incorporated in amounts sufficient to provide inks having viscosities, as measured on a #2 Zahn cup as known in the art, of at least 15 seconds, such as at least 20 seconds, at least 25 seconds, or from 25 to 35 seconds.

In one embodiment, the polyester have sufficient $T_g$ values to allow thermoformability, and to allow ease of printing.

In one embodiment, the graphic art film has at least one property chosen from thermoformability, toughness, clarity, chemical resistance, $T_g$, and flexibility.

Graphic art films can be used in a variety of applications, such as, for example, in-mold decorated articles, embossed articles, hard-coated articles. The graphic art film can be smooth or textured.

Exemplary graphic art films include, but are not limited to, nameplates; membrane switch overlays (e.g., for an appliance); point of purchase displays; flat or in-mold decorative panels on washing machines; flat touch panels on refrigerators (e.g., capacitive touch pad arrays); flat panel on ovens; decorative interior trim for automobiles (e.g., a polyester laminate); instrument clusters for automobiles; cell phone covers; heating and ventilation control displays; automotive console panels; automotive gear shift panels; control displays or warning signals for automotive instrument panels; facings, dials or displays on household appliances; facings, dials or displays on washing machines; facings, dials or displays on dishwashers; keypads for electronic devices; keypads for mobile phones, personal digital assistants (PDAs, or handheld computers) or remote controls; displays for electronic devices; displays for hand-held electronic devices such as phones and PDAs; panels and housings for mobile or standard phones; logos on electronic devices; and logos for hand-held phones.

Multiwall film or sheet refers to sheet extruded as a profile consisting of multiple layers that are connected to each other by means of vertical ribs. Examples of multiwall film or sheet include but are not limited to outdoor shelters (for example, greenhouses and commercial canopies).

Examples of extruded articles comprising the polyester compositions useful in this invention include, but are not limited to, thermoformed sheet, film for graphic arts applications, outdoor signs, skylights, multiwall film, plastic film for plastic glass laminates, and liquid crystal display (LCD) films, including but not limited to, diffuser sheets, compensation films, and protective films for LCDs.

In one embodiment, the present invention comprises a thermoplastic article, typically in the form of sheet material, having a decorative material embedded therein which comprise any of the compositions described herein.

"Outdoor sign," as used herein, refers to a surface formed from the polyester described herein, or containing symbols (e.g., numbers, letters, words, pictures, etc.), patterns, or designs coated with the polyester or polyester film described herein. In one embodiment, the outdoor sign comprises a polyester containing printed symbols, patterns, or designs. In one embodiment, the sign is capable of withstanding typical weather conditions, such as rain, snow, ice, sleet, high humidity, heat, wind, sunlight, or combinations thereof, for a sufficient period of time, e.g., ranging from one day to several years or more.

Exemplary outdoor signs include, but are not limited to, billboards, neon signs, electroluminescent signs, electric signs, fluorescent signs, and light emitting diode (LED) displays. Other exemplary signs include, but are not limited to, painted signs, vinyl decorated signs, thermoformed signs, and hardcoated signs.

In one embodiment, the outdoor sign has at least one property chosen from thermoformability, toughness, clarity, chemical resistance, and $T_g$.

A "vending machine display panel," as used herein, refers to a front or side panel on a vending machine that allows a customer to view the items for sale, or advertisement regarding such items. In one embodiment, the vending machine display panel can be a visually clear panel of a vending machine through which a consumer can view the items on sale. In other embodiments, the vending machine display panel can have sufficient rigidity to contain the contents within the machine and/or to discourage vandalism and/or theft.

In one embodiment, the vending machine display panel can have dimensions well known in the art, such as planar display panels in snack, beverage, popcorn, or sticker/ticket vending machines, and capsule display panels as in, e.g., gumball machines or bulk candy machines.

In one embodiment, the vending machine display panel can optionally contain advertising media or product identification indicia. Such information can be applied by methods well known in the art, e.g., silk screening.

In one embodiment, the vending machine display panel can be resistant to temperatures ranging from −100 to 120° C. In another embodiment, the vending machine display panel can be UV resistant by the addition of, e.g., at least one UV additive, as disclosed herein.

In one embodiment, the vending machine display panel has at least one property chosen from thermoformability, toughness, clarity, chemical resistance, and $T_g$.

"Point of purchase display," as used herein, refers to a wholly or partially enclosed casing having at least one visually clear panel for displaying an item. Point of purchase displays are often used in retail stores to for the purpose of catching the eye of the customer. Exemplary point of purchase displays include enclosed wall mounts, countertops, enclosed poster stands, display cases (e.g., trophy display cases), sign frames, and cases for computer disks such as CDs and DVDs. The point of purchase display can include shelves, and additional containers, such as holders for magazines or pamphlets. One of ordinary skill in the art can readily envision the shape and dimensions for the point of purchase display depending on the item to be displayed. For example, the display can be as small as a case for jewelry, or a larger enclosed cabinet for displaying multiple trophies.

In one embodiment, the point of purchase display has at least one property chosen from toughness, clarity, chemical resistance, $T_g$, and hydrolytic stability.

"Appliance parts," as used herein, refers to a rigid piece used in conjunction with an appliance. In one embodiment, the appliance part is partly or wholly separable from the appliance. In another embodiment, the appliance part is one that is typically made from a polymer. In one embodiment, the appliance part is visually clear.

Exemplary appliance parts include those requiring toughness and durabilty, such as cups and bowls used with food processors, mixers, blenders, and choppers; parts that can withstand refrigerator and freezer temperatures (e.g., refrigerator temperatures ranging from greater than 0° C. (e.g., 2° C.) to 5° C., or freezer temperatures, e.g., at temperatures less than 0° C., such as temperatures ranging from −20 to 0° C., e.g., −18° C.), such as refrigerator and freezer trays, bins, and shelves; parts having sufficient hydrolytic stability at temperatures up to 90° C., such as washing machine doors, steam cleaner canisters, tea kettles, and coffee pots; and vacuum cleaner canisters and dirt cups.

In one embodiment, these appliance parts have at least one property chosen from toughness, clarity, chemical resistance, $T_g$, hydrolytic stability, and dishwasher stability. The appliance part can also be chosen from steam cleaner canisters, which, in one embodiment, can have at least one property chosen from toughness, clarity, chemical resistance, $T_g$, and hydrolytic stability.

In one embodiment, the polyesters useful in the appliance part has a $T_g$ of 105 to 140° C.

"Skylight," as used herein, refers to a light permeable panel secured to a roof surface such that the panel forms a portion of the ceiling. In one embodiment, the panel is rigid, e.g., has dimensions sufficient to achieve stability and durability, and such dimensions can readiliy be determined by one skilled in the art. In one embodiment, the skylight panel has a thickness greater than 3/16 inches, such as a thickness of at least 1/2 inches.

In one embodiment, the skylight panel is visually clear. In one embodiment, the skylight panel can transmit at least 35% visible light, at least 50%, at least 75%, at least 80%, at least 90%, or even at least 95% visible light. In another embodiment, the skylight panel comprises at least one UV additive that allows the skylight panel to block up to 80%, 90%, or up to 95% UV light.

In one embodiment, the skylight has at least one property chosen from thermoformability, toughness, clarity, chemical resistance, and $T_g$.

"Outdoor shelters," as used herein, refer to a roofed and/or walled structure capable of affording at least some protection from the elements, e.g., sunlight, rain, snow, wind, cold, etc., having at least one rigid panel. In one embodiment, the outdoor shelter has at least a roof and/or one or more walls. In one embodiment, the outdoor shelter has dimensions sufficient to achieve stability and durability, and such dimensions can readiliy be determined by one skilled in the art. In one embodiment, the outdoor shelter panel has a thickness greater than 3/16 inches.

In one embodiment, the outdoor shelter panel is visually clear. In one embodiment, the outdoor shelter panel can transmit at least 35% visible light, at least 50%, at least 75%, at least 80%, at least 90%, or even at least 95% visible light. In another embodiment, the outdoor shelter panel comprises at least one UV additive that allows the outdoor shelter to block up to 80%, 90%, or up to 95% UV light.

Exemplary outdoor shelters include security glazings, transportation shelters (e.g., bus shelters), telephone kiosks, and smoking shelters. In one embodiment, where the shelter is a transportation shelter, telephone kiosk, or smoking shelter, the shelter has at least one property chosen from thermoformability, toughness, clarity, chemical resistance, and $T_g$. In one embodiment, where the shelter is a security glazing, the shelter has at least one property chosen from toughness, clarity, chemical resistance, and $T_g$.

A "canopy," as used herein, refers to a roofed structure capable of affording at least some protection from the elements, e.g., sunlight, rain, snow, wind, cold, etc. In one embodiment, the roofed structure comprises, either in whole or in part, at least one rigid panel, e.g., has dimensions sufficient to achieve stability and durability, and such dimensions can readiliy be determined by one skilled in the art. In one embodiment, the canopy panel has a thickness greater than 3/16 inches, such as a thickness of at least ½ inches.

In one embodiment, the canopy panel is visually clear. In one embodiment, the canopy panel can transmit at least 35% visible light, at least 50%, at least 75%, at least 80%, at least 90%, or even at least 95% visible light. In another embodiment, the canopy panel comprises at least one UV additive that allows the canopy to block up to 80%, 90%, or up to 95% UV light.

Exemplary canopies include covered walkways, roof lights, sun rooms, airplane canopies, and awnings. In one embodiment, the canopy has at least one property chosen from toughness, clarity, chemical resistance, $T_g$, and flexibility.

A "sound barrier," as used herein, refers to a rigid structure capable of reducing the amount of sound transmission from one point on a side of the structure to another point on the other side when compared to sound transmission between two points of the same distance without the sound barrier. The effectiveness in reducing sound transmission can be assessed by methods known in the art. In one embodiment, the amount of sound transmission that is reduced ranges from 25% to 90%.

In another embodiment, the sound barrier can be rated as a sound transmission class value, as described in, for example, ASTM E90, "Standard Test Method for Laboratory Measurement of Airborne Sound Transmission Loss of Building Partitions and Elements," and ASTM E413, "Classification of Rating Sound Insulation." An STC 55 barrier can reduce the sound of a jet engine, ~130 dBA, to 60 dBA, which is the sound level within a typical office. A sound proof room can have a sound level ranging from 0-20 dBA. One of ordinary skill in the art can construct and arrange the sound barrier to achieve a desired STC rating. In one embodiment, the sound barrier has an STC rating of at least 20, such as a rating ranging from 20 to 60.

In one embodiment, the sound barrier comprises a plurality of panels connected and arranged to achieve the desired barrier outline. The sound barriers can be used along streets and highways to dampen automotive noises. Alternatively, the sound barriers can be used in the home or office, either as a discrete panel or panels, or inserted within the architecture of the walls, floors, ceilings, doors, and/or windows.

In one embodiment, the sound barrier is visually clear. In one embodiment, the sound barrier can transmit at least 35% visible light, at least 50%, at least 75%, at least 80%, at least 90%, or even at least 95% visible light. In another embodiment, the sound barrier comprises at least one UV additive that allows the sound barrier to block up to 80%, 90%, or up to 95% UV light.

In one embodiment, the sound barrier has at least one property chosen from toughness, clarity, chemical resistance, and $T_g$.

A "greenhouse," as used herein, refers to an enclosed structure used for the cultivation and/or protection of plants. In one embodiment, the greenhouse is capable of maintaining a humidity and/or gas (oxygen, carbon dioxide, nitrogen, etc.) content desirable for cultivating plants while being capable of affording at least some protection from the elements, e.g., sunlight, rain, snow, wind, cold, etc. In one embodiment, the roof of the greenhouse comprises, either in whole or in part, at least one rigid panel, e.g., has dimensions sufficient to achieve stability and durability, and such dimensions can readiliy be determined by one skilled in the art. In one embodiment, the greenhouse panel has a thickness greater than 3/16 inches, such as a thickness of at least ½ inches.

In one embodiment, the greenhouse panel is visually clear. In another embodiment, substantially all of the roof and walls of the greenhouse are visually clear. In one embodiment, the greenhouse panel can transmit at least 35% visible light, at least 50%, at least 75%, at least 80%, at least 90%, or even at least 95% visible light. In another embodiment, the greenhouse panel comprises at least one UV additive that allows the greenhouse panel to block up to 80%, 90%, or up to 95% UV light.

In one embodiment, the greenhouse panel has at least one property chosen from toughness, clarity, chemical resistance, and $T_g$.

"optical medium," as used herein, refers to an information storage medium in which information is recorded by irradiation with a laser beam, e.g., light in the visible wavelength region, such as light having a wavelength ranging from 600 to 700 nm. By the irradiation of the laser beam, the irradiated area of the recording layer is locally heated to change its physical or chemical characteristics, and pits are formed in the irradiated area of the recording layer. Since the optical characteristics of the formed pits are different from those of the area having been not irradiated, the digital information is optically recorded. The recorded information can be read by reproducing procedure generally comprising the steps of irradiating the recording layer with the laser beam having the same wavelength as that employed in the recording procedure, and detecting the light-reflection difference between the pits and their periphery.

In one embodiment, the optical medium comprises a transparent disc having a spiral pregroove, a recording dye layer placed in the pregroove on which information is recorded by irradiation with a laser beam, and a light-reflecting layer. The optical medium is optionally recordable by the consumer. In one embodiment, the optical medium is chosen from compact discs (CDs) and digital video discs (DVDs). The optical medium can be sold with prerecorded information, or as a recordable disc.

In one embodiment, at least one of the following comprises the polyester of the invention: the substrate, at least one protective layer of the optical medium, and the recording layer of the optical medium.

In one embodiment, the optical medium has at least one property chosen from toughness, clarity, chemical resistance, $T_g$, and hydrolytic stability.

A "glass laminate," as used herein, refers to at least one coating on a glass, where at least one of the coatings comprises the polyester. The coating can be a film or a sheet. The glass can be clear, tinted, or reflective. In one embodiment, the laminate is permanently bonded to the glass, e.g., applying the laminate under heating and pressure to form a single, solid laminated glass product. One or both faces of the glass can be laminated. In certain embodiments, the glass laminate contains more than one coating comprising the polyester compositions of the present invention. In other embodiments, the glass laminate comprises multiple glass substrates, and more than one coating comprising the polyester compositions of the present invention.

Exemplary glass laminates include windows (e.g., windows for high rise buildings, building entrances), safety glass, windshields for transportation applications (e.g., automotive, buses, jets, armored vehicles), bullet proof or resistant glass, security glass (e.g., for banks), hurricane proof or resistant glass, airplane canopies, mirrors, solar glass panels, flat panel displays, and blast resistant windows. The glass laminate can be visually clear, be frosted, etched, or patterned.

In one embodiment the glass laminate can be resistant to temperatures ranging from −100 to 120° C. In another embodiment, the glass laminate can be UV resistant by the addition of, e.g., at least one UV additive, as disclosed herein.

Methods for laminating the films and/or sheets of the present invention to the glass are well known to one of ordinary skill in the art. Lamination without the use of an adhesive layer may be performed by vacuum lamination. To obtain an effective bond between the glass layer and the laminate, in one embodiment, the glass has a low surface roughness.

Alternatively, a double-sided adhesive tape, an adhesive layer, or a gelatin layer, obtained by applying, for example, a hotmelt, a pressure- or thermo-sensitive adhesive, or a UV or electron-beam curable adhesive, can be used to bond the laminate of the present invention to the glass. The adhesive layer may be applied to the glass sheet, to the laminate, or to both, and may be protected by a stripping layer, which can be removed just before lamination.

In one embodiment, the glass laminate has at least one property chosen from toughness, clarity, chemical resistance, hydrolytic stability, and $T_g$.

For the purposes of this invention, the term "wt" means "weight".

The following examples further illustrate how the polyesters of the invention can be made and evaluated, and are intended to be purely exemplary of the invention and are not intended to limit the scope thereof. Unless indicated otherwise, parts are parts by weight, temperature is in degrees C. or is at room temperature, and pressure is at or near atmospheric.

EXAMPLES

The following examples illustrate in general how copolyesters of this invention are prepared and the effect of using 2,2,4,4-tetramethyl-1,3-cyclobutanediol, 1,4-cyclohexanedimethanol, and ethylene glycol on various copolyester properties such as glass transition temperature, notched Izod impact strength, and flexural modulus, in comparison to other copolyesters based on 2,2,4,4-tetramethyl-1,3-cyclobutanediol. Additionally, based on the following examples, the skilled artisan will understand how certain catalyst systems and thermal stabilizers can be used in the preparation of polyesters of the invention.

Measurement Methods

The inherent viscosity of the polyesters was determined in 60/40 (wt/wt) phenol/tetrachloroethane at a concentration of 0.5 g/100 ml at 25° C., and is reported in dL/g.

Unless stated otherwise, the glass transition temperature ($T_g$) was determined using a TA DSC 2920 instrument from Thermal Analyst Instruments at a scan rate of 20° C./min according to ASTM D3418.

The glycol content and the cis/trans ratio of the compositions were determined by proton nuclear magnetic resonance (NMR) spectroscopy. All NMR spectra were recorded on a JEOL Eclipse Plus 600 MHz nuclear magnetic resonance spectrometer using either chloroform-trifluoroacetic acid (70-30 volume/volume) for polymers or, for oligomeric samples, 60/40 (wt/wt) phenol/tetrachloroethane with deuterated chloroform added for lock. Peak assignments for 2,2,4,4-tetramethyl-1,3-cyclobutanediol resonances were made by comparison to model mono- and dibenzoate esters of 2,2,4,4-tetramethyl-1,3-cyclobutanediol. These model compounds closely approximate the resonance positions found in the polymers and oligomers.

Unless stated otherwise, the polymers were dried in a dessicant dryer at 80° C. overnight prior to injection molding in a Boy 22S molding machine into ⅛×½×5-inch flexure bars. These bars were cut to a length of 2.5 inch and notched down the ½ inch width with a 10-mil notch. The Izod impact strength was determined as an average from measurements on 5 specimens and in accordance with ASTM D256. The flexural modulus was determined according to the procedures of ASTM D790.

Color values reported herein are CIELAB L*, a*, and b* values measured following ASTM D 6290-98 and ASTM E308-99, using measurements from a Hunter Lab Ultrascan XE Spectrophotometer (Hunter Associates Laboratory Inc., Reston, Va.) with the following parameters: (1) D65 illuminant, (2) 10 degree observer, (3) reflectance mode with specular angle included, (4) large area view, (5) 1" port size. Unless stated otherwise, the measurements were performed on polymer granules ground to pass a 6 mm sieve. Haze was measured on 4×4×⅛" plaques according to ASTM D-1003.

The amount of tin (Sn) and titanium (Ti) in the examples below is reported in parts per million (ppm) of metal and was measured by x-ray fluorescence (xrf) using a PANanalytical Axios Advanced wavelength dispersive x-ray fluorescence spectrometer. The amount of phosphorous is similarly reported as ppm of elemental phosphorus and was also measured by xrf using the same instrument. The values reported in the column "P measured" in the following examples were obtained by measuring phosphorous as described herein.

Unless otherwise specified, the cis/trans ratio of the 1,4 cyclohexanedimethanol used in the following examples was approximately 30/70 and could range from 35/65 to 25/75. Unless otherwise specified, the cis/trans ratio of the 2,2,4,4-tetramethyl-1,3-cyclobutanediol used in the following examples was approximately 50/50 and could range from 45/55 to 55/45.

The following abbreviations apply throughout the working examples and figures:

| | |
|---|---|
| CHDM | 1,4-cyclohexanedimethanol |
| DBTO | Dibutyltin oxide |
| DMT | Dimethyl therephthalate |
| DEG | Diethylene glycol |
| DMTO | Dimethyl tin oxide |
| EG | Ethylene glycol |
| IV | Inherent viscosity |
| $T_g$ | Glass transition temperature |
| TIIP | Titanium Isopropoxide |
| TMCD | 2,2,4,4-tetramethyl-1,3-cyclobutanediol |
| TPA | Terephthalic acid |
| TPP | Triphenyl phosphate |

Example 1

This example illustrates the preparation of polyesters comprising dimethyl terephthalate (DMT), 1,4-cyclohexanedimethanol (CHDM), 2,2,4,4-tetramethyl-1,3-cyclobutanediol (TMCD), and ethylene glycol (EG).

The DMT was purchased from Cape Industries, the CHDM (min. 98%), the EG, and the TMCD (min. 98%) were from Eastman Chemical Company. The tin compound was dibutyltin (IV) oxide (Fascat 4201; from Aldrich). The titanium compound was titanium (IV) isopropoxide (Aldrich). The phosphorus compound was triphenyl phosphate (TPP, from Aldrich (98%) or FERRO, Corp.). Unless otherwise indicated below, the source of phosphorous was added upfront, with the rest of the polyester reagents. The cis/trans ratio of the CHDM and TMCD was as described above.

Example 1A

This example illustrates the preparation of a copolyester with a target composition of 100 mole % dimethyl terephthalate residues, 30 mol % 2,2,4,4-tetramethyl-1,3-cyclobutanediol residues, and 30 mol % 1,4-cyclohexanedimethanol residues, and the rest ethylene glycol residues.

A mixture of 99.71 g of dimethyl terephthalate, 21.63 g of 1,4-cyclohexanedimethanol, 37.86 g of 2,2,4,4-tetramethyl-1,3-cyclobutanediol, and 20.95 g of ethylene glycol was placed in a 500-milliliter flask equipped with an inlet for nitrogen, a metal stirrer, and a short distillation column. In addition, 0.0077 g of dibutyltin (IV) oxide, 0.0218 g of titanium (IV) isopropoxide, and 0.50 g of triphenyl phosphate was added to the 500-milliliter flask. The flask was placed in a Wood's metal bath already heated to 200° C. The stirring speed was set to 200 RPM at the beginning of the experiment. The contents of the flask were heated at 200° C. for 60 minutes and then the temperature was gradually increased to 210° C. over 5 minutes. The reaction mixture was held at 210° C. for 60 minutes and then heated up to 275° C. in 90 minutes. Once at 275° C., vacuum was gradually applied over the next 10 minutes with a set point of 100 mm of Hg and the stirring speed was also reduced to 100 RPM. The pressure inside the flask was further reduced to a set point of 0.3 mm of Hg over the next 5 minutes and the stirring speed was reduced to 50 RPM. This pressure was maintained for a total time of 220 minutes to remove excess unreacted diols. This process resulted in a high melt viscosity, visually clear, and colorless to very slightly yellow polymer with a glass transition temperature of 107° C. and an inherent viscosity of 0.67 dl/g. NMR analysis showed that the copolyester was composed of 30 mole % 1,4-cyclohexanedimethanol residues, 30 mole % 2,2,4,4-tetramethyl-1,3-cyclobutanediol residues, and 40 mole % ethylene glycol residues.

Example 1B to Example 1K

A variety of polyesters were prepared as described above from 100 mole % dimethyl terephthalate. However, different amounts of triphenyl phosphate were added to the initial reaction mixture as indicated in Table 1. The mole % of TMCD and CHDM for the experiments of this example is also reported in Table 1, with the glycol balance being EG. The glycol/acid ratio was 1.5/1 with the glycol feed having 20 mole % CHDM, 35 mole % TMCD and 45 mole % EG.

The set points and data collection were facilitated by a Camile process control system. Once the reactants were melted, stirring was initiated and slowly increased. The Camile sequence shown below was used in the preparation of these copolyesters.

Camile Sequence for Example 1B to Example 1K

| Stage | Time (minutes) | Temperature, C. | Vacuum (torr) | Stirring (RPM) |
|---|---|---|---|---|
| 1 | 0.5 | 200 | 730 | 0 |
| 2 | 4.5 | 200 | 730 | 200 |
| 3 | 60 | 200 | 730 | 200 |
| 4 | 5 | 210 | 730 | 200 |
| 5 | 60 | 210 | 730 | 100 |
| 6 | 90 | 275 | 730 | 100 |
| 7 | 5 | 275 | 400 | 50 |
| 8 | 5 | 275 | 100 | 50 |
| 9 | 5 | 275 | 0.3 | 50 |
| 10 | 220 | 275 | 0.3 | 50 |

In stage 10, the stir rate was dropped to 25 rpm and even to 10 rpm if the viscosity was too high. The holding time in stage 10 for Examples G and H was 130 minutes.

TABLE 1

Composition, color, and inherent viscosity for the polyesters of Example 1

| Example | IV (dL/g) | TMCD mol % | CHDM mol % | DEG[1] mol % | ppm Ti | ppm Sn | TPP (g) | ppm P Theory | ppm P measured | Tg (° C.) | L* | a* | b* |
|---|---|---|---|---|---|---|---|---|---|---|---|---|---|
| A | 0.670 | 29.8 | 30.1 | 0.6 | 34 | 33 | 0.500 | 430 | 165.8 | 106.5 | 79.51 | −1.35 | 4.9 |
| B | 0.953 | 38.3 | 28.7 | 0.4 | 34 | 31 | 0.024 | 21 | 16 | 117.7 | 77.69 | −2.37 | 13.3 |
| C | 0.792 | 37.3 | 29.5 | 0.1 | 36 | 36 | 0.075 | 64 | 40 | 118.2 | 77.57 | −1.64 | 9.85 |
| D | 0.774 | 34.3 | 29.9 | 0.4 | 37 | 32 | 0.125 | 107 | 61 | 117.2 | 78.02 | −1.37 | 6.63 |
| E | 0.751 | 35.1 | 31.0 | 0.2 | 36 | 33 | 0.150 | 129 | 56 | 115.3 | 78.29 | −1.42 | 8.55 |
| F | 0.691 | 34.0 | 28.6 | 0.7 | 33 | 32 | 0.303 | 261 | 121.8 | 109.9 | 78.9 | −1.74 | 5.71 |
| G | 0.647 | 37.2 | 28.6 | 0.3 | NM | NM | 0.200 | 172 | NM | 112.6 | NM | NM | NM |
| H | 0.688 | 33.8 | 32.5 | 0.4 | NM | NM | 0.200 | 172 | NM | 112.4 | NM | NM | NM |

NM = Not measured.
[1]DEG formed during polymerization

Example 2

This example illustrates the effect of thermal stabilizer levels on polymer color and inherent viscosity of copolyesters with a target composition of 100 mole % dimethyl terephthalate residues, 30 mole % 2,2,4,4-tetramethyl-1,3-cyclobutanediol residues, 30 mole % 1,4-cyclohexanedimethanol residues, and 40 mole % ethylene glycol residues using a combination of tin and titanium catalysts. Unless otherwise specified, the source of monomers, catalysts, and thermal stabilizers is the same as in Example 1.

Example 2A

A mixture of 99.71 g of dimethyl terephthalate, 21.63 g of 1,4-cyclohexanedimethanol, 37.86 g of 2,2,4,4-tetramethyl-1,3-cyclobutanediol, and 20.95 g of ethylene glycol was placed in a 500-milliliter flask equipped with an inlet for nitrogen, a metal stirrer, and a short distillation column. In addition, 0.0077 g of dibutyltin (IV) oxide and 0.0218 g of titanium (IV) isopropoxide were added to the 500-milliliter flask. The flask was placed in a Wood's metal bath already heated to 200° C. The stirring speed was set to 200 RPM at the beginning of the experiment. The contents of the flask were heated at 200° C. for 60 minutes and then the temperature was gradually increased to 210° C. over 5 minutes. The reaction mixture was held at 210° C. for 60 minutes and then heated up to 275° C. in 90 minutes. Once at 275° C., vacuum was gradually applied over the next 10 minutes with a set point of 100 of Hg and the stirring speed was also reduced to 100 RPM. The pressure inside the flask was further reduced to a set point of 0.3 mm of Hg over the next 5 minutes and the stirring speed was reduced to 50 RPM. This pressure was maintained for a total time of 220 minutes to remove excess unreacted diols. This process resulted in a polymer with a glass transition temperature of 117.7° C. and an inherent viscosity of 1.011 dL/g. NMR analysis showed that the copolyester was composed of 29 mole % 1,4-cyclohexanedimethanol residues, 37 mole % 2,2,4,4-tetramethyl-1,3-cyclobutanediol residues, and 34 mole % ethylene glycol residues.

Example 2B to Example 2E

A variety of polyesters were prepared as described above from 100 mole % simethyl terephthalate. However, different amounts of triphenyl phosphate were added to the initial reaction mixture as indicated in Table 2. The mole % of TMCD and CHDM for the experiments of this example is also reported in Table 2, with the glycol balance being EG. The glycol/acid ratio was 1.5/1 with the glycol feed having 20 mole % CHDM, 35 mole % TMCD and 45 mole % EG. The set points and data collection were facilitated by a Camile process control system. Once the reactants were melted, stirring was initiated and slowly increased. The Camile sequence shown was used in the preparation of these copolyesters.

Camile Sequence for Example 2B to Example 2E

| Stage | Time (minutes) | Temperature, C. | Vacuum (torr) | Stirring (RPM) |
|---|---|---|---|---|
| 1 | 0.5 | 200 | 730 | 0 |
| 2 | 4.5 | 200 | 730 | 200 |
| 3 | 60 | 200 | 730 | 200 |
| 4 | 5 | 210 | 730 | 200 |
| 5 | 60 | 210 | 730 | 100 |
| 6 | 90 | 275 | 730 | 100 |
| 7 | 5 | 275 | 400 | 50 |
| 8 | 5 | 275 | 100 | 50 |
| 9 | 5 | 275 | 0.3 | 50 |
| 10 | 220 | 275 | 0.3 | 50 |

In stage 10, the stir rate was dropped to 25 rpm and even to 10 rpm if the as too high.

TABLE 2

Effect of phosphorous content on copolyester color and inherent viscosity

| Example | IV (dL/g) | TMCD mol % | CHDM mol % | DEG[1] mol % | ppm Ti | ppm Sn | TPP (g) | ppm P Theory | ppm P measured | Tg (° C.) | L* | a* | b* |
|---|---|---|---|---|---|---|---|---|---|---|---|---|---|
| A | 1.011 | 37.1 | 29.2 | 0.4 | 34 | 33 | 0.000 | 0 | 2 | 117.7 | 70.76 | 0.15 | 18 |
| B | 0.913 | 36.5 | 29.1 | 0.5 | 33 | 34 | 0.052 | 45 | 28 | 115.9 | 76.18 | −1.71 | 11.2 |
| C | 0.777 | 37.2 | 29.2 | 0.1 | 33 | 36 | 0.100 | 86 | 49 | 117.5 | 73.43 | −1.5 | 6.23 |
| D | 0.744 | 38.5 | 28.3 | 0.5 | 34 | 31 | 0.205 | 176 | 78.7 | 113.1 | 77.73 | −1.4 | 6.2 |
| E | 0.722 | 31.2 | 29.2 | 0.8 | 34 | 33 | 0.396 | 340 | 152.2 | 109.3 | 78.51 | −1.22 | 4.84 |

[1]DEG formed during polymerization

Example 3

This example further illustrates the preparation of copolyesters comprising dimethyl terephthalate (DMT), 1,4-cyclohexanedimethanol (CHDM), 2,2,4,4-tetramethyl-1,3-cyclobutanediol (TMCD), and ethylene glycol (EG). These polyesters were prepared at a pilot plant scale. Additionally, this example illustrates the properties of polyesters according to the invention in comparison with other copolyesters based on TMCD.

Example 3A

The polyester of this example was prepared with 100% mol DMT and a target composition for the diol component of 30% mol TMCD, 20% mol CHDM, and 50% mol EG. The TMCD used for this preparation was the result of a 40-pound blend of various TMCD glycol samples on hand. The samples were ground and blended and resulted in a TMCD batch containing 55% cis and 45% trans isomers. The sources of CHDM, DMT, catalysts and thermal stabilizers were the same as in Example 1. The amount of each component loaded into the reaction vessel is shown in Table 3 below. These amounts of raw material provided a glycol:acid mole ratio of 2:1, with the TMCD being charged at a 50-mol % excess and the CHDM being charged at 7-mol % excess. The target catalyst for this batch was 200 ppm Sn from dibutyltin oxide. The ester exchange stage was done at 200° C. with a 2 hour hold time, followed by a 1 hour hold time at 220° C., under atmospheric pressure, and a stirring rate of 25 RPM. The temperature was then ramped to 280° C. Once the temperature reached 240° C., the agitator was run 6 minutes in reverse and then run forward for another 6 minutes at 25 RPM. Vacuum was then applied at a rate of 13 mm of Hg/min while the temperature continued to increase to 280° C. The polycondensation stage was carried out at 280° C. and a vacuum of 0.2-0.3 mm of Hg. After 45 minutes under these conditions, the agitator speed was set to 10 RPM and the mixture was held for another 45 minutes, after which the polyester was extruded onto dry ice. The cooled, extruded polymer was ground to pass a 6-mm screen. The resulting copolyester had an IV of 0.667 dL/g, which represents an average of the inherent viscosities of the polyester at the beginning and end of the extrusion. This polyester was molded into test bars on a TOYO 90A molding machine and submitted for testing. The NMR composition of the final polyester and results from testing are shown in Table 4 below.

TABLE 3

Raw material charge amounts for the copolyesters of this example

| Example | glycol:acid ratio | DMT (lbs) | EG (lbs) | TMCD (lbs) | CHDM (lbs) | Sn (ppm) |
|---|---|---|---|---|---|---|
| A | 2:1 | 12.49 | 5.33 | 4.17 | 1.98 | 200 |
| B | 2:1 | 13.43 | 6.65 | 4.49 | 0 | 200 |

Example 3B

The polyester of this example was prepared in a similar manner to the polyester of Example 3A, but with no CHDM. The polyester was prepared with 100% mol DMT and a target composition for the diol component of 20% mol TMCD and 80% mol EG. The raw material amounts used in the preparation of this polyester are shown in Table 3 above, and the NMR composition of the final polyester and its properties are shown on Table 4 below.

Example 3C

The copolyester of this example was prepared with 100% mol DMT and a target composition for the diol component of 20% mol TMCD and 80% mol CHDM. This copolyester was prepared in a similar manner to Example 3B, but with CHDM instead of EG. The properties of the material are reported in Table 4 below.

TABLE 4

Characteristics of the polyesters of Example 3

| | | Examples | | |
|---|---|---|---|---|
| Property | | A | B | C |
| IV (dL/g) | before molding | 0.67 | 0.84 | 0.69 |
| | after molding | 0.62 | 0.71 | 0.64 |
| 2nd cycle Tg (° C.) | | 100.8 | 102.2 | 108.4 |
| Sn (ppm) | | 197 | 225 | 293 |
| NMR | TMCD mole % | 27.8 | 30.0 | 20.4 |
| | CHDM mole % | 20.0 | none | 79.6 |
| | EG mole % | 51.5 | 69.0 | none |
| | DEG mole %[1] | 0.5 | 1.0 | none |
| Color on ground material[2] | | | | |
| | L* | 73.28 | 61.76 | 70.76 |
| | a* | −1.30 | 5.66 | −0.95 |
| | b* | 20.04 | 25.28 | 5.37 |
| Color on 4 × 4 × ⅛" plaques | | | | |
| | L* | 88.56 | 71.26 | 92.06 |
| | a* | −4.58 | 9.61 | −1.61 |
| | b* | 19.68 | 59.57 | 3.51 |
| % Haze (4 × 4 × ⅛" plaques) | | 1.16 | 1.40 | 1.22 |
| Flexural modulus (psi) | | 299,958 | 325,469 | 239,671 |
| Notched Izod Impact Strength at 23° C. (ft-lb/in) | | 17.2 | 1.49 | 19.7 |

[1]DEG formed during polymerization
[2]Color reported for Example C ground material was actually measured on pellets The results in the table above show that the copolyesters of this invention have an excellent combination of flexural modulus (stiffness) and impact strength (toughness) compared to other copolyesters based on DMT and TMCD, and containing either CHDM or EG, at similar glass transition temperatures. For example, the copolyester of the invention has an impact strength more than 1000% higher than a copolyester based on TMCD and EG, with only less than 8% decrease in modulus. Also, the copolyester of the invention has a flexural modulus about 25% higher than the copolyester based on TMCD and CHDM (Example C), while still retaining an acceptable notched Izod impact strength.

The results in Table 4 also show that the polyester having the desired properties of stiffness and toughness retains good haze properties. One of ordinary skill in the art will understand that the catalyst system and/or thermal stabilizer used in the preparation of the copolyesters in Table 4 is not expected to have a significant effect on the values of flexural modulus or notched izod impact strength.

Example 4

This example illustrates the effect of catalyst choice and amount of thermal stabilizer on the final color and inherent viscosity of a copolyester with a target composition of 100 mole % dimethyl terephthalate residues, 30 mole % 2,2,4,4-tetramethyl-1,3-cyclobutanediol residues, 30 mole % 1,4-cyclohexanedimethanol residues, and 40 mole % ethylene glycol residues.

A mixture of 99.71 g of dimethyl terephthalate, 21.63 g of 1,4-cyclohexanedimethanol, 37.86 g of 2,2,4,4-tetramethyl-1,3-cyclobutanediol, and 20.95 g of ethylene glycol was placed in a 500-milliliter flask equipped with an inlet for nitrogen, a metal stirrer, and a short distillation column. Various amounts of dibutyltin (IV) oxide, titanium (IV) isopropoxide, and triphenyl phosphate were added to the 500-milliliter flask. The flask was placed in a Wood's metal bath already heated to 200° C. The stirring speed was set to 200 RPM at the beginning of the experiment. The contents of the flask were heated at 200° C. for 60 minutes and then the temperature was gradually increased to 210° C. over 5 minutes. The reaction mixture was held at 210° C. for 60 minutes and then heated up to 275° C. in 90 minutes. Once at 275° C., vacuum was gradually applied over the next 10 minutes with a set point of 100 mm of Hg and the stirring speed was also reduced to 100 RPM. The pressure inside the flask was further reduced to a set point of 0.3 mm of Hg over the next 5 minutes and the stirring speed was reduced to 50 RPM. This pressure was maintained for a total time of 220 minutes to remove excess unreacted diols. All samples were prepared by the same method using the catalyst and triphenyl phosphate levels reported in Table 5. The final TMCD and CHDM mole % for these copolyesters is reported also in Table 5, with the diol balance being EG. The effect of the catalyst system and thermal stabilizer on 2,2,4,4-tetramethyl-1,3-cyclobutanediol incorporation, copolyester color, and inherent viscosity are shown in Table 5. Examples G, H, and I in Table 5 below correspond to Example 2A, Example 2D, and Example 1A respectively and are included in Table 5 to facilitate comparison among polyesters prepared using different catalyst systems and different levels of phosphorous.

TABLE 5

Effect of catalyst and triphenyl phosphate levels on TMCD incorporation, color, and inherent viscosity

| Example | TIIP (g)/ppm Ti | DBTO (g)/ppm Sn | TPP (g) | TMCD in copolyester (mole %) | CHDM in copolyester (mole %) | b* | IV (dL/g) |
|---|---|---|---|---|---|---|---|
| A | 0 | 0.0154/60 ppm | 0.00 | 40.0 | 29.1 | 15.1 | 0.78 |
| B | 0 | 0.0154/60 ppm | 0.20 | 28.5 | 31.2 | 2.6 | 0.18 |
| C | 0 | 0.0154/60 ppm | 0.50 | 24.1 | 30.7 | 3.7 | 0.17 |
| D | 0.042/60 ppm | 0 | 0.00 | 28.7 | 29.4 | 21.1 | 0.91 |
| E | 0.042/60 ppm | 0 | 0.20 | 27.7 | 31.0 | 11.1 | 0.78 |
| F | 0.042/60 ppm | 0 | 0.50 | 25.5 | 31.0 | 10.6 | 0.56 |
| G | 0.021/30 ppm | 0.077/30 ppm | 0.00 | 37.1 | 29.2 | 18.0 | 1.01 |
| H | 0.021/30 ppm | 0.077/30 ppm | 0.21 | 38.5 | 28.3 | 6.2 | 0.74 |
| I | 0.021/30 ppm | 0.077/30 ppm | 0.50 | 29.8 | 30.1 | 4.9 | 0.67 |

While outside the scope of the originally-filed claims, Examples B and C are included here to show the effect of the catalyst system and levels of thermal stabilizer on TMCD incorporation, color, and inherent viscosity.

The invention has been described in detail with reference to the embodiments disclosed herein, but it will be understood that variations and modifications can be effected within the spirit and scope of the invention.

What is claimed is:

1. A polyester composition comprising at least one polyester which comprises:
    (a) a dicarboxylic acid component comprising:
        (i) about 90 to about 100 mole % of terephthalic acid residues;
        (ii) about 0 to about 10 mole % of aromatic and/or aliphatic dicarboxylic acid residues having up to 20 carbon atoms; and
    (b) a glycol component comprising:
        (i) about 25 to about 40 mole % 2,2,4,4-tetramethyl-1,3-cyclobutanediol residues; and
        (ii) about 20 to about 40 mole % cyclohexanedimethanol residues;
        (iii) ethylene glycol residues, and
        (iv) less than about 2 mole % of a modifying glycol having from 3 to 16 carbon atoms;
    wherein the total mole % of the dicarboxylic acid component is 100 mole %, and
    wherein the total mole % of the glycol component is 100 mole %;
    wherein the sum of the mole percentages of 2,2,4,4-tetramethyl-1,3-cyclobutanediol and cyclohexanedimethanol is from 40 to less than 70 mole % of the total mole % of the glycol component, and
    wherein the inherent viscosity of the polyester is from 0.50 to 1.2 dL/g as determined in 60/40 (wt/wt) phenol/tetrachloroethane at a concentration of 0.25 g/50 ml at 25° C.

2. The polyester composition of claim 1, wherein ethylene glycol is present in the amount of about 30 to about 60 mole %.

3. The polyester composition of claim 1 wherein ethylene glycol is present in the amount of about 30 to about 50 mole %.

4. The polyester composition of claim 1 wherein ethylene glycol is present in the amount of about 35 to about 45 mole %.

5. The polyester composition of claim 1 wherein the inherent viscosity of the polyester is from 0.5 to 1 dL/g.

6. The polyester composition of claim 1 wherein the inherent viscosity of the polyester is from 0.5 to 0.75 dL/g.

7. The polyester composition of claim 1 wherein the inherent viscosity of the polyester is from 0.60 to 0.75 dL/g.

8. The polyester composition of any of claims 1, 2 and 6 wherein the polyester has a $T_g$ of 100 to 110° C.

9. The polyester composition of claim 1 wherein the polyester has a $T_g$ of 102 to 108° C.

10. The polyester composition of claims 1, 2 or 6 further comprising at least one phosphorus compound chosen from at least one of alkyl phosphate esters, aryl phosphate esters, mixed alkyl aryl phosphate esters, reaction products thereof, or mixtures thereof.

11. The polyester composition of claim 1 further comprising at least one phosphorus compound chosen from at least one of the following: trialkyl phosphates, triaryl phosphates, alkyl diaryl phosphates, or mixed alkyl aryl phosphates.

12. The polyester composition of claim 1 further comprising at least one phosphorus compound chosen from at least one of the following: triaryl phosphates, alkyl diaryl phosphates, or mixed alkyl aryl phosphates.

13. The polyester composition of claim 1 further comprising at least one phosphorus compound chosen from at least one of the following: dibutylphenyl phosphate, triphenyl phosphate, tricresyl phosphate, tributyl phosphate, tri-2-ethylhexyl phosphate, trioctyl phosphate, isocetyl diphenyl phosphate, or 2-ethylhexyl diphenyl phosphate.

14. The polyester composition of claim 1 further comprising at least one phosphorus compound chosen from dibutylphenyl phosphate, triphenyl phosphate, isocetyl diphenyl phosphate, or 2-ethylhexyl diphenyl phosphate.

15. The polyester composition of claim 1 comprising at least one phosphorus compound chosen from triphenyl phosphate, ethoxylated phosphate nonionic surfactants, or 2-ethylhexyl diphenyl phosphate.

16. The polyester composition of claim 1 further comprising at least one thermal stabilizer in the amount of about 1 ppm to about 500 ppm based on the total weight of the polyester.

17. The polyester composition of claim 1 further comprising at least one phosphorus compound in the amount of about 1 ppm to about 300 ppm based on the total weight of the polyester.

18. The polyester composition of claim 1 further comprising at least one phosphorus compound in the amount of about 1 ppm to about 100 ppm based on the total weight of the polyester.

19. The polyester composition of claim 1 wherein the polyester comprises at least one modifying glycol chosen from diethylene glycol, 1,2-propanediol, neopentyl glycol, polytetramethylene glycol, 1,5- pentanediol, 1,6-hexanediol, p-xylene glycol, 1,3-propanediol and 1,4-butanediol or mixtures thereof.

20. The polyester composition of claim 1 wherein the polyester comprises diethylene glycol.

21. The polyester composition of claim 1 wherein the 2,2,4,4-tetramethyl-1,3-cyclobutanediol residues is a mixture comprising 40 to 60 mole % of cis-2,2,4,4-tetramethyl-1,3-cyclobutanediol residues and 40 to 60 mole % of trans-2,2,4,4-tetramethyl-1,3-cyclobutanediol residues.

22. A blend comprising the polyester composition of claim 1 further comprising at least one polymer of poly(etherimides), polyphenylene oxides, poly(phenylene oxide)/polystyrene blends, polystyrene resins, polyphenylene sulfides, polyphenylene sulfide/sulfones, poly(ester-carbonates), polycarbonates, polysulfones; polysulfone ethers, poly(ether-ketones), polyesters other than those of claim 1, or mixtures thereof.

23. A blend comprising the polyester composition of claim 1 additionally comprising at least one polycarbonate.

24. The polyester composition of claim 1 wherein the polyester composition further comprises a branching agent for the polyester.

25. The polyester composition of claim 1 wherein the flexural modulus of the polyester is equal to or of greater than 290,000 psi.

26. The polyester composition of claim 1 wherein the polyester is amorphous.

27. The polyester composition of claim 1 wherein the polyester has a crystallization half-time of greater than 5 minutes at 170° C.

28. The polyester composition of claim 1 wherein the polyester has a density of greater than 1.2 g/ml at 23° C.

29. The polyester composition of claim 1 wherein the polyester composition further comprises at least one additive chosen from colorants, mold release agents, phosphorus compounds other than those described in claim 1, plasticizers, nucleating agents, UV stabilizers, glass fiber, carbon fiber, fillers, impact modifiers, or a mixture thereof.

30. The polyester composition of claim 1 wherein the polyester has a notched Izod impact strength of at least 3 ft-lbs/in at 23° C. according to ASTM D256 with a 10-mil notch using a ⅛-inch thick bar.

31. The polyester composition of claim 1 wherein the polyester has a notched Izod impact strength of at least 10 ft-lbs/in at 23° C. according to ASTM D256 with a 10-mil notch using a ⅛-inch thick bar.

32. The polyester composition of claim 1 wherein the polyester has two or more of the following properties chosen from: a $T_g$ of from about 100 to about 110° C. as measured by a TA 2100 Thermal Analyst Instrument at a scan rate of 20° C./min; a flexural modulus at 23° C. of greater than 290,000 psi as defined by ASTM D790; and a notched Izod impact strength greater than 10 ft-lb/in according to ASTM D256 with a 10-mil notch using a 1/8-inch thick bar at 23° C.

33. The polyester composition of claim 1 wherein the b* color values for the polyesters useful in the invention is from −12 to less than 12 as determined by the L*a*b* color system.

34. An article of manufacture comprising the polyester composition of claim 1 which comprises a film or sheet.

35. An article of manufacture comprising the polyester composition of claim 1 which comprises a thermoformed film or sheet.

36. A polyester composition comprising at least one polyester which comprises:
 (a) a dicarboxylic acid component comprising:
  (i) about 90 to about 100 mole % of terephthalic acid residues;
  (ii) about 0 to about 10 mole % of aromatic and/or aliphatic dicarboxylic acid residues having up to 20 carbon atoms; and
 (b) a glycol component comprising:
  (i) about 25 to about 40 mole % 2,2,4,4-tetramethyl-1,3-cyclobutanediol residues; and
  (ii) about 20 to about 40 mole % cyclohexanedimethanol residues;
  (iii) ethylene glycol residues, and
  (iv) less than about 2 mole % of a modifying glycol having from 3 to 16 carbon atoms;
  wherein the total mole % of the dicarboxylic acid component is 100 mole %; and
  wherein the total mole % of the glycol component is 100 mole %;
  wherein the sum of the mole percentages of 2,2,4,4-tetramethyl-1,3-cyclobutanediol and cyclohexanedimethanol is from 40 to less than 70 mole % of the total mole % of the glycol component;
  wherein the inherent viscosity of the polyester is from 0.50 to 1.2 dL/g as determined in 60/40 (wt/wt) phenol/tetrachloroethane at a concentration of 0.25 g/50 ml at 25° C.; and
 wherein the polyester comprises at least one branching agent.

37. The polyester composition of claim 36 wherein the polyester comprises a branching agent in the amount of 0.01 to 5 weight % based on the total weight of the polyester.

38. The polyester composition of claim 36 wherein the polyester comprises a branching agent in the amount of 0.01 to 1 weight % based on the total weight of the polyester.

39. The polyester composition of claim 36, wherein the polyester further comprises at least one phosphorus compound present in the amount of about 1 ppm to about 500 ppm based on the total weight of the polyester.

40. The polyester composition of claim 36 further comprising at least one titanium compound in the amount of about 1 ppm to about 100 ppm based on the total weight of the polyester.

41. A process for making a polyester comprising the following steps:
(I) heating a mixture at at least one temperature chosen from 150° C. to 250° C., under at least one pressure chosen from the range of 0 psig to 75 psig wherein said mixture comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 25 to about 40 mole % 2,2,4,4-tetramethyl-1,3-cyclobutanediol residues; and
(ii) about 20 to about 40 mole % cyclohexanedimethanol residues;
(iii) ethylene glycol residues, and
(iv) less than about 2 mole % of a modifying glycol having from 3 to 16 carbon atoms;
wherein the molar ratio of glycol component/dicarboxylic acid component added in Step (I) is 1.01-3.0/1.0;
wherein the mixture in Step (I) is heated in the presence of:
(i) at least one catalyst comprising at least one titanium compound, and, optionally, at least one catalyst chosen from tin, gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and wherein the total mole % of the glycol component of the final polyester is 100 mole %;
wherein the sum of the mole percentages of 2,2,4,4-tetramethyl-1,3-cyclobutanediol and cyclohexanedimethanol of the final polyester is from 40 to less than 70 mole % of the total mole % of the glycol component, and
wherein the inherent viscosity of the polyester is from 0.50 to 1.2 dL/g as determined in 60/40 (wt/wt) phenol/tetrachloroethane at a concentration of 0.25 g/50 ml at 25° C.

42. The process of claim 41 wherein the molar ratio of glycol component/dicarboxylic acid component added in Step (I) is from 1.01-2/1.0.

43. The process of claim 42 wherein the molar ratio of glycol component/dicarboxylic acid component added in Step (I) is from 1.01-1.5/1.0.

44. The process of claim 42 wherein the heating time in Step (II) is 1 to 4 hours.

45. The process of claim 42 wherein the weight ratio of total phosphorus atoms to total titanium atoms in the final polyester is 0-20:1.

46. The process of claim 42 wherein the weight ratio of total phosphorus atoms to total titanium atoms in the final polyester is 1-10:1.

47. The process of claim 42 wherein the weight ratio of total phosphorus atoms to total titanium atoms in the final polyester is 0-5:1.

48. The process of claim 42 wherein the weight ratio of total phosphorus atoms to total titanium atoms in the final polyester is 1-5:1.

49. The process of claim 42 wherein the weight ratio of total phosphorus atoms to total titanium atoms in the final polyester is 1-3:1.

50. The process of claim 42 wherein the amount of titanium atoms present in the final polyester can be from 1 to 100 ppm titanium atoms based on the weight of the final polyester.

51. The process of claim 42 wherein ethylene glycol is present in the final polyester of from about 30 mole % to about 60 mole %.

52. The process of claim 42 wherein the catalyst(s) used in Step (I) comprises at least one titanium compound and at least one tin compound.

53. The process of claim 42 wherein the catalyst used in Step (I) consists essentially of at least one titanium compound.

54. The polyester composition of claim 36 wherein the b* color values for the polyesters useful in the invention is from −12 to less than 12 as determined by the L*a*b* color system.

55. The polyester composition of claim 36 wherein the b* color values for the polyesters useful in the invention is from −10 to less than 10 as determined by the L*a*b* color system.

56. A process for making a polyester comprising the following steps:
(I) heating a mixture at at least one temperature chosen from 150° C. to 250° C., under at least one pressure chosen from the range of 0 psig to 75 psig wherein said mixture comprises:
(a) a dicarboxylic acid component comprising:
(i) about 90 to about 100 mole % of terephthalic acid residues;
(ii) about 0 to about 10 mole % of aromatic and/or aliphatic dicarboxylic acid residues having up to 20 carbon atoms; and
(b) a glycol component comprising:
(i) about 25 to about 40 mole % 2,2,4,4-tetramethyl-1,3-cyclobutanediol residues; and
(ii) about 20 to about 40 mole % cyclohexanedimethanol residues;
(iii) ethylene glycol residues, and
(iv) less than about 2 mole % of a modifying glycol having from 3 to 16 carbon atoms;
wherein the molar ratio of glycol component/dicarboxylic acid component added in Step (I) is 1.01-3.0/1.0;
wherein the mixture in Step (I) is heated in the presence of:
(i) at least one catalyst comprising at least one titanium compound, at least one tin compound, and optionally, at least one catalyst chosen from gallium, zinc, antimony, cobalt, manganese, magnesium, germanium, lithium, aluminum compounds and an aluminum compound with lithium hydroxide or sodium hydroxide; and (ii) at least one phosphorus compound;
(II) heating the product of Step (I) at a temperature of 230° C. to 320° C. for 1 to 6 hours, under at least one pressure chosen from the range of the final pressure of Step (I) to 0.02 torr absolute, to form a final polyester;
wherein the total mole % of the dicarboxylic acid component of the final polyester is 100 mole %; and wherein the total mole % of the glycol component of the final polyester is 100 mole %; and wherein the inherent viscosity of the polyester is from 0.50 to 1.2 dL/g as determined in 60/40 (wt/wt) phenol/tetrachloroethane at a concentration of 0.25 g/50 ml at 25° C.

57. The process of claim 56 wherein the molar ratio of glycol component/dicarboxylic acid component added in Step (I) is from 1.01-2/1.0.

58. The process of claim 56 wherein the molar ratio of glycol component/dicarboxylic acid component added in Step (I) is from 1.01-1.5/1.0.

59. The process of claim 56 wherein the heating time in Step (II) is 1 to 4 hours.

60. The process of claim 56 wherein the sum of the mole percentages of 2,2,4,4-tetramethyl-1,3-cyclobutanediol and cyclohexanedimethanol of the final polyester is from 40 to less than 70 mole % of the total mole % of the glycol component.

61. The process of claim 56 wherein the weight ratio of total phosphorus atoms to total titanium atoms to total tin atoms in the final polyester is 0-20:0-10:1.

62. The process of claim 56 wherein the weight ratio of total phosphorus atoms to total titanium atoms to total tin atoms in the final polyester is 1-10:1-10:1.

63. The process of claim 56 wherein the weight ratio of total phosphorus atoms to total titanium atoms to total tin atoms in the final polyester is 1-10:1-5:1.

64. The process of claim 56 wherein the weight ratio of total phosphorus atoms to total titanium atoms to total tin atoms in the final polyester is 1-5:1-4:1.

65. The process of claim 56 wherein the weight ratio of total tin atoms to total titanium atoms in the final polyster is 0-4:1.

66. The process of claim 56 wherein the weight ratio of total phosphorus atoms to total titanium atoms in the final polyester is 1-10:1.

67. The process of claim 56 wherein the weight ratio of total phosphorus atoms to total titanium atoms in the final polyester is 0-5:1.

68. The process of claim 56 wherein the weight ratio of total phosphorus atoms to total titanium atoms in the final polyester is 1-5:1.

69. The process of claim 56 wherein the amount of titanium atoms present in the final polyester can be from 1 to 100 ppm titanium atoms based on the weight of the final polyester.

70. The process of claim 56 wherein the amount of tin atoms present in the final polyester can be from 1 to 400 ppm tin atoms based on the weight of the final polyester.

71. The process of claim 56 wherein the amount of phosphorus atoms present in the final polyester can be from 1 to 500 ppm phoshorus atoms based on the weight of the final polyester.

72. The process of claim 56 wherein the amount of titanium atoms present in the final polyester can be from 1 to 100 ppm titanium atoms based on the weight of the final polyester; the amount of tin atoms present in the final polyester can be from 1 to 400 ppm tin atoms based on the weight of the final polyester; and the amount of phosphorus atoms present in the final polyester can be from 1 to 500 ppm phoshorus atoms based on the weight of the final polyester.

73. The process of claim 56 wherein ethylene glycol is present in the final polyester of from about 30 mole % to about 60 mole %

74. The process of claim 56 wherein the catalyst(s) used in Step (I) consists essentially of at least one titanium compound and at least one tin compound.

75. The process of claim 56 wherein the b* color values for the final polyester is from −12 to less than 12 as determined by the L*a*b* color system.

76. The process of claim 56 wherein the b* color values for the final polyester is from −10 to less than 10 as determined by the L*a*b* color system.

* * * * *

UNITED STATES PATENT AND TRADEMARK OFFICE
CERTIFICATE OF CORRECTION

PATENT NO.       : 7,737,246 B2
APPLICATION NO.  : 11/635434
DATED            : June 15, 2010
INVENTOR(S)      : Crawford It is certified that error appears in the above-identified patent and that said Letters Patent is hereby corrected as shown below:

Correction(s)

Column 57, Line 57, Claim 43 "claim 42" should read --claim 41--

Column 57, Line 60, Claim 44 "claim 42" should read --claim 41--

Column 57, Line 62, Claim 45 "claim 42" should read --claim 41--

Column 57, Line 65, Claim 46 "claim 42" should read --claim 41--

Column 58, Line 1, Claim 47 "claim 42" should read --claim 41--

Column 58, Line 4, Claim 48 "claim 42" should read --claim 41--

Column 58, Line 7, Claim 49 "claim 42" should read --claim 41--

Column 58, Line 10, Claim 50 "claim 42" should read --claim 41--

Column 58, Line 13, Claim 51 "claim 42" should read --claim 41--

Column 58, Line 16, Claim 52 "claim 42" should read --claim 41--

Column 58, Line 19, Claim 53 "claim 42" should read --claim 41--

Signed and Sealed this

Twelfth Day of October, 2010

David J. Kappos
*Director of the United States Patent and Trademark Office*